(12) United States Patent
He

(10) Patent No.: US 9,527,038 B2
(45) Date of Patent: Dec. 27, 2016

(54) OSMOTIC BIOELECTROCHEMICAL SYSTEMS

(75) Inventor: Zhen He, Bayside, WI (US)

(73) Assignee: UWM Research Foundation, Inc., Milwaukee, WI (US)

(*) Notice: Subject to any disclaimer, the term of this patent is extended or adjusted under 35 U.S.C. 154(b) by 1111 days.

(21) Appl. No.: 13/546,105

(22) Filed: Jul. 11, 2012

(65) Prior Publication Data

US 2013/0017414 A1 Jan. 17, 2013

Related U.S. Application Data

(60) Provisional application No. 61/506,223, filed on Jul. 11, 2011, provisional application No. 61/585,509, filed on Jan. 11, 2012.

(51) Int. Cl.
| | |
|---|---|
| *H01M 8/16* | (2006.01) |
| *B01D 61/00* | (2006.01) |
| *C02F 3/00* | (2006.01) |
| *B01D 61/02* | (2006.01) |
| *C02F 1/44* | (2006.01) |
| *C02F 3/34* | (2006.01) |

(Continued)

(52) U.S. Cl.
CPC .......... *B01D 61/002* (2013.01); *B01D 61/025* (2013.01); *C02F 1/445* (2013.01); *C02F 3/005* (2013.01); *B01D 2311/25* (2013.01); *C02F 1/441* (2013.01); *C02F 3/341* (2013.01); *C02F 2001/46138* (2013.01); *C02F 2103/08* (2013.01); *C02F 2201/003* (2013.01); *C02F 2201/46115* (2013.01); *C02F 2301/024* (2013.01); *C02F 2301/08* (2013.01); *C02F 2303/10* (2013.01); *C02F 2303/16* (2013.01); *Y02W 10/30* (2015.05)

(58) Field of Classification Search
CPC .... B01D 61/002; B01D 61/025; H01M 10/54; C02F 1/44; C02F 1/445; C02F 1/4604
See application file for complete search history.

(56) References Cited

U.S. PATENT DOCUMENTS

| | | | |
|---|---|---|---|
| 4,824,534 A | 4/1989 | Tetzlaff et al. | |
| 5,976,719 A | 11/1999 | Kim et al. | |

(Continued)

FOREIGN PATENT DOCUMENTS

WO 2013009797 1/2013

OTHER PUBLICATIONS

Office Action from the US Patent and Trademark Office for U.S. Appl. No. 13/160,929 dated Sep. 11, 2014 (9 pages).

(Continued)

*Primary Examiner* — Nicholas P D'Aniello
*Assistant Examiner* — Jimmy K Vo
(74) *Attorney, Agent, or Firm* — Michael Best & Friedrich LLP

(57) ABSTRACT

A bioelectrochemical system includes an anode, a saline solution chamber, and a cathode. The anode is at least partially positioned within an anode chamber containing an aqueous reaction mixture including one or more organic compounds and one or more bacteria for oxidizing the organic compounds. The saline solution chamber contains a draw solution and is separated from the anode chamber by a forward osmosis membrane. Water diffuses across the forward osmosis membrane from the aqueous reaction mixture to the draw solution.

7 Claims, 31 Drawing Sheets

(51) Int. Cl.
C02F 1/461 (2006.01)
C02F 103/08 (2006.01)

(56) References Cited

U.S. PATENT DOCUMENTS

| | | | |
|---|---|---|---|
| 6,165,341 | A | 12/2000 | Sharifian et al. |
| 7,709,113 | B2 | 5/2010 | Logan et al. |
| 7,811,690 | B2 | 10/2010 | Eickhoff et al. |
| 2005/0255345 | A1 | 11/2005 | Gerritse et al. |
| 2006/0011544 | A1 | 1/2006 | Sharma et al. |
| 2007/0259216 | A1 | 11/2007 | Logan |
| 2007/0259217 | A1 | 11/2007 | Logan |
| 2008/0073288 | A1 | 3/2008 | Fan et al. |
| 2008/0220292 | A1 | 9/2008 | Rabaey et al. |
| 2010/0151279 | A1 | 6/2010 | Logan et al. |
| 2010/0196742 | A1 | 8/2010 | Nealson et al. |
| 2010/0216203 | A1* | 8/2010 | Trent ............. A01G 33/00 435/166 |
| 2010/0270158 | A1* | 10/2010 | Logan ............. C02F 1/469 204/522 |
| 2011/0311887 | A1 | 12/2011 | He |
| 2013/0017415 | A1 | 1/2013 | He |

OTHER PUBLICATIONS

PCT/US2012/046151 International Search Report and Written Opinion date mailed, Sep. 12, 2012 (13 pages).
Achilli, A. et al., "Selection of inorganic-based draw solutions for forward osmosis applications," Journal of Membrane Science (2010) p. 233-241, 364.
Achilli, A. et al., "The forward osmosis membrane bioreactor: A low fouling alternative to MBR processes" Desalination (2009) p. 10-21, 239.
Aelterman, P. et al., "Continuous electricity generation at high voltages and currents using stacked microbial fuel cells." Environmental Science and Technology (2006) p. 3388-3394, 40(10).
Anderson, J., "The environmental benefits of water recycling and reuse," Water Science and Technology: Water Supply (2003) p. 1-10, 3(4).
Angenent, L.T. et al., "Production of bioenergy and biochemicals from industrial and agricultural wastewater," Trends in Biotechnology (2004) p. 477-485, 22.
Beaudry, E.G. et al., "Membrane technology for direct osmosis concentration of fruit juice," Food Technology (1990) p. 121, 44(6).
Cao, X. et al., "A new method for water desalination using microbial desalination cells," Environmental Science & Technology (2009) p. 7148-7152, 43(18).
Cath, T. Y. et al., "A multi-barrier osmotic dilution process for simultaneous desalination and purification of impaired water," Journal of Membrane Science (2010) p. 417-426, 362.
Cath, T. Y. et al., "Forward osmosis: principles, applications, and recent developments," Journal of Membrane Science (2006) p. 70-87, 281.
Cath, T. Y. et al., "Membrane contactor processes for wastewater reclamation in space I. direct osmotic concentration as pretreatment for reverse osmosis," Journal of Membrane Science (2005) p. 85-98, 257.
Cath, T. Y. et al., "Membrane contactor processes for wastewater reclamation in space II. combined direct osmosis, osmotic distillation, and membrane distillation for treatment of metabolic wastewater," Journal of Membrane Science (2005) p. 111-119, 257.
Chan, K. Y. et al., "Nitrogen and Phosphorus Removal from Sewage Effluent with High Salinity by Chlorella salina," Environmental Pollution (1979) p. 139-146, 18:2.
Charcosset, C., "A review of membrane processes and renewable energies for desalination," Desalination (2009) p. 214-231, 245(1-3).
Chen, X. et al. "Stacked microbial desalination cells to enhance water desalination efficiency," Environmental Science and Technology (2011) p. 2465-2470, 45.

Cheng, S. et al., "Direct biological conversion of electrical current into methane by electromethanogenesis," Environmental Science & Technology (2009) p. 3953-3958, 43(10).
Chisti, Y., "Biodiesel from microalgae beats bioethanol," Trends in Biotechnology (2008) p. 126-131, 26(3).
Chisti, Y., "Biodiesel from microalgae," Biotechnology Advances (2007) p. 294-306, 25(3).
Chung, T.S. et al., "Forward osmosis processes: yesterday, today and tomorrow," Desalination, (2012) p. 78-81, 287.
Clauwaert, P. et al., "Biological Denitrification in Microbial Fuel Cells," Environmental Science & Technology (2007) p. 3354-3360, 41(9).
Clauwaert, P. et al., "Minimizing losses in bio-electrochemical systems: the road to applications," Applied Microbiology and Biotechnology (2008) p. 901-913, 79(6).
Cornelissen, E.R. et al., Water Science & Technology (2011) p. 1557-1565, 63(8).
Cusick, R.D. et al., "Phosphate recovery as struvite within a single chamber microbial electrolysis cell," Bioresource Technology (2012) p. 110-115, 107.
Elimelech, M. et al., "Yale constructs forward osmosis desalination pilot plant," Membrane Technology (2007) p. 7-8, vol. 2007, issue 1.
Fan, Y.H. et al., "Enhanced Coulombic Efficiency and Power Density of Air-cathode Microbial Fuel Cells with an Improved Cell Configuration," Journal of Power Sources (2007) p. 348-354, 171(2).
Fan, Y.H. et al., "Sustainable Power Generation in Microbial Fuel Cells Using Bicarbonate Buffer and Proton Transfer Mechanisms," Environmental Science & Technology (2007) p. 8154-8158, 41(23).
Fornero, J.J. et al., "Carbon Dioxide Addition to Microbial Fuel Cell Cathodes Maintains Sustainable Catholyte pH and Improves Anolyte pH, Alkalinity, and Conductivity," Environmental Science & Technology (2010) p. 2728-2734, 44(7).
Gao, Y. et al., "Characterization of forward osmosis membranes by electrochemical impedance spectroscopy," Desalination (2012), DOI:1 0.1 016/j.desa1.2012.03.006.
Ge, Z. et al., "Effects of draw solutions and membrane conditions on electricity generation and water flux in osmotic microbial fuel cells," Bioresource Technology (2012) p. 70-76, 109.
Gil, G.C. et al., "Operational parameters affecting the performance of a mediator-less microbial fuel cell," Biosens Bioelectron (2003) p. 327-334, 18.
Gruber, M.F. et al., "Computational fluid dynamics simulations of flow and concentration polarization in forward osmosis membrane systems," Journal of Membrane Science (2011) p. 488-495, 379.
Hancock, N.T. et al., "Solute coupled diffusion in osmotically driven membrane processes," Environmental Science Technology (2009) p. 6769-6775, 43(17).
He, Z., "One more function for microbial fuel cells in treating wastewater: producing high-quality water," Chemik (2012) p. 7-10, 66(1).
He, Z., et al., "Electricity generation from artificial wastewater using an upflow microbial fuel cell." Environmental Science and Technology (2005) p. 5262-5267, 39(14).
He, Z., et al., "An upflow microbial fuel cell with an interior cathode: assessment of the internal resistance by impedance spectroscopy," Environmental Science and Technology, (2006) p. 5212-5217, 40(17).
He, Z., et al., "Electricity Productin Coupled to Ammonium in a Microbial Fuel Cell," Environmental Science and Technology, (2009) p. 3391-3397, 43(9).
Hoffmann, J.P., "Wastewater Treatment with Suspended and Nonsuspended Algae," Journal of Phycology (1998) p. 757-763, 34(5).
Holloway, R.W. et al., "Forward osmosis for concentration of anaerobic digester centrate," Water Research (2006) p. 4005-4014, 41(17).
Hoover, L.A. et al., "Forward with osmosis: emerging applications for greater sustainability," Environmental Science & Technology (2011) p. 9824-30, 45(23).

(56) References Cited

OTHER PUBLICATIONS

Huang, C.H. et al., "Electrodialysis with bipolar membranes for sustainable development." Environmental Science & Technology (2006) p. 5233-5243, 40(17).
Huang, Y. et al., "Performance of microbial fuel cells with and without Nafion solution as cathode binding agent," Bioelectrochemistry (2010) p. 261-264, 79.
Jacobson, K. et al., "Efficient salt removal in a continuously operated upflow microbial desalination cell with an air cathode," Bioresource Technology (2010) p. 376-380, 102.
Jacobson, K. et al., "Use of a liter-scale microbial desalination cell as a platform to study bioelectrochemical desalination with salt solution or artificial seawater," Environmental Science and Technology, (2011) p. 4652-4657, 45(10).
Karagiannis, I.C., et al., "Water desalination cost literature: review and assessment," Desalination (2008) p. 448-456, 223(1-3).
Khawaji, A.D. et al., "Advances in seawater desalination technologies," Desalination (2008) p. 47-69, 221(1-3).
Kim, J. et al., "Anaerobic Fluidized Bed Membrane Bioreactor for Wastewater Treatment," Environmental Science & Technology (2011) p. 576-581, 45(2).
Kravath, R.E. et al., "Desalination of seawater by direct osmosis," Desalination (1975) 151-155, 16.
Kumar, M. et al., "Investigation of seawater reverse osmosis fouling and its relationship to pretreatment type," Environmental Science & Technology (2006) p. 2037-44, 40(6).
Kuntke, P. et al., "Ammonium recovery and energy production from urine by a microbial fuel cell," Water Research (2012) p. 2627-2636, 46(8).
Lee, S et al., "Comparison of fouling behavior in forward osmosis (FA) and reverse osmosis (RO)," Journal of Membrane Science (2010) p. 34-39, 365(1-2).
Li, D. et al., "Stimuli-responsive polymer hydrogels as a new class of draw agent for forward osmosis desalination," Chemical Communications (2011) p. 1710-1712, 47(6).
Li, Z. et al., "Flux patterns and membrane fouling propensity during desalination of seawater by forward osmosis," Water Research (2012) p. 195-204, 46(1).
Ling, M. M. et al., "Highly water-soluble magnetic nanoparticles as novel draw solutes in forward osmosis for water reuse," Industrial & Engineering Chemistry Research (2010) p. 5869-5876, 49(12).
Liu, H et al., "Electrochemically assisted microbial production of hydrogen from acetate," Environmental Science & Technology (2005) p. 4317-4320, 39(11).
Loeb, S. et al., "Large-scale power production by pressure-retarded osmosis using river water and sea water passing through spiral modules," Desalination (2002) p. 115-122, 143.
Logan, B. E. et al., "Microbial electrolysis cells for high yield hydrogen gas production from organic matter" Environmental Science & Technology (2008) p. 8630-8640, 42(23).
Logan, B. E., "Exoelectrogenic bacteria that power microbial fuel cells." Nature Reviews (2009) p. 375-381, 7.
Logan, B. E., "Scaling up microbial fuel cells and other bioelectrochemical systems," Applied Microbiology and Biotechnology (2010) p. 1665-1671, 85(6).
Logan, B.E., et al., "Microbial fuel cells: methodology and technology," Environmental Science and Technology (2006) p. 5181-5192, 40(17).
Low, S. C., "Preliminary studies of seawater desalination using forward osmosis, "Desalination and Water Treatment (2009) p. 41-46, 7.
Luo, H. et al., "Concurrent desalination and hydrogen generation using microbial electrolysis and desalination cells," Environmental Science and Technology, (2011) 340-344, 45(1).
Luo, H. et al., "Microbial desalination cells for improved performance in wastewater treatment, electricity production, and desalination," Bioresource Technology (2012) p. 60-66, 105.
Masters, G.M., et al., "Introduction to environmental engineering and science," Third ed. Prentice-Hall, Inc., Upper Saddle River, New Jersey (2008).

Mathioulakis, E. et al., "Desalination by using alternative energy: review and state-of-art," Desalination (2007) p. 346-365, 203.
McCarty, P.L. et al., "Domestic Wastewater Treatment as a Net Energy Producer—Can This be Achieved?" Environmental Science Technology (2011) p. 7100-7106, 45(17).
McCutcheon, J.R. et al., "A novel ammonia-carbon dioxide forward (direct) osmosis desalination process," Desalination (2005) p. 1-11, 174(1).
McCutcheon, J.R. et al., "Influence of concentrative and dilutive internal concentration polarization on flux behavior in forward osmosis," Journal of Membrane Science (2006) p. 237-247, 284(1-2).
Mehanna, M., et al., "A microbial electrodialysis cell for simultaneous water desalination and hydrogen gas production," Environmental Science and Technology (2010) p. 9578-9583, 44(24).
Mehanna, M., et al., "Using microbial desalination cells to reduce water salinity prior to reverse osmosis," Energy & Environmental Science (2010) p. 1114-1120, 3(8).
Menicucci, J. et al., "Procedure for determining maximum sustainable power generated by microbial fuel cells," Environmental Science & Technology (2006) p. 1062-1068, 40(3).
Mi, B. et al., "Chemical and Physical aspects of Organic Fouling of Forward Osmosis Membranes," Journal Membrane Science, (2008) p. 292-302, 320.
Mi, B. et al., "Organic fouling of forward osmosis membranes: Fouling reversibility and cleaning without chemical reagents," Journal Membrane Science, (2010) p. 337-345, 348.
Mohanakrishna, G. et al., "Bio-electrochemical treatment of distillery wastewater in microbial fuel cell facilitating decolorization and desalination along with power generation," Journal of Hazardous Materials (2010) p. 487-94, 177(1-3).
Munoz, R. et al., "Algal—bacterial processes for the treatment of hazardous contaminants: A review." Water Research (2006) p. 2799-2815, 40(15).
Ng, H. Y. et al., "Performance of forward (direct) osmosis process: membrane structure and transport phenomenon," Environmental Science & Technology (2006) p. 2408-2413, 40(7).
Pant, D. et al., "A review of the substrates used in microbial fuel cells (MFCs) for sustainable energy production," Bioresource Technology (2010) p. 1533-1543, 101(6).
Park J. B. K. et al., "Wastewater treatment and algal production in high rate algal ponds with carbon dioxide addition." Water Science & Technology (2010) p. 633-639, 61(3).
Park, J. B. K. et al., "Wastewater treatment high rate algal ponds for biofuel production," Bioresource Technology (2011) p. 35-42, 102(1).
Park, J.S. et al., "An electrical impedance spectroscopic (EIS) study on transport characteristics of ion-exchange membrane systems," Colloid Interface Science (2006) p. 655-662, 300.
Phillip, W.A. et al., "Reverse draw solute permeation in forward osmosis: modeling and experiments," Environmental Science Technology (2010) p. 5170-5176, 44.
Phuntsho, S. et al., "A novel low energy fertilizer driven forward osmosis desalination for direct fertilization: Evaluating the performance of fertilizer draw solutions," Journal of Membrane Science (2011) p. 172-181, 375.
Qin, J. J. et al., "Experimental studies and modeling on concentration polarization in forward osmosis," Water Science and Technology (2010) p. 2897-904, 61(11).
Qu, Y., et al., "Simultaneous water desalination and electricity generation in a microbial desalination cell with electrolyte recirculation for pH control," Bioresource Technology (2012) p. 89-94, 106.
Quan, X. et al., "Air stripping of ammonia in a water-sparged aerocyclone reactor," Journal of Hazardous Materials (2009) p. 983-988, 170.
Rabaey, K. et al., "High current generation coupled to caustic production using a lamellar bioelectrochemical system," Environmental Science & Technology (2010) p. 4315-21, 44(11).
Rabaey, K. et al., "Microbial fuel cell cathodes: from bottleneck to prime opportunity," Water Science and Technology (2008) p. 655-659, 57(5).

(56) References Cited

OTHER PUBLICATIONS

Rabaey, K. et al., "Microbial fuel cells: novel biotechnology for energy generation," Trends in Biotechnology (2005) p. 291-298, 23(6).
Raventos, N. et al., "Effect of brine discharge from a desalination plant on macrobenthic communities in the NW Mediterranean," Marine Environmental Research (2006) p. 1-14, 62(1).
Rittmann, B.E., "Opportunities for renewable bioenergy using microorganisms," Biotechnology and Bioengineering (2008) p. 203-212, 100(2).
Rosenbaum, M. et al., "Light energy to bioelectrictiy: photosynthetic microbial fuel cells", Current Opinion in Biotechnology (2010) p. 259-264, 21(3).
Rozendal, R.A. et al., "Effects of membrane cation transport on pH and microbial fuel cell performance," Environmental Science and Technology (2006) p. 5206-5211, 40(17).
Rozendal, R.A. et al., "Towards practical implementation of bioelectrochemical wastewater treatment," Trends in Biotechnology (2008) p. 450-459, 26(8).
Schnoor, J.L., "ES&T's Best Papers of 2009," Environmental Science & Technology (2010) p. 2219-2219, 44(7).
Semiat, R., "Energy issues in desalination processes," Environmental Science & Technology (2008) p. 8193-201, 42(22).
Shannon, M.A., et al., "Science and technology for water purification in the coming decades," Nature (2008) p. 301-310, 452(7185).
Singer, E., "New technologies deliver in treating neurological diseases," Natural Medicines (2004) p. 1267, 10(12).
Strik, D.P.et al., "Renewable sustainable biocatalyzed electricity production in a photosynthetic algal microbial fuel cell (PAMFC)," Applied Microbiology and Biotechnology (2008) p. 659-668, 81(4).
Talaat, K. M., "Forward osmosis process for dialysis fluid regeneration," Artificial Organs (2009) p. 1133-5, 33(12).
Tanaka, Y., "Water dissociation in ion-exchange membrane electrodialysis," Journal of Membrane Science (2002) p. 227-244, 203(1-2).
Ter Heijne, A. et al., "A bipolar membrane combined with ferric iron reduction as an efficient cathode system in microbial fuel cells," Environmental Science & Technology (2006) p. 5200-5205, 40(17).
Ugwu, C.U. et al., "Photobioreactors for mass cultivation of algae," Bioresource Technology (2008) p. 4021-4028, 99(10).
Velasquez-Orta, S.B. et al., "Energy from algae using microbial fuel cells," Biotechnology and Bioengineering (2009) p. 1068-1076, 103(6).
Virdis, B.K. et al., "Simultaneous nitrification, denitrification and carbon removal in microbial fuel cells," Water Research (2010) p. 2970-2980, 44(9).
Vrouwenvelder, J. S. et al., "Diagnosis, prediction and prevention of biofouling of NF and RO membranes," Desalination (2001) p. 65-71, 139(1-3).
Wang, X. et al., "Use of carbon mesh anodes and the effect of different pretreatment methods on power production in microbial 20 fuel cells," Environmental Science & Technology (2009) p. 6870-6874, 43(17).
Xiao, L. et al., "Crumpled graphene particles for microbial fuel cell electrodes," Journal of Power Sources (2012) p. 187-192, 208.
Yang, Q. et al., "Dual-layer hollow fibers with enhanced flux as novel forward osmosis membranes for water production," Environmental Science & Technology (2009) p. 2800-2805, 43(8).
Yip, N. Y. et al., "High performance thin film composite forward osmosis membrane," Environmental Science & Technology (2010) p. 3812-8, 44(10).
Zhang, B. et al., "Integrated salinity reduction and water recovery in an osmotic microbial desalination cells," RSC Advances (2012) p. 3265-3269, 2.
Zhang, F. et al., "Effects of anolyte recirculation rates and catholytes on electricity generation in a liter-scale upflow microbial fuel cell," Energy & Environmental Science (2010) p. 1347-1352, 3.
Zhang, F. et al., "Integrating forward osmosis into microbial fuel cells for wastewater treatment, water extraction and bioelectricity generation," Environmental Science Technology (2011) p. 6690-6696, 45.
Zhang, F. et al., "Simultaneous nitrification and denitrification with electricity generation in dual-cathode microbial fuel cells," Journal of Chemical Technology & Biotechnology (2012) p. 153-159, 87(1).
Zhao, F. et al., "Challenges and constraints of using oxygen cathodes in microbial fuel cells," Environmental Science and Technology (2006) p. 5193-5199, 40(17).
Zhao, S. et al., "Recent developments in forward osmosis: opportunities and challenges," Journal of Membrane Science (2012) p. 1-21, 396.
Zou, S. et al., "The role of physical and chemical parameters on forward osmosis membrane fouling during algae separation," Journal of Membrane Science (2011) p. 356-362, 366(1-2).
PCT/US11/40473 International Search Report and Written Opinion dated Oct. 25, 2011, 7 pages.
Office Action from the US Patent and Trademark Office for U.S. Appl. No. 13/546,111 dated Jan. 20, 2015 (12 pages).

* cited by examiner

OSMOTIC BIOELECTROCHEMICAL SYSTEMS

REFERENCE TO RELATED APPLICATION

This application claims the benefit of U.S. Provisional Patent Application No. 61/506,223, filed Jul. 11, 2011 and U.S. Provisional Patent Application No. 61/585,509, filed Jan. 11, 2012, the contents of both of which are incorporated herein by reference in their entireties.

BACKGROUND

The lack of adequate quantities of fresh water poses a significant global challenge given that about 97% of the Earth's water is seawater. Seawater is non-potable and cannot be used for agricultural irrigation. As such, improved methods and systems for wastewater treatment and/or desalinating water may be critical for producing fresh water, especially in areas where seawater is abundant, but fresh water is not.

A variety of technologies have been employed to produce fresh water from wastewater. One such technology is forward osmosis, which is the movement of water across a semi-permeable membrane in order to induce flow from an area of high-water potential to an area of low-water potential. Particularly, the driving force for forward osmosis is a concentrated solution (i.e., a draw solution) located on a permeate side of the semi-permeable membrane. The permeate is typically highly soluble in water, has a low molecular weight, and is easily and inexpensively separable from the draw solution to leave potable water. Treatment of wastewater via forward osmosis, however, does not yield fresh water, but instead produces water still containing organic contaminants and thus the water is in need of further treatment.

A second such technology is a microbial fuel cell (MFC) in which electricity may be harvested directly during microbial metabolism of organic matter. Specifically, in a MFC, organic matter (e.g., organic contaminants in wastewater) is metabolized by microbes in an anode chamber thus transferring electrons to the anode and liberating protons into the aqueous phase such that the electrons flow through a wire from the anode to a cathode to produce an electrical current. At the cathode, the electrons are accepted by a terminal electron acceptor (e.g., oxygen). Additionally, ion transport between the anode and cathode is needed to maintain proper change balance in the microbial fuel cell and to facilitate the generation of electricity. A microbial fuel cell, while removing organic contaminants from wastewater, does not remove other contaminants (e.g., non-organic) and thus further treatment is required to obtain fresh water.

Further, MFCs can be modified so as to be able to desalinate water concurrently with the treatment of organic wastes and the production of electricity. Specifically, MFCs can be modified to include a saline solution chamber positioned between the anode and the cathode; where the saline solution chamber contains an aqueous solution including anions and cations. When electricity is generated in such a modified MFC, the cations in the aqueous solution move through a cation exchange membrane (CEM) to or toward the cathode, while anions in the aqueous solution move through an anion exchange membrane (AEM) to or toward the anode. Accordingly, ion transport maintains a proper charge balance between the anode and cathode while concomitantly separating the cations and anions from the aqueous solution in the saline solution chamber, thereby desalinating the aqueous solution in the saline solution chamber. These modified MFCs are commonly referred to as microbial desalination cells (MDCs).

SUMMARY OF THE INVENTION

This disclosure provides bioelectrochemical systems and water treatment processes. Some bioelectrochemical systems include an anode, a saline solution chamber, and a cathode. The anode is at least partially positioned within an anode chamber containing an aqueous reaction mixture including one or more organic compounds and one or more bacteria for oxidizing the organic compounds. The saline solution chamber contains a draw solution and is separated from the anode chamber by a forward osmosis membrane. Water diffuses across the forward osmosis membrane from the aqueous reaction mixture to the draw solution.

Water treatment processes according to embodiments of this disclosure include delivering an aqueous reaction mixture to an anode chamber comprising one or more bacteria. The aqueous reaction mixture comprises one or more organic compounds that are oxidized by the one or more bacteria, thereby causing electrons to flow from an anode to a cathode. The water treatment processes also include delivering a draw solution to a saline solution chamber, where the saline solution chamber is separated from the anode chamber by a forward osmosis membrane. Water diffuses across the forward osmosis membrane from the aqueous reaction mixture to the draw solution, thereby diluting the draw solution.

Other aspects of the invention will become apparent by consideration of the detailed description and accompanying drawings.

DETAILED DESCRIPTION

Figure 1:
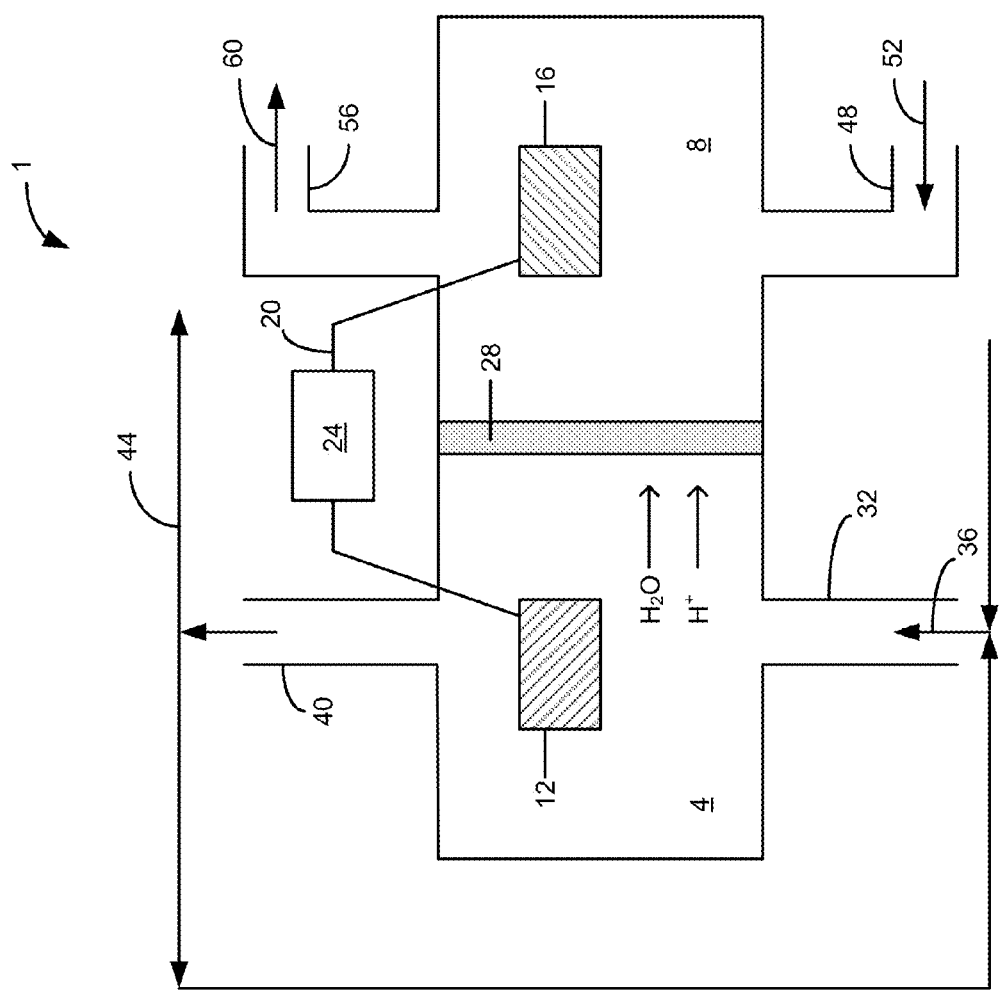
FIG. 1 is a schematic illustration of an exemplary osmotic microbial fuel cell (OsMFC).

This disclosure provides osmotic bioelectrochemical systems and methods for their use in the treatment of water. Osmotic bioelectrochemical systems may include, but are not limited to, systems comprising one or more osmotic microbial fuel cells (OsMFCs), and/or one or more osmotic microbial desalination cells (OsMDCs).

The term "semipermeable membrane," as used herein, refers to any porous membrane made from organic or inorganic materials through which solvent molecules can pass but only some solute particles (and/or substances) can pass, and by which other solute molecules are blocked, as determined by size, charge, solubility, chemical properties, etc.

The term "forward osmosis membrane," as used herein, refers to any semi-permeable membrane capable of blocking solute particles having a size of about 0.0001 microns or larger including, but not limited to, monovalent salts, ions, sugars, proteins, emulsions, viruses, and/or bacteria.

The term "microfiltration membrane," as used herein, refers to any semipermeable membrane capable of blocking solute particles having a size of about 0.1 microns or larger including, but not limited to, monovalent salts, ions, sugars, proteins, emulsions, viruses, and/or bacteria.

The term "ultrafiltration membrane," as used herein, refers to any semipermeablemembrane capable of blocking solute particles having a size of about 0.01 microns or larger including, but not limited to, proteins, emulsions, viruses, and/or bacteria.

The term "nanofiltration membrane," as used herein, refers to any semi-permeable membrane capable of blocking solute particles having a size of about 0.001 microns or larger including, but not limited to, ions, sugars, proteins, emulsions, viruses, and/or bacteria.

The term "anion exchange membrane," as used herein, refers to any membrane that substantially permits the passage of anions and substantially blocks cations.

The term "cation exchange membrane," as used herein, refers to any membrane that substantially permits the passage of cations and substantially blocks anions.

The term "saline solution," as used herein, refers to aqueous mixtures including dissolved salts. Saline solutions include, but are not limited to, brackish water, saline water, and brine.

The term "fresh water," as used herein, refers to water having less than 0.5 parts per thousand dissolved salts.

The term "brackish water," as used herein, refers to water having 0.5-30 parts per thousand dissolved salts.

The term "saline water," as used herein, refers to water having greater than 30-50 parts per thousand dissolved salts.

The term "brine," as used herein, refers to water having greater than 50 parts per thousand dissolved salts.

The term "wastewater," as used herein, refers to water containing organic material, particularly aqueous waste disposed from domestic, municipal, commercial, industrial and agricultural uses. For example, wastewater includes human and other animal biological wastes, and industrial wastes such as food processing wastewater.

The term "desalination," as used herein, refers to the separation of dissolved salts from saline solutions. For example, desalination refers to separation of halides, carbonates, phosphates and sulfates of sodium, potassium, calcium, lithium, magnesium, zinc or copper from aqueous mixtures. The term desalination encompasses both complete and partial removal of dissolved mineral salts from aqueous mixtures. The term "desalinated water," as used herein, refers to water that has undergone a desalination process.

The term "providing," as used herein, refers to any means of obtaining a subject item, such as an OsMFC, an OsMDC, an osmotic bioelectrochemical system, or one or more components thereof, from any source, including, but not limited to, making the item or receiving the item from another.

Osmotic Bioelectrochemical Systems, Generally

As indicated above, osmotic bioelectrochemical systems may include, but are not limited to, systems comprising one or more osmotic microbial fuel cells (OsMFCs), and/or one or more osmotic microbial desalination cells (OsMDCs). As will be appreciated from the discussion below, each osmotic bioelectrochemical system disclosed herein may include an anode at least partially positioned within an anode chamber containing an aqueous reaction mixture including one or more organic compounds and one or more bacteria for oxidizing the organic compounds, a saline solution chamber containing a draw solution and separated from the anode chamber by a forward osmosis membrane, and a cathode, where water diffuses across the forward osmosis membrane from the aqueous reaction mixture to the draw solution.

Osmotic Microbial Fuel Cells (OsMFCs) Generally

FIG. 1 schematically illustrates an exemplary OsMFC 1. Generally, OsMFCs 1 include an anode chamber 4, a cathode chamber 8, and an anode 12 and a cathode 16 at least partially positioned within the anode and cathode chambers, respectively. OsMFCs 1 further include a conduit 20 for electrons (e.g., a wire) that connects the anode 12 and the cathode 16 and may be coupled to a power source or load 24. OsMFCs 1 also include a forward osmosis membrane 28 positioned between the anode chamber 4 and the cathode chamber 8, such that the forward osmosis membrane 28 at least partially defines a shared wall between the anode and the cathode chambers. The anode chamber 4 and cathode chamber 8 each may be further defined by one or more additional walls formed of glass, metal, plastic, or any other suitable material. In some embodiments, as illustrated in FIG. 1, the anode chamber 4 and cathode chamber 8 may be positioned adjacent to one another, with the forward osmosis membrane 28 there between. In some embodiments, the anode chamber 4 may be defined by an outer wall that is at least partially formed of the forward osmosis membrane 28, and that at least partially defines an inner wall of the cathode chamber 8. In these embodiments, the cathode chamber 8 may at least partially surround the anode chamber 4, and further may be defined by one or more outer walls formed of glass, metal, plastic, or any other suitable material. Similarly, in some embodiments, the cathode chamber 8 may be defined by an outer wall that is at least partially formed of the forward osmosis membrane 28, and that at least partially defines an inner wall of the anode chamber 4. In these embodiments, the anode chamber 4 may at least partially surround the cathode chamber 8, and further may be defined by one or more outer walls formed of glass, metal, plastic, or any other suitable material. Any other suitable configuration may be used provided the anode chamber 4 and cathode chamber 8 share at least one wall that is at least partially defined by a forward osmosis membrane 28.

With continued reference to FIG. 1, the OsMFC anode chamber 4 includes an anode inlet 32 for receiving influent fluids 36, and an anode outlet 40 for discharging effluent fluids 44. Influent fluids 36 received by the anode chamber 4 and effluent fluids 44 discharged from the anode chamber 4 include aqueous solutions comprising one or more solutes, including, but not limited to, organic compounds and compositions (e.g., sugars, fats, bacteria, viruses, proteins, etc.), inorganic compounds, dissolved gases, and the like. Exemplary influent fluids 36 may include, but are not limited to, untreated wastewater (e.g., municipal, industrial or agricultural wastewater, etc.) and at least partially treated wastewater (e.g., effluent fluids 44 discharged from the anode chamber 4 through the anode outlet 40 and recycled back to the anode 12 inlet via a conduit, or effluent from an alternative wastewater treatment system). Exemplary effluent fluids 44 may include at least partially treated wastewater, which may include organic compounds and compositions, inorganic compounds and dissolved gases that were received through the anode inlet but were not formed in the anode chamber, as well as organic compounds and compositions and gases (e.g., hydrogen, carbon dioxide, methane, etc.) that were formed in the anode chamber during bacterial oxidation of organic compounds and compositions.

The OsMFC cathode chamber 8 similarly includes a cathode inlet 48 for receiving influent fluids 52, and a cathode outlet 56 for discharging effluent fluids 60. Influent fluids 52 received by the cathode chamber 8 may include, but are not limited to, saline solutions (e.g., brackish water, saline water, brine, etc.) and naturally occurring or artificially produced seawater. Effluent fluids 60 discharged from the cathode chamber 8 may include, but are not limited to, diluted saline solutions and/or any gases that may enter into the cathode chamber 8 during operation of the OsMFC 1. As discussed in more detail below, the cathode chamber influent fluid 52 may operate as a draw solution to facilitate transport of water across the forward osmosis membrane 28 from the anode chamber 4 to the cathode chamber 8, thereby diluting the draw solution.

It should be appreciated that OsMFCs 1 may have many different configurations, including those that are substantially different from the one shown in FIG. 1. For instance, some OsMFCs 1 may include multiple anode chambers 4 and/or multiple cathode chambers 8. The anode and cathode chambers, as defined by the forward osmosis membrane 28 and/or other chamber walls, may be any suitable shapes consistent with their functions. For example, the forward osmosis membrane 28 may be cylindrical or tubular such that one or more of the anode chamber 4 and cathode chamber 8 is cylindrical or tubular. Finally, the volumes of the chambers 4, 8 defined by the forward osmosis membrane 28 and/or additional walls can be varied to suit the specific needs for the source and product water that depend on the extent of dilution, organic loading, and current densities.

During operation of an OsMFC 1, an anode influent 36 containing one or more organic compounds or compositions (e.g., wastewater) may be delivered to and received by the anode chamber 4 via the anode inlet 32. The anode chamber 4 may contain one or more bacterial species (e.g., anodic bacterial species) for oxidizing the organic compounds and compositions in the aqueous reaction mixture to produce electrons and protons. The electrons may be transferred to the anode 12, and may pass through the conductive conduit 20 to the cathode 16, where the electrons may react with oxygen and protons to form water. The transport of electrons between the anode 12 and cathode 16 may create a charge differential between the anode 12 and cathode 16, thus causing protons to flow from the anode chamber 4 to the cathode chamber 8. Concurrently, cathode influent 52 (e.g., seawater or other saline solution) may be delivered to and received by the cathode chamber 8 via the cathode inlet 48. The solution within the cathode chamber 8 may act as a draw solution when it has a higher concentration of a solute (e.g., NaCl) than the solution within the anode chamber 4, thereby causing water to diffuse across the forward osmosis membrane 28 from the anode chamber 4 to the cathode chamber 8. The forward osmosis membrane 28 blocks diffusive transport of substantially all solutes, thereby separating water from the solutes present in the aqueous solution located in the anode chamber 4, and diluting the draw solution.

Figure 8:
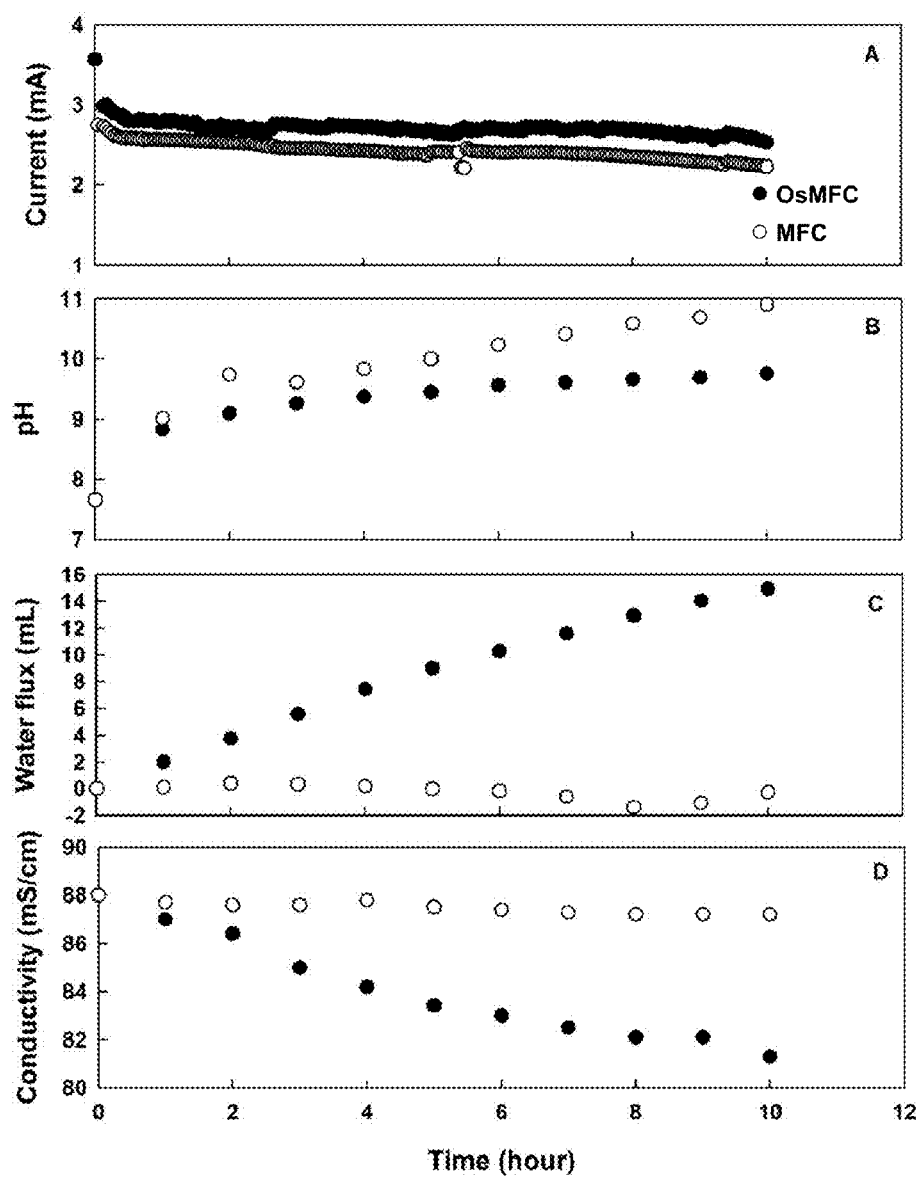
FIG. 8 is a series of four graphs showing a 10 hour test of an OsMFC and a MFC, in which (A) shows electric current generation, (B) shows pH, (C) shows water flux, and (D) shows conductivity, each as a function of time.

Surprisingly and unexpectedly, the diffusion or transport of water across the forward osmosis membrane 28 was found to increase proton transport from the anode chamber 4 into the cathode chamber 8, as evidenced by the fact that the solution in the cathode chamber 8 of an OsMFC 1 had a lower pH than the solution in the cathode chamber 8 of a conventional MFC having substantially the same structure and operating under substantially the same conditions (See FIG. 8B, discussed below). As such, more protons were available for a reduction reaction occurring at the cathode 16 in the OsMFC 1, and current generation was found to be surprisingly higher in the OsMFC 1 as compared to the conventional MFC (See FIG. 8A, discussed below). Accordingly, the use of the forward osmosis membrane 28 in the OsMFC 1 allows for simultaneous water extraction and faster proton transport as compared to a conventional MFC, which is unable to extract water and has slower proton transport and thus a lower capability for current generation.

Some OsMFCs 1 may be upflow MFCs (UMFCs). Specifically, as shown in FIG. 1, the inlet 32 may be positioned at the bottom of the anode chamber 4 and the outlet 40 may be positioned at the top of the anode chamber 4. Similarly, the inlet 48 may be positioned at the bottom of the cathode chamber 8 and the outlet 56 may be positioned at the top of the cathode chamber 8. Such an upflow design provides numerous benefits over designs that lack an upflow design. For example, the upflow design facilitates mixing of fluids within the respective chambers due to turbulent diffusion. This mixing inhibits the formation of Nernst diffusion layers around the anode 12 and/or concentration gradients within the anode and cathode chambers 4, 8. The upflow design also allows for easier collection of gases produced during microbial degradation. Finally, providing an upflow design for the anode chamber 4 helps ensure that the microbes within the anode chamber 4 remain in suspension. It should be appreciated that these same benefits may be achieved by upflow designs other than the one specifically discussed herein. For example, some OsMFCs 1 may include an anode chamber 4 or cathode chamber 8 comprising a fluid inlet positioned on or below a horizontal plane, and a fluid outlet positioned above the horizontal plane, where fluid flowing between the inlet and outlet flows substantially upwardly.

Some OsMFCs 1 may include flow obstacles within the anode chamber 4 and/or cathode chamber 8 to create turbulence and enhance mixing of liquids within the chambers (i.e., to facilitate mass transport). Exemplary flow obstacles may include, but are not limited to, nets, spiral channels, spacers, springs, and the like.

The OsMFCs 1 disclosed herein may be coupled to a power source or load 24. A control system may further be provided that selectively adjusts the amount of current and power produced by an OsMFC 1. Operating an OsMFC 1 at a maximum power point provides maximum energy production, which may be stored in an energy storage device, or used for downstream processes, such as downstream desalination process including, but not limited to, reverse osmosis and microbial desalination cells (MDCs). Moreover, the OsMFCs 1 disclosed herein may be coupled to an energy storage device to optimize operation at maximum power or current.

The OsMFCs 1 disclosed herein may be utilized in tandem with a reverse osmosis system to recycle the draw solution. The effluent 60 from the cathode chamber 8 (i.e., diluted draw solution) may be delivered to and received by the reverse osmosis system to remove water from the effluent, thereby concentrating the effluent 60 to yield a more concentrated solution. This more concentrated solution then may be delivered from the reverse osmosis system back to the cathode chamber 8 via the inlet 48, where it is reused as a draw solution. The combination of the OsMFC 1 and reverse osmosis system allows for the generation of fresh water and energy by removing organic contaminants and salts from wastewater via the OsMFC 1 while concurrently recycling or regenerating the draw solution to allow for continuous operation of the OsMFC 1.

Figure 2:
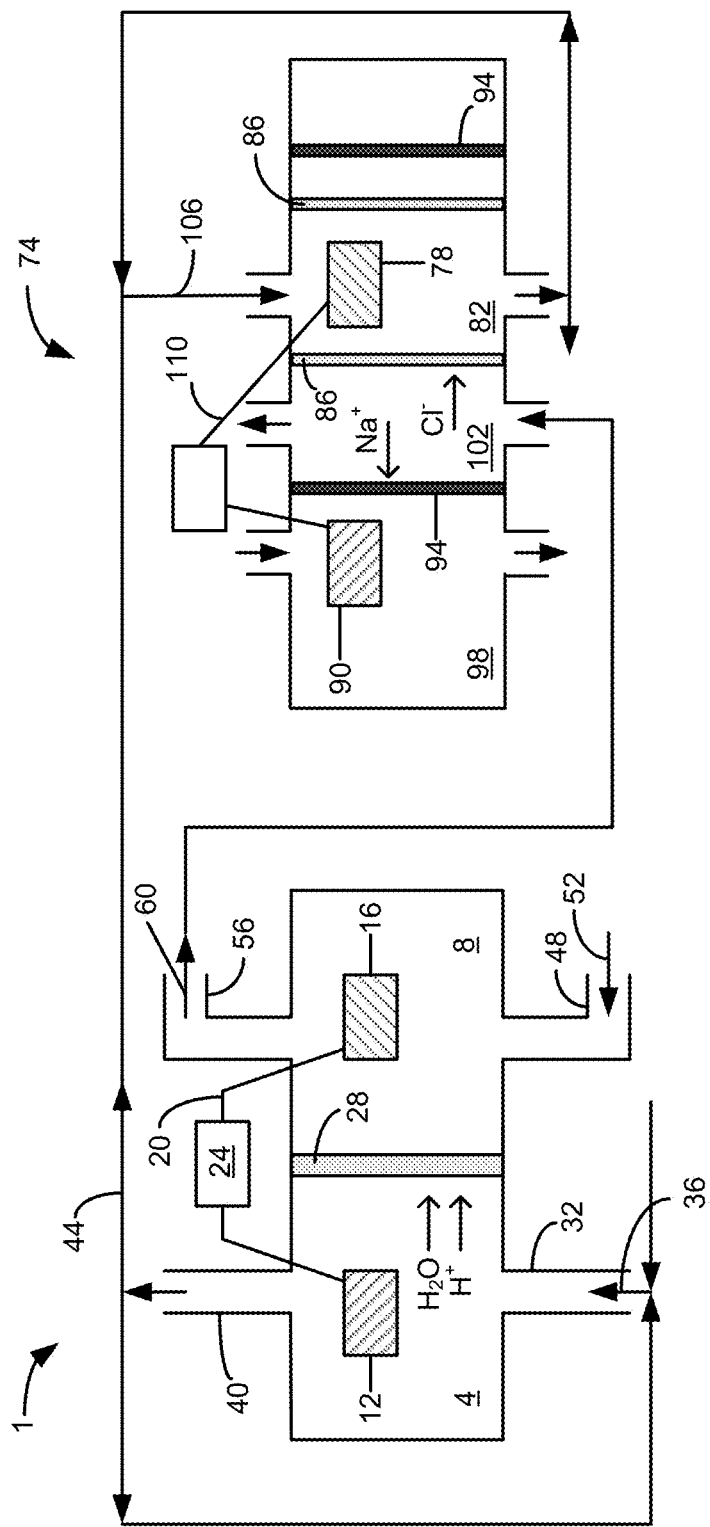
FIG. 2 is a schematic of an exemplary osmotic bioelectrochemical system comprising an OsMFC and a microbial desalination cell (MDC).

The OsMFCs 1 disclosed herein may be utilized in tandem with a microbial desalination cell (MDC) 74 when seawater is used as the draw solution and/or the draw solution does not need to be recycled, as shown in FIG. 2. MDCs 74 are known in the art, and are described in detail in U.S. patent application Ser. No. 13/160,929, the entire contents of which are incorporated by reference herein for all purposes. Generally, MDCs 74 include an anode 78, an anode chamber 82, an anion exchange membrane 86, a cathode 90, a cation exchange membrane 94, an optional cathode chamber 98 (MDCs 74 having an open-air cathode may not include a cathode chamber 98), and a saline solution chamber 102. The saline solution chamber 102 is positioned between the anode 78 and the cathode 90, and is separated from the anode 78 by the anion exchange membrane 86, and from the cathode 90 by the cation exchange membrane 94. When a solution 106 containing organic compounds is delivered to the anode chamber 82 of an MDC 74, bacterial oxidation of the organic compounds generates electrons and protons. Electrons pass from the anode 78 to the cathode 90 via a conduit 110 (e.g., a wire), thus generating a charge differential. When a saline solution containing anions ($Cl^-$) and cations ($Na^+$) is simultaneously delivered to the saline solution chamber 102, the charge differential causes the cations in the saline solution to move through the cation exchange membrane 94 toward the cathode 90, and causes anions in the saline solution to move through the anion exchange membrane 86 toward the anode 78, thereby desalinating the saline solution in the saline solution chamber 102 and maintaining a proper charge balance between the anode 78 and cathode 90. In a bioelectrochemical system comprising an OsMFC 1 in tandem with an MDC 74, effluent 44, 60 from the anode and cathode chambers 4, 8 of the OsMFC 1 can be delivered to or received by the anode and saline solution chambers 82, 102, respectively, of the MDC 74. As such, organic compounds and compositions in the effluent 44 discharged from the anode chamber 4 of the OsMFC 1 may be further oxidized in the anode chamber 82 of the MDC 74, and diluted draw solution 60 (e.g., diluted saline solution) discharged from the cathode chamber 8 of the OsMFC 1 may be desalinated in the saline solution chamber 102 of the MDC 74. This bioelectrochemical system may allow for highly efficient wastewater treatment, energy production, and water desalination.

Osmotic Microbial Desalination Cells (OsMDCs) Generally

Figure 3:
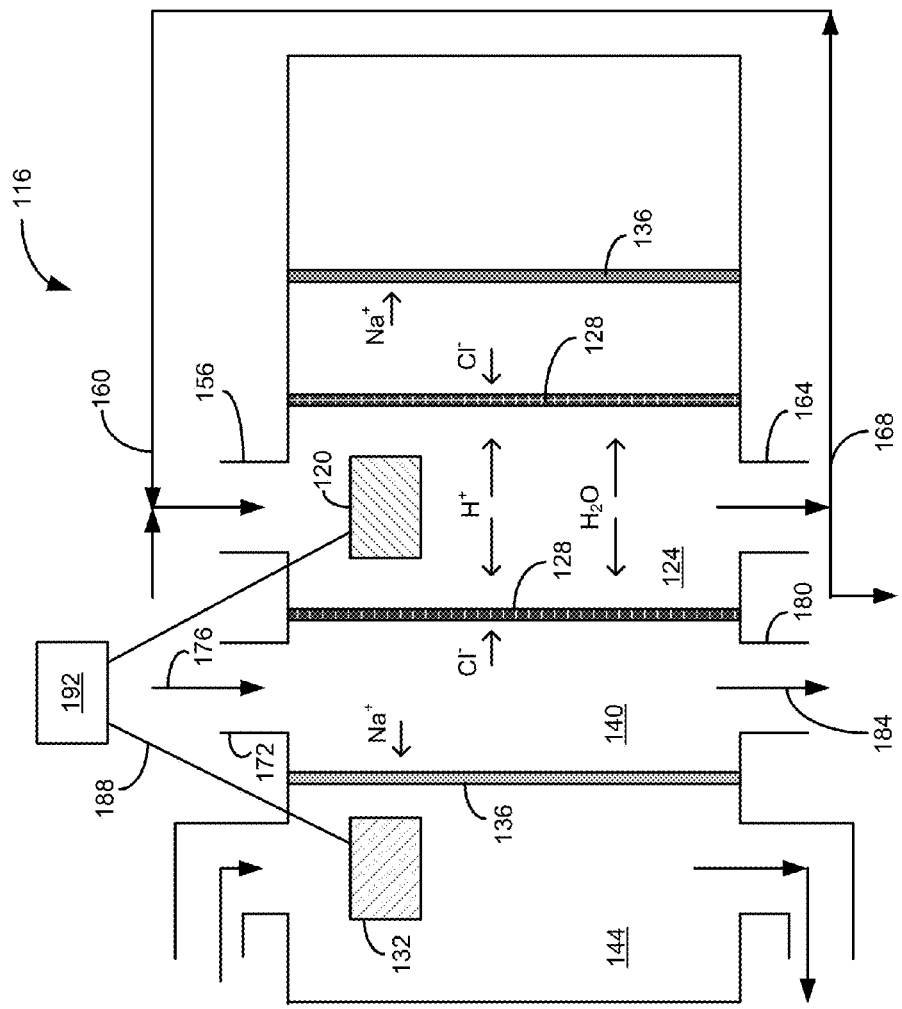
FIG. 3 is a schematic illustration of an exemplary osmotic microbial desalination cell. (OsMDC).
Figure 4:
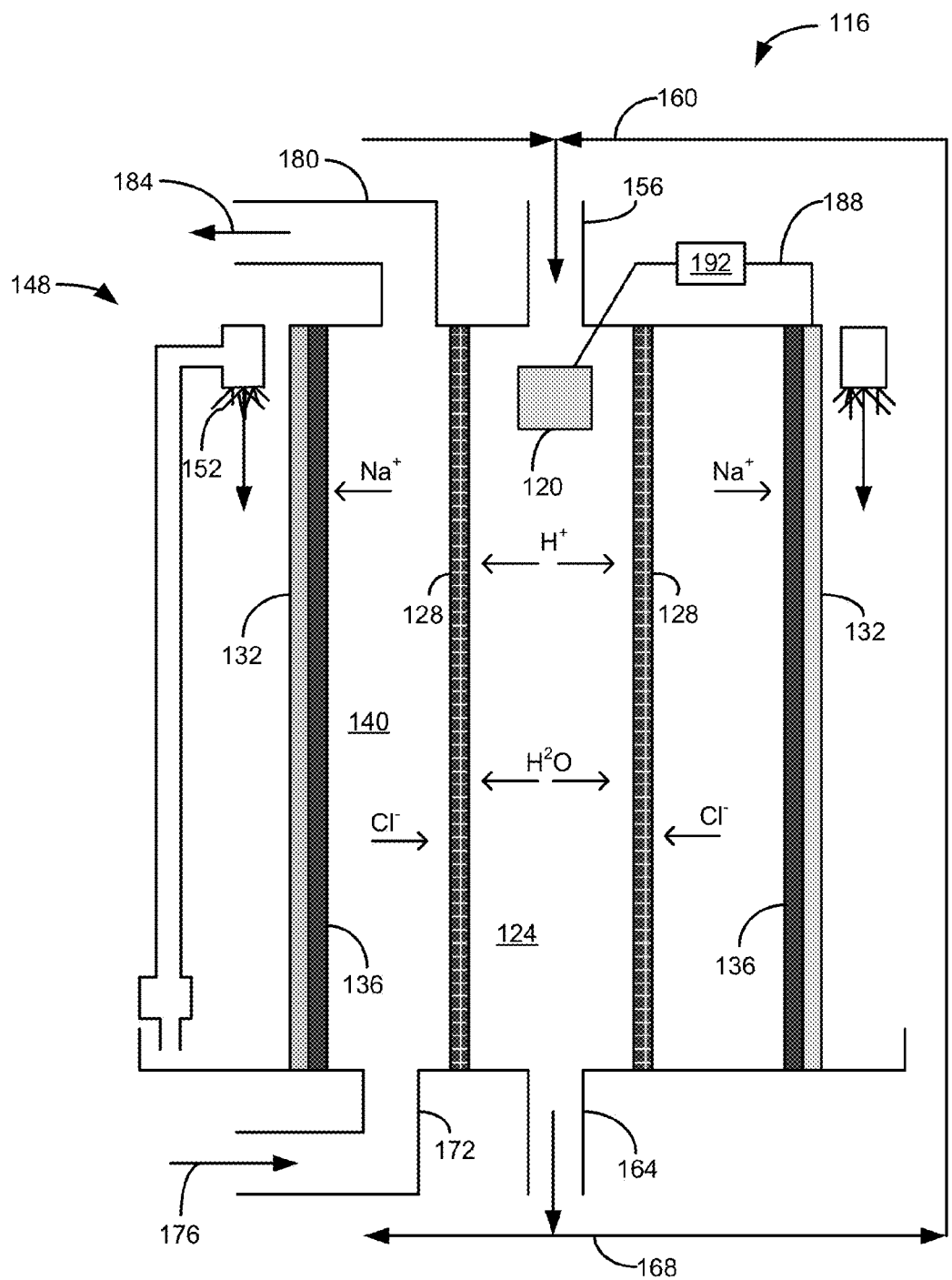
FIG. 4 is a schematic illustration of an alternative OsMDC.

FIGS. 3 and 4 are schematic illustrations of exemplary OsMDCs 116. Each may include an anode 120, an anode chamber 124, a forward osmosis membrane 128, a cathode 132, a cation exchange membrane 136, and a saline solution chamber 140. In contrast to a conventional MDC, the forward osmosis membrane 128 may be positioned between the anode 120 and the salt solution container 140 rather than an anion exchange membrane (or some other membrane that freely permits the diffusive transport of anions from the saline solution chamber 140 to the anode 120). OsMDCs 116 optionally may include a cathode chamber 144 for containing a catholyte (FIG. 3) or may lack a cathode chamber 144 and may instead have an open-air cathode 132 (FIG. 4). In embodiments having an open-air cathode 132, a cathode rinsing assembly 148 may be used to deliver catholyte 152 to the surface of the cathode 132, as is described in detail U.S. patent application Ser. No. 13/160,929, the entire disclosure of which is herein incorporated by reference for all purposes.

With continued reference to FIGS. 3 and 4, the anode chambers 124 of the OsMDCs 116 disclosed herein each include an anode inlet 156 for receiving influent fluids 160, and an anode outlet 164 for discharging effluent fluids 168. Influent fluids 156 received by the anode chamber 124 and effluent fluids 168 discharged from the anode chamber 124 include aqueous solutions comprising one or more solutes, including, but not limited to, organic compounds and compositions (e.g., sugars, fats, bacteria, viruses, proteins, etc.), inorganic compounds, dissolved gases, and the like. Exemplary influent fluids 160 may include, but are not limited to, untreated wastewater (e.g., municipal, industrial or agricultural wastewater, etc.) and at least partially treated wastewater (e.g., effluent 168 discharged from the anode chamber 124 through the anode outlet 164 and recycled back to the anode inlet 156 via a conduit, or effluent from an alternative wastewater treatment system). Exemplary effluent fluids 168 may include at least partially treated wastewater, which may include organic compounds and compositions, inorganic compounds and dissolved gases that were received through the anode inlet 156 but were not formed in the anode chamber 124, as well as organic compounds and compositions and gases (e.g., hydrogen, carbon dioxide, methane, etc.) that were formed in the anode chamber 124 during bacterial oxidation of organic compounds and compositions.

As indicated above, the saline solution chamber 140 is positioned between the anode 120 and the cathode 132, and is separated from the anode 120 by the forward osmosis membrane 128 and from the cathode 132 by the cation exchange membrane 136. The saline solution chamber 140 may include a saline solution chamber inlet 172 for receiving influent fluids 176, and a saline solution chamber outlet 180 for discharging effluent fluids 184. Influent fluids 176 received by the saline solution chamber 140 may include saline solutions (e.g., brackish water, saline water, brine, etc.), and naturally occurring or artificially produced seawater. Effluent fluids 184 discharged by the saline solution chamber 140 may include, but are not limited to, at least partially desalinated water and/or any gases that may enter into the salt solution chamber 140 during operation of the OsMDC 116.

It should be noted that the chambers 124, 140 of an OsMDC 116 may be entirely defined by the FO membrane 128 and the cation exchange membrane 136, as is shown in the exemplary embodiment of FIG. 4. In other words, the respective sides of the anode chamber 124 and the saline solution chamber 140 may be are constructed of the forward osmosis membrane 128 and the cation exchange membrane 136 themselves, and may not constructed of glass, metal, plastic or some other rigid material. This makes the OsMDCs 116 inexpensive and easy to construct, use and replace.

However, it should be appreciated that OsMDCs 116 may have many different configurations, including those shown in FIGS. 3 and 4, and others that are significantly different from those shown in FIGS. 3 and 4. These various configurations are described in detail U.S. patent application Ser. No. 13/160,929, save for the fact that the anion exchange membranes of the MDCs disclosed therein would in the present case be replaced by forward osmosis membranes 128.

During operation of an OsMDC 116, an aqueous solution containing one or more organic compounds (e.g., wastewater influent) is delivered to and received by the anode chamber 124 via the anode inlet 156. The anode chamber 124 may contain one or more bacterial species for oxidizing the organic compounds and compositions in the aqueous reaction mixture to thereby produce electrons and protons. The electrons may be transferred to the anode 120, and may pass through the conductive conduit 188 to the cathode 132, where the electrons may react with oxygen and protons to form water. This transport of electrons between the anode and cathode may create a charge differential between the anode 120 and cathode 132. In the meantime, saline solution (e.g. seawater influent) may be delivered to and received by the saline solution chamber 140 via the inlet 172, and cations in the saline solution diffuse across the cation exchange membrane 136 toward the cathode 132. Substantially no anions diffuse through the forward osmosis membrane 128 from the saline solution chamber 140 to the anode chamber 124, and as such, the saline solution in the saline solution chamber 140 is only partially desalinated. However, the saline solution within the saline solution chamber 140 instead functions as a draw solution when it has a higher concentration of a solute than the solution within the anode chamber 124, thereby causing water to diffuse across the forward osmosis membrane 128 from the anode chamber 124 to the saline solution chamber 140. The forward osmosis membrane 128 blocks diffusive transport of substantially all solutes, thereby separating water from the solutes present in the aqueous solution located in the anode chamber 124 and diluting the draw solution in the saline solution chamber 140.

Surprisingly and unexpectedly, OsMDCs 116 were more effective than conventional MDCs at producing an effluent 184 with a lower salt concentration from influent 176 having higher salt concentrations greater than about 10 g NaCl/L, as evidenced by the conductivity of the effluent leaving the saline solution chamber 140 (See FIG. 29B, discussed below). Specifically, when 10 g NaCl/L saline solutions were delivered to the saline solution chambers 140 of an OsMDC 116 and a conventional MDC having substantially the same structures, the OsMDC 116 and MDC each were found to produce effluent 184 having approximately the same conductivity. However, when the salt concentration of the influent 176 was increased from 10 g NaCl/L to 20 g NaCl/L, the OsMDC 116 was found to produce effluent 184 having a lower conductivity than was produced by the MDC, despite the fact that the OsMDC 116 cannot reduce the concentration of anions in the saline solution chamber 140 by diffusive transport to the anode chamber 124. In contrast, when 5 g NaCl/L saline solutions were delivered to the saline solution chambers 140 of the same OsMDC 116 and conventional MDC, the MDC was found to produce effluent having a lower conductivity. Neither of these results could have been ascertained or predicted without conducting the experiments described below. It should be noted that, even at 5 g NaCl/L, the OsMDC 116 was able to extract water from the anode chamber 124 and reduce the salinity of the draw solution. As such, OsMDCs 116 according to this disclosure can be operated with saline solution influents 176 having salt concentrations from about 0.5 g/L to about 200 g/L, such as from about 1 g/L to about 150 g/L, from about 5 g/L to about 100 g/L, from about 10 g/L to about 50 g/L, and from about 20 g/L to about 25 g/L. In some embodiments, the solute can be at least about 0.5 g/L, at least about 1 g/L, at least about 5 g/L, at least about 10 g/L, at least about 20 g/L, at least about 50 g/L, at least about 100 g/L, at least about 150 g/L, or at least about 200 g/L. Additionally, the solute in the draw solution can be any number of compounds including, but not limited to, NaCl, seawater, and brackish water.

In some embodiments, the OsMDC 116 may be an upflow microbial desalination cell (UMDC). Specifically, the inlet 156 may be positioned at the bottom of the anode chamber 124 and the outlet 164 may be positioned at the top of the anode chamber 124. Similarly, the inlet 171 may be positioned at the bottom of the saline solution chamber 140 and the outlet 180 may be positioned at the top of the saline solution chamber 140. Such an upflow design provides numerous benefits over designs that lack an upflow design. For example, the upflow design facilitates mixing of fluids within the respective chambers 124, 140 due to turbulent diffusion. This mixing inhibits the formation of Nernst diffusion layers around the anode 120 and/or concentration gradients within the anode and salt solution compartments 124, 140. The upflow design also allows for easier collection of gases produced during microbial degradation. Finally, providing an upflow design for the anode chamber 124 helps ensure that the microbes within the anode chamber 124 remain in suspension. It should be appreciated that these same benefits may be achieved by upflow designs other than the one discussed herein. For example, some OsMDCs 116 may include an anode chamber 124 or saline solution chamber 140 comprising a fluid inlet positioned on or below a horizontal plane, and a fluid outlet positioned above the horizontal plane, where fluid flowing between the inlet and outlet flows substantially upwardly.

In some embodiments, the OsMDC 116 may include flow obstacles within the anode chamber 124 and/or saline solution chamber 140 to create turbulence and enhance mixing of liquids within the chambers 124, 140 (i.e., to facilitate mass transport). Exemplary flow obstacles may include, but are not limited to, nets, spiral channels, spacers, springs, and the like.

The OsMDCs 116 disclosed herein may be coupled to a power source or load 192. As discussed in more detail in the Examples below, the rate that OsMDCs 116 desalinate and/or dilute saline solutions may be controlled by adjusting the potentials and current, such as by adjusting the resistance or applying power. Operating an OsMDC 116 at a maximum power point provides maximum energy production, which may be stored in an energy storage device, or used for downstream processes, such as downstream desalination processes like reverse osmosis and electrolysis. In contrast, operation at maximum current provides maximum desalination and/or dilution by the OsMDC 116, but little power is produced. A control system further may be provided that selectively adjusts the amount of current and power produced by an OsMDC 116. Moreover, the OsMDCs 116 disclosed herein may be coupled to an energy storage device to optimize operation at maximum power or current.

Electrodes

Electrodes included in the bioelectrochemical systems disclosed herein are electrically conductive. Exemplary conductive electrode materials include, but are not limited to, carbon paper, carbon cloth, carbon felt, carbon wool, carbon foam, carbon mesh, activated carbon, graphite, porous graphite, graphite powder, graphite granules, graphite fiber, a conductive polymer, a conductive metal, and combinations of any of these. A more electrically conductive material, such as a metal mesh or screen may be pressed against these materials or incorporated into their structure, in order to increase overall electrical conductivity of the electrode.

An anode and/or cathode may have any of various shapes and dimensions and may be positioned in various ways in relation to each other. For example, electrodes may be tubular, or cylindrical, where wastewater flows through tubes that are surrounded by saline solution to be desalinated (or vice versa). Electrodes may be placed in a co-cylindrical arrangement, or they can be wound as flat sheets into a spiral membrane device. Electrodes also may be square, rectangular, or any other suitable shape. The size of the electrodes may be selected based on particular applications. For example, the size of the anode relative to the cathode may be selected based on cost considerations, and considerations relating to performance. Moreover, where large volumes of substrates are to be treated in an OsMFC or an OsMDC, electrodes having larger surface areas or multiple electrodes may be used.

Typically, an OsMFC's and an OsMDC's anode provides a surface for transfer of electrons produced when microbes oxidize a substrate. As discussed below, anodophilic bacteria may be used that attach to and grow on the surface of the electrode, in which case the anode may be made of a material compatible with bacterial growth and maintenance. OsMFC and OsMDC anodes may be formed of granules, mesh or fibers of a conductive anode material, (e.g., such as graphite, carbon, metal, etc.) that provides a large surface area for contact with bacteria. In preferred embodiments, the anode may be a brush anode, such as a carbon brush anode.

OsMFC and OsMDC cathodes either may be an air electrode (i.e., having at least one surface exposed to air or gasses) or may be configured to be immersed in liquid. Preferably for an OsMDC, the cathode is an air electrode. A cathode preferably includes an electron conductive material. Materials that may be used for the cathode include, but are not limited to, carbon paper, carbon cloth, carbon felt, carbon wool, carbon foam, graphite, porous graphite, graphite powder, activated carbon, a conductive polymer, a conductive metal, and any combinations of these. In some embodiments, the cathode may comprise a catalyst, such as by mixing a catalyst with a polymer and a conductive material such that a membrane includes a conductive catalyst material integral with the membrane. For example, a catalyst may be mixed with a graphite or carbon coating material, and the mixture may be applied to a surface of a cation exchange material. Suitable catalysts may include, but are not limited to, metals (e.g., platinum, nickel, copper, tin, iron, palladium, cobalt, tungsten, alloys of such metals, etc.) as well as CoTMPP, carbon nanotubes and/or activated carbon, among others.

One or more additional coatings may be placed on one or more electrode surfaces. Such additional coatings may be added to act as diffusion layers, for example. A cathode protective layer, for instance, may be added to prevent contact of bacteria or other materials with the cathode surface while allowing oxygen diffusion to the catalyst and conductive matrix.

Membranes

Forward osmosis membranes are semi-permeable membranes capable of blocking solute particles having a size of about 0.0001 microns or larger including, but not limited to, monovalent salts, ions, sugars, proteins, emulsions, viruses, and/or bacteria. Forward osmosis membranes, also known as reverse osmosis membranes, are well known in the art, and are described in detail in U.S. Pat. Nos. 3,671,516; 3,657,401; 3,789,983; 3,894,116; 3,926,798; 4,062,782; 4,214,994; 4,259,183; 4,909,943; 6,177,011; 6,171,497; 7,490,725; 8,177,978, the complete disclosures of which are herein incorporated by reference for all purposes.

Cation exchange membranes are membranes that substantially permit the passage of (i.e., are permeable to) cations and substantially block (i.e., are impermeable to) anions. Cation exchange membranes described herein are disposed between the cathode and the saline solution chamber of an OsMDC or a conventional MDC, thereby forming a cation selective barrier there between. Cation exchange membranes may include, but are not limited to, ion-functionalized polymers exemplified by perfluorinated sulfonic acid polymers such as tetrafluoroethylene and perfluorovinylether sulfonic acid copolymers, and derivatives thereof; sulfonate-functionalized poly(phenylsulfone); and sulfonic acid functionalized divinylbenzene cross-linked poly(styrene), among others. Specific examples include NAFION, such as NAFION 117, and derivatives produced by E.I. DuPont de Nemours & Co., Wilmington, Del., and CMI-7000 cation exchange membranes from Membrane International Inc., NJ, USA, among others. Also suitable are other varieties of sulfonated copolymers, such as sulfonated poly(sulfone)s, sulfonated poly(phenylene)s, and sulfonated poly(imides)s, and variations thereof.

Anion exchange membranes are membranes that substantially permit the passage of (i.e., are permeable to) anions and substantially block (i.e., are impermeable to) cations. Anion exchange membranes described herein are disposed between the anode chamber and the saline solution chamber of conventional MDCs, thereby forming an anion selective barrier there between. Anion exchange membranes may include, but are not limited to, quaternary ammonium-functionalized poly(phenylsulfone); and quaternary ammonium-functionalized divinylbenzene cross-linked poly(styrene). Specific examples include, but are not limited to, AMI ion exchange membranes (e.g., AMI-7001) made by Membranes International, Inc. New Jersey, USA, AHA and A201 made by Tokuyama Corporation, JAPAN, and FAA made by Fumatech, GERMANY, among others.

Microbes

Microbes that may be used with the OsMFCs and OsMDCs of this disclosure may include, but are not limited to, anodophilic bacteria, and exoelectrogens, among others. Anodophilic bacteria refer to bacteria that transfer electrons to an electrode, either directly or by endogenously produced mediators. In general, anodophilic bacteria are obligate or facultative anaerobes. Examples of bacteria that may be used with the OsMFCs and OsMDCs disclosed herein include, but are not limited to bacteria selected from the families Aeromonadaceae, Alteromonadaceae, Clostridiaceae, Comamonadaceae, Desulfuromonaceae, Enterobacteriaceae, Geobacteraceae, Pasturellaceae, and Pseudomonadaceae. These and other examples of bacteria suitable for use in the OsMFCs and OsMDCs disclosed herein are described in Bond, D. R., et al., Science 295, 483-485, 2002; Bond, D. R. et al., Appl. Environ. Microbiol. 69, 1548-1555, 2003; Rabaey, K., et al., Biotechnol, Lett. 25, 1531-1535, 2003; U.S. Pat. No. 5,976,719; Kim, H. J., et al., Enzyme Microbiol. Tech. 30, 145-152, 2002; Park, H. S., et al., Anaerobe 7, 297-306, 2001; Chauduri, S. K., et al., Nat. Biotechnol., 21:1229-1232, 2003; Park, D. H. et al., Appl. Microbiol. Biotechnol., 59:58-61, 2002; Kim, N. et al., Biotechnol. Bioeng., 70:109-114, 2000; Park, D. H. et al., Appl. Environ. Microbiol., 66, 1292-1297, 2000; Pham, C. A. et al., Enzyme Microb. Technol., 30: 145-152, 2003; and Logan, B. E., et al., Trends Microbiol., 14 (12):512-518.

Anodophilic bacteria preferably are in contact with an anode for direct transfer of electrons to the anode. However, in the case of bacteria which transfer electrons through a mediator, the bacteria may be present elsewhere in the anode chamber and still function to produce electrons transferred to the anode.

Anodophilic bacteria may be provided as a purified culture, enriched in anodophilic bacteria, or enriched in a specified species of bacteria, if desired. A mixed population of bacteria also may be provided, including anodophilic anaerobes and other bacteria. Finally, bacteria may be obtained from a wastewater treatment plant. Regardless of the source, the bacteria may be used to inoculate the anode.

Substrates

Substrates that may be used with OsMFCs and OsMDCs of this disclosure include substrates that are oxidizable by bacteria or biodegradable to produce a material oxidizable by bacteria. Bacteria can oxidize certain inorganic as well as organic materials. Inorganic materials oxidizable by bacteria are well-known in the art and illustratively include hydrogen sulfide. A biodegradable substrate is an organic material biodegradable to produce an organic substrate oxidizable by bacteria. Any of various types of biodegradable organic matter may be used as "fuel" for bacteria in an OsMFC and an OsMDC, including carbohydrates, amino acids, fats, lipids and proteins, as well as animal, human, municipal, agricultural and industrial wastewaters. Naturally occurring and/or synthetic polymers illustratively including carbohydrates such as chitin and cellulose, and biodegradable plastics such as biodegradable aliphatic polyesters, biodegradable aliphatic-aromatic polyesters, biodegradable polyurethanes and biodegradable polyvinyl alcohols. Specific examples of biodegradable plastics include polyhydroxyalkanoates, polyhydroxybutyrate, polyhydroxyhexanoate, polyhydroxyvalerate, polyglycolic acid, polylactic acid, polycaprolactone, polybutylene succinate, polybutylene succinate adipate, polyethylene succinate, aliphatic-aromatic copolyesters, polyethylene terephthalate, polybutylene adipate/terephthalate and polymethylene adipate/terephthalate.

Organic substrates oxidizable by bacteria are known in the art. Illustrative examples of an organic substrate oxidizable by bacteria include, but are not limited to, monosaccharides, disaccharides, amino acids, straight chain or branched C1-C7 compounds including, but not limited to, alcohols and volatile fatty acids. In addition, organic substrates oxidizable by bacteria include aromatic compounds such as toluene, phenol, cresol, benzoic acid, benzyl alcohol and benzaldehyde. Further organic substrates oxidizable by bacteria are described in Lovely, D. R. et al., Applied and Environmental Microbiology 56:1858-1864, 1990. In addition, a substrate may be provided in a form which is oxidizable by bacteria or biodegradable to produce an organic substrate oxidizable by bacteria. Specific examples of organic substrates oxidizable by bacteria include glycerol, glucose, sodium acetate, butyrate, ethanol, cysteine and combinations of any of these or other oxidizable organic substances. Substrates also may include municipal and industrial wastewater, organic wastes and some inorganic compounds, including, but not limited to ammonium and sulfides.

Reaction Conditions within Anode Chamber

An aqueous medium in an anode chamber of the OsMFCs and OsMDCs disclosed herein may be formulated to be non-toxic to bacteria in contact with the aqueous medium. Further, the medium or solvent may be adjusted to a be compatible with bacterial metabolism, for instance, by adjusting its pH to be in the range between about pH 3-9, preferably about 5-8.5, inclusive, by adding a buffer to the medium or solvent if necessary, and/or by adjusting the osmolarity of the medium or solvent by dilution or addition of a osmotically active substance. Ionic strength may be adjusted by dilution or addition of a salt for instance. Further, nutrients, cofactors, vitamins and/or other such additives may be included to maintain a healthy bacterial population, if desired. Reaction temperatures may be in the range of about 10-40° C. for non-thermophilic bacteria, although OsMFCs and OsMDCs may be used at any temperature in the range of 0 to 100° C., inclusive by including suitable bacteria for growing at selected temperatures. However, maintaining a reaction temperature above ambient temperature may require energy input, and as such, it may be preferred to maintain the reactor temperature at about 15-25° C., without input of energy.

In operation, reaction conditions, such as pH, temperature, osmolarity, and ionic strength of the medium in the anode compartment, may be variable, or may change over time.

Embodiments of inventive compositions and methods are illustrated in the following examples. These examples are provided for illustrative purposes and are not considered limitations on the scope of inventive compositions and methods.

EXAMPLES

Example 1

Integrating Forward Osmosis (FO) into a Microbial Fuel Cell (MFC) to Create an Osmotic Microbial Fuel Cell (OsMFC)

A three-compartment osmotic bioelectrochemical system was constructed that had two cathodes sharing the same anode, thereby creating two MFCs, namely, an OsMFC and a conventional MFC. The system was used to compare the performance of the OsMFC to the conventional MFC. By using such an arrangement, we expect to minimize the effect that a different anode may have on the experimental performance parameters. Electricity generation and water flux were examined with either NaCl solution or seawater as a catholyte (i.e., draw solution).

A. Materials and Methods

1. Osmotic Bioelectrochemical System Setup

Figure 5:
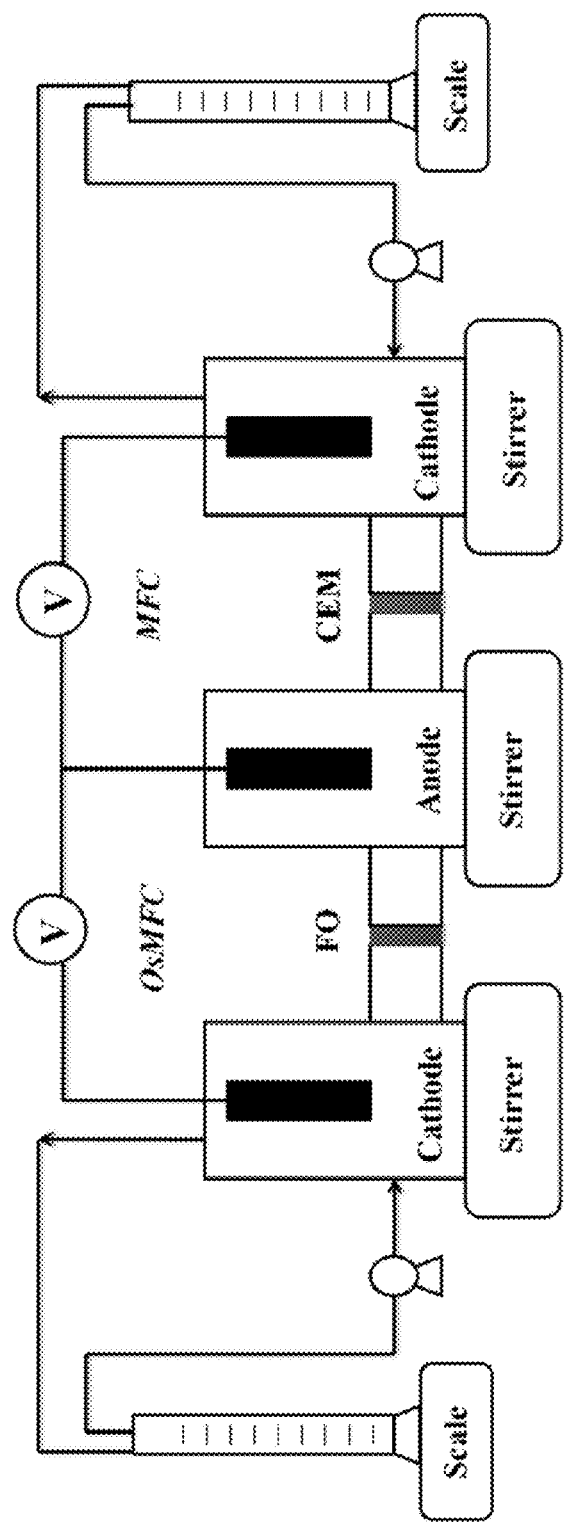
FIG. 5 is a schematic illustration of a three-compartment osmotic bioelectrochemical system.

The MFC system consisted of three equal-size compartments: two cathodes and one anode (FIG. 5). The total liquid volume of each compartment was 140 mL. The compartments were glass bottles jointed by either a forward osmosis (FO) membrane (Hydration Technology Innovations, LLC., Albany, Oreg.) to form an OsMFC or a cation exchange membrane (CEM) (Membrane International Inc., Ringwood, N.J.) to form a conventional MFC. The surface area of each membrane was about 4.9 $cm^2$. The anode electrode was a carbon brush (Gordon Brush Mfg. Co. Inc., Commerce, Calif.) that was pre-treated by being immersed overnight in acetone and heated at 450° C. for 30 min, and pre-acclimated in the MFC and OsMFC for biofilm formation. The original anode inocula to develop the biofilm were a mix of aerobic and anaerobic sludge from a local wastewater treatment facility (South Shore, Milwaukee, Wis.). The cathode electrodes (surface area of 24 $cm^2$/each) were carbon cloth (Zoltek Corporation, St. Louis, Mo.) with platinum as a catalyst (0.3 mg Pt/$cm^2$). The electrodes were connected by copper wires to resistance decade boxes that were used to adjust the external resistance between the anode and the cathodes. All the compartments were continuously stirred with magnetic bars. One graduated cylinder with a scale on the bottom was linked to each cathode chamber for measurement of water flux.

2. Operating Conditions.

The OsMFC and MFC were operated under a room temperature of about 20° C. The anode was continuously fed at a hydraulic retention time (HRT) of 1 day (d). The anode feeding solution (i.e., artificial wastewater) was prepared containing (per L of tap water): sodium acetate, 2 g; $NH_4Cl$, 0.15 g; NaCl, 0.5 g; $MgSO_4$, 0.015 g; $CaCl_2$, 0.02 g; $NaHCO_3$, 0.1 g; $KH_2PO_4$, 0.53 g; $K_2HPO_4$, 1.07 g; and trace element, 1 mL. The cathodes were operated in two ways, depending on the draw solution used in the OsMFC and MFC. First, when NaCl solution was used as the draw solution, the cathodes were operated in batch mode and the catholytes were completely replaced at the end of each measurement cycle. The catholytes were recirculated at a flow rate of 20 mL/min. Phosphate buffer solution (50 mM) that contained 2.65 g/L of $KH_2PO_4$ and 5.35 g/L of $K_2HPO_4$ was used as a comparison to NaCl solution in the polarization test. Second, when (artificial) seawater was used as the draw solution, the cathodes were operated in continuous mode at a HRT of 2 d. Seawater (35 g/L) was prepared by dissolving aquarium sea salts (Instant Ocean, Aquarium Systems, Inc., Mentor, Ohio) in tap water. Air was supplied to both cathodes at a flow rate of 15 $cm^3$/min under all the testing conditions.

3. Measurement and Analysis.

The cell voltage was recorded every 3 min by a digital multimeter (2700, Keithley Instruments, Inc., Cleveland, Ohio). The pH was measured using a Benchtop pH meter (Oakton Instruments, Vernon Hills, Ill., USA). The conductivity was measured by a Benchtop conductivity meter (Mettler-Toledo, Columbus, Ohio). The concentration of chemical oxygen demand (COD) was measured using a colorimeter according to the manufacturer's procedure (Hach DR/890, Hach Company, Loveland, Colo.). The polarization curve was performed by a potentiostat (Reference 600, Gamry Instruments, Warminster, Pa.) at a scan rate of 0.1 mV/s. The power density and current density were calculated based on the anode liquid volume. Water flux into the cathodes was measured by using digital scales for the change of water weight within a period of time. Water flux was either expressed in mL or calculated as liter per surface area of the membrane per hour ($L\ m^{-2}\ h^{-1}$).

B. Results

1. NaCl Solution as the Catholyte (Draw Solution)

Figure 6:
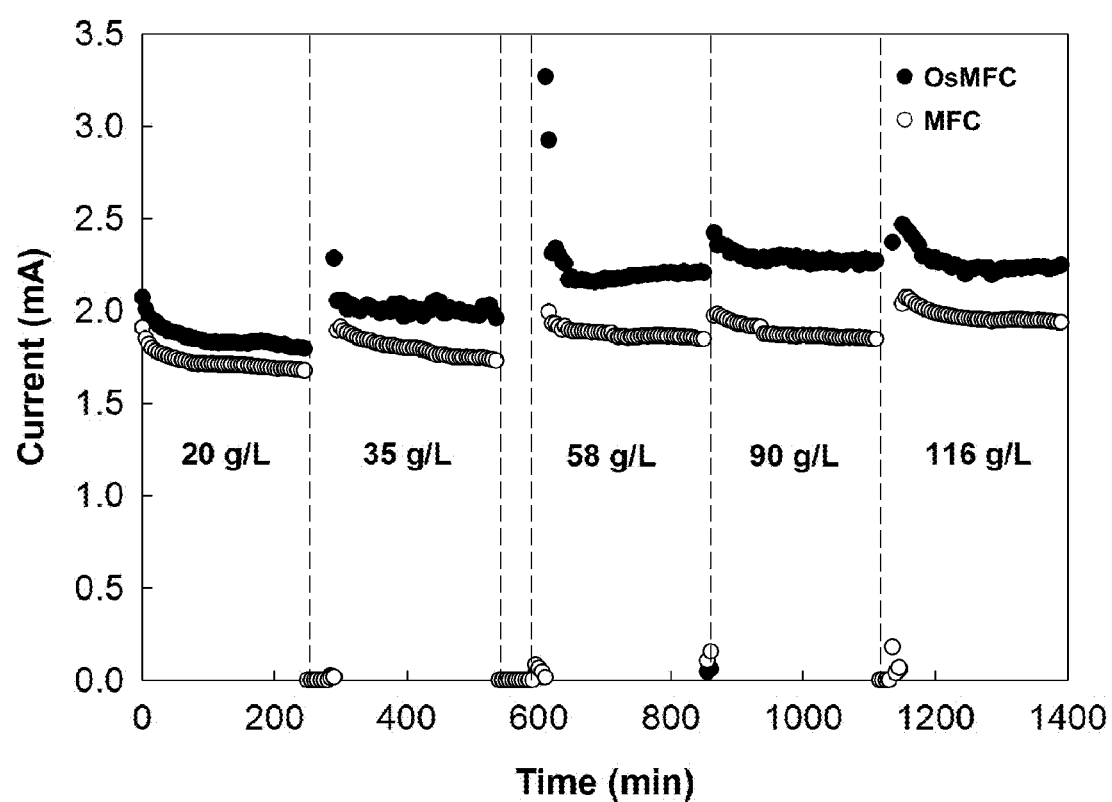
FIG. 6 is a graph showing electric current generation as a function of time for different concentrations of NaCl for an OsMFC and a MFC.

Electricity production was observed in both the OsMFC and MFC when NaCl solution was used as the catholyte, demonstrating that FO membranes can act as a separator in MFCs without negative influence on electricity generation. Because NaCl solution also functions as a draw solution and high concentrations are applied to achieve more osmotic pressure, the performance of two MFCs with catholyte salinity between 20 and 116 g NaCl/L were examined. As shown in FIG. 6, the experiment showed that electricity generation was obtained from both the MFC (open circles) and OsMFC (filled circles) under all the tested salinity conditions, and high salinity increased current generation, especially in the OsMFC. In general, the OsMFC produced more electricity than the MFC and the difference of current production between the two OsMFC and MFC became more notable at higher salinity.

Figure 7:
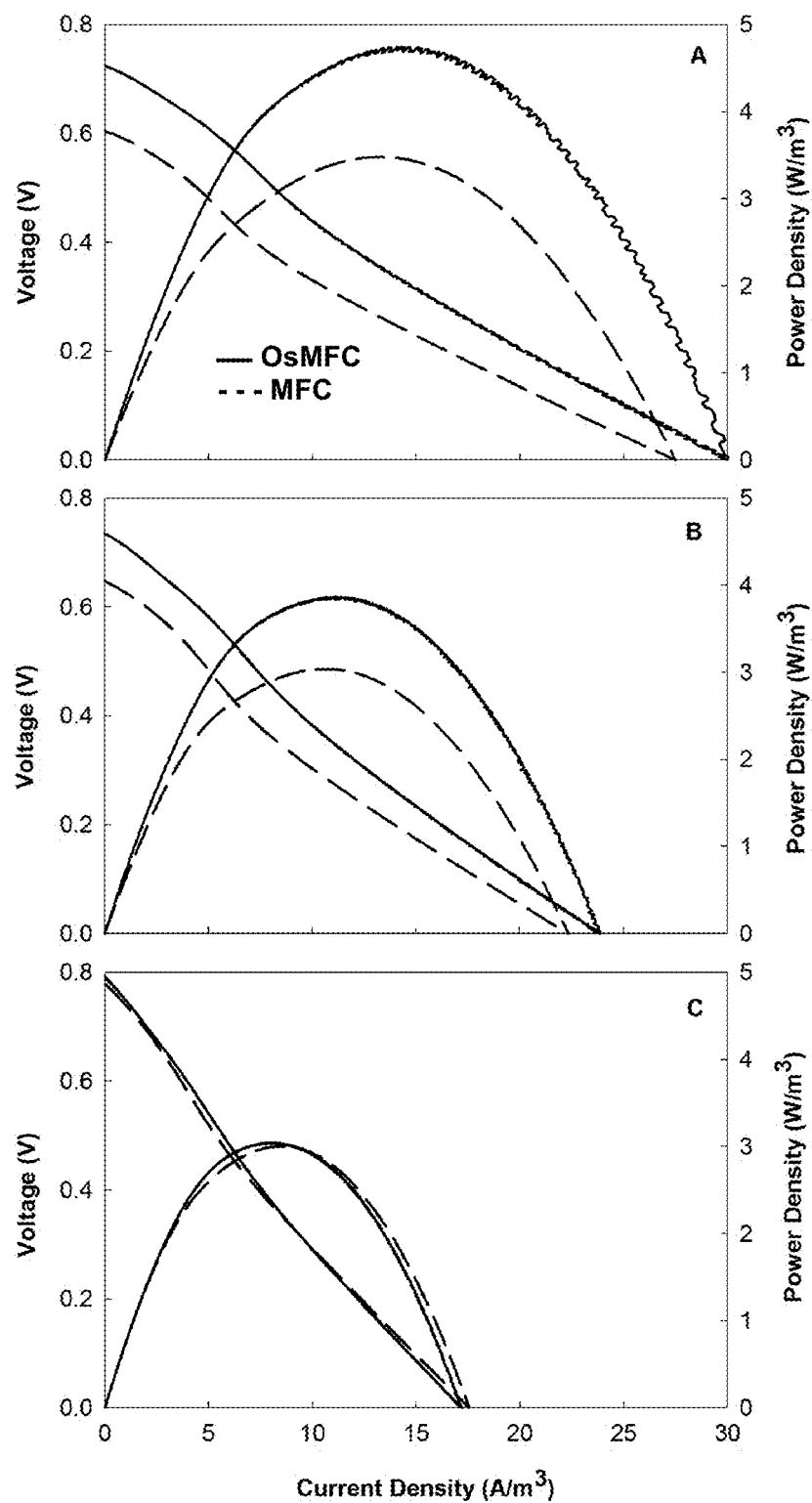
FIG. 7 is a series of three graphs showing polarization curves for an OsMFC and a MFC with different catholytes, in which (A) shows polarization curves with 58 g NaCl/L, (B) shows polarization curves with 20 g NaCl/L, and (C) shows polarization curves with 50 mM phosphate buffered solution.

As shown in FIG. 7, polarization tests confirmed more electricity production in the OsMFC (solid lines) relative to the MFC (dashed lines) with a significant influence from the catholyte salinity. With a catholyte of 58 g NaCl/L, the maximum power density of the OsMFC was 4.74 W/m$^3$, higher than the 3.48 W/m$^3$ of the MFC (FIG. 7A). Likewise, the OsMFC generated a higher short-circuit current density of 30.01 A/m$^3$ than the 27.47 A/m$^3$ of the MFC. The open circuit potentials were 0.72 and 0.60 V for the OsMFC and the MFC, respectively. A lower salinity of 20 g NaCl/L still resulted in an obvious difference between the two OsMFC and MFC, although the maximum power density of the OsMFC decreased to 3.85 W/m$^3$ (FIG. 7B), almost 19% lower than that at 58 g NaCl/L. Meanwhile, the MFC produced a maximum power density of 3.04 W/m$^3$. Replacement of NaCl solution with 50 mM phosphate buffer solution in the cathode chambers led to a similar performance between the MFC and OsMFC with almost identical maximum power density, short-circuit current, and open circuit potential (FIG. 7C). The open circuit potentials of both the MFC and OsMFC reached 0.79 V with the phosphate buffer solution. It is worth noting that the maximum power density of the MFC had a relatively small change from 3.85 W/m$^3$ at 58 g NaCl/L to 3.00 W/m$^3$ at 50 mM phosphate buffer solution, although the short-circuit current density dropped; while the OsMFC decreased more significantly from 4.74 to 3.05 W/m$^3$. The lower open circuit potentials of both the OsMFC and MFC at higher salinity were possibly the results of less dissolved oxygen in water with high salinity, and more power production was likely due to higher conductivity.

Since the OsMFC and MFC shared the same anode, the difference in electricity production was expected to result from the cathodes (e.g., cathode electrodes and cathode reactions). To exclude the possibility that the difference in cathode electrodes (e.g., electrode surface area and Pt loading rate) contributed to the different electricity generation, the cathode electrodes were exchanged between the two OsMFC and MFC for a short period of time and polarization tests were conducted with a catholyte of 58 g NaCl/L again. Similar results to FIG. 7A were obtained (data not shown), suggesting a minimal effect from the electrodes.

A continuous monitoring of the performance parameters of the OsMFC and MFC performance parameters during a period of 10 hours revealed that the pH of the catholyte may have played an important role in electricity production and in the difference between the OsMFC and MFC.

As shown in FIG. 8A, during the testing period, current generation for the OsMFC (closed circles) decreased from 2.97 to 2.52 mA, and current generation for the MFC (open circles) dropped from 2.74 to 2.18 mA. The decrease in current was likely due to the increase in the catholyte pH (FIG. 8B). The OsMFC and MFC were operated as semi-batch: the anolyte was continuously pumped through the anode chamber while the catholytes were maintained the same during the test. The pH of the anolyte was constantly below 7; thus, a higher catholyte pH would result in a larger pH gradient between the anode and the cathode, which tends to cause more overpotential. However, the OsMFC and MFC exhibited different pH increases. The initial pH of the catholyte was 7.66 for both the OsMFC and MFC. After 10-h operation of electricity generation, the pH of the OsMFC catholyte (closed circles) increased to 9.76 and the pH of the MFC catholyte (open circles) increased to 10.90 (FIG. 8B). The lower catholyte pH of the OsMFC likely resulted in its better performance with regards to electricity generation, and the difference in catholyte pH between the OsMFC and MFC was probably caused by water flux in the OsMFC.

Figure 9:
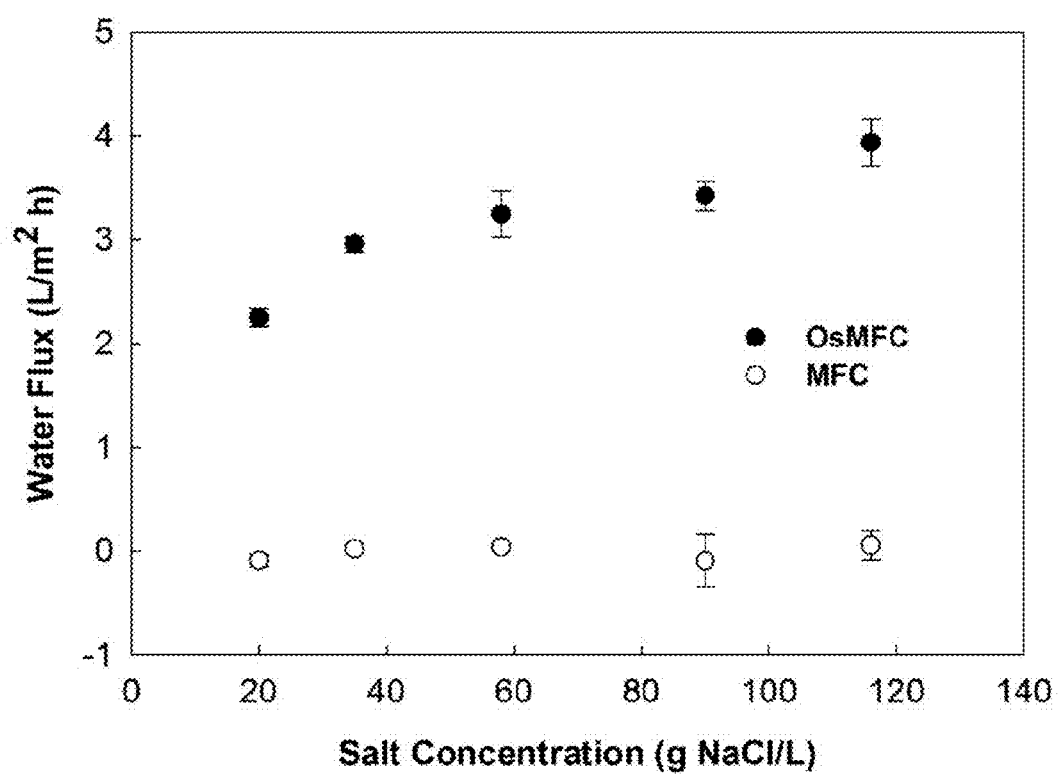
FIG. 9 is a graph showing water flux as a function of [NaCl] for an OsMFC and a MFC.

Water flux is a distinct feature of OsMFCs relative to conventional MFCs. With a FO membrane as a separator and high salinity (osmotic pressure) in the cathode chamber, water can flow fairly readily via diffusion from the anode chamber into the cathode chamber, as shown in FIGS. 8C and D, which show the 10-h tests for water flux and conductivity of the OsMFC and the MFC. As shown in FIG. 8C, approximately 15 mL of water was added to the cathode chamber of the OsMFC (closed circles) while no obvious water increase was observed with the MFC cathode chamber (open circles). As shown in FIG. 8D, the additional water in the cathode chamber of the OsMFC (closed circles) diluted the catholyte and reduced its conductivity from 88.0 to 81.3 mS/cm, whereas the catholyte in the MFC (open circles) maintained its conductivity at about 87-88 mS/cm throughout the 10-h test. As shown in FIG. 9, water flux (measured at 4 hours) also was examined at different salt concentrations for the OsMFC (closed circles) and the MFC (open circles). Incrementally increasing the salinity of the cathode influent from 20 to 116 g NaCl/L caused the water flux in the OsMFC from the anode to cathode chamber to increase from 2.25±0.08 to 3.94±0.22 L m$^{-2}$ h$^{-1}$. In contrast, the MFC did not exhibit an obvious increase in water flux.

Water flux thus appears to facilitate the transport of protons from the anode chamber to the cathode chamber, thereby supporting the cathode reaction and buffering the increased pH, as demonstrated by higher electricity production and lower catholyte pH in the OsMFC with high-salinity catholyte. The results also surprisingly and unexpectedly indicate that a proactive proton movement through the FO membrane due to water flux is more efficient than ion exchange with a cation exchange membrane. This is an important implication to the future improvement of MFC performance. When 50 mM of phosphate buffer solution replaced high-concentration NaCl solution, the difference in osmotic pressures across the FO membrane became smaller and no significant water flow was expected. Consequently, proton movement via the FO membrane did not exhibit significant advantage over the cation exchange membrane and thus both the OsMFC and MFC produced a similar amount of electricity (FIG. 7C).

2. Seawater as Catholyte/Draw Solution

Figure 10:
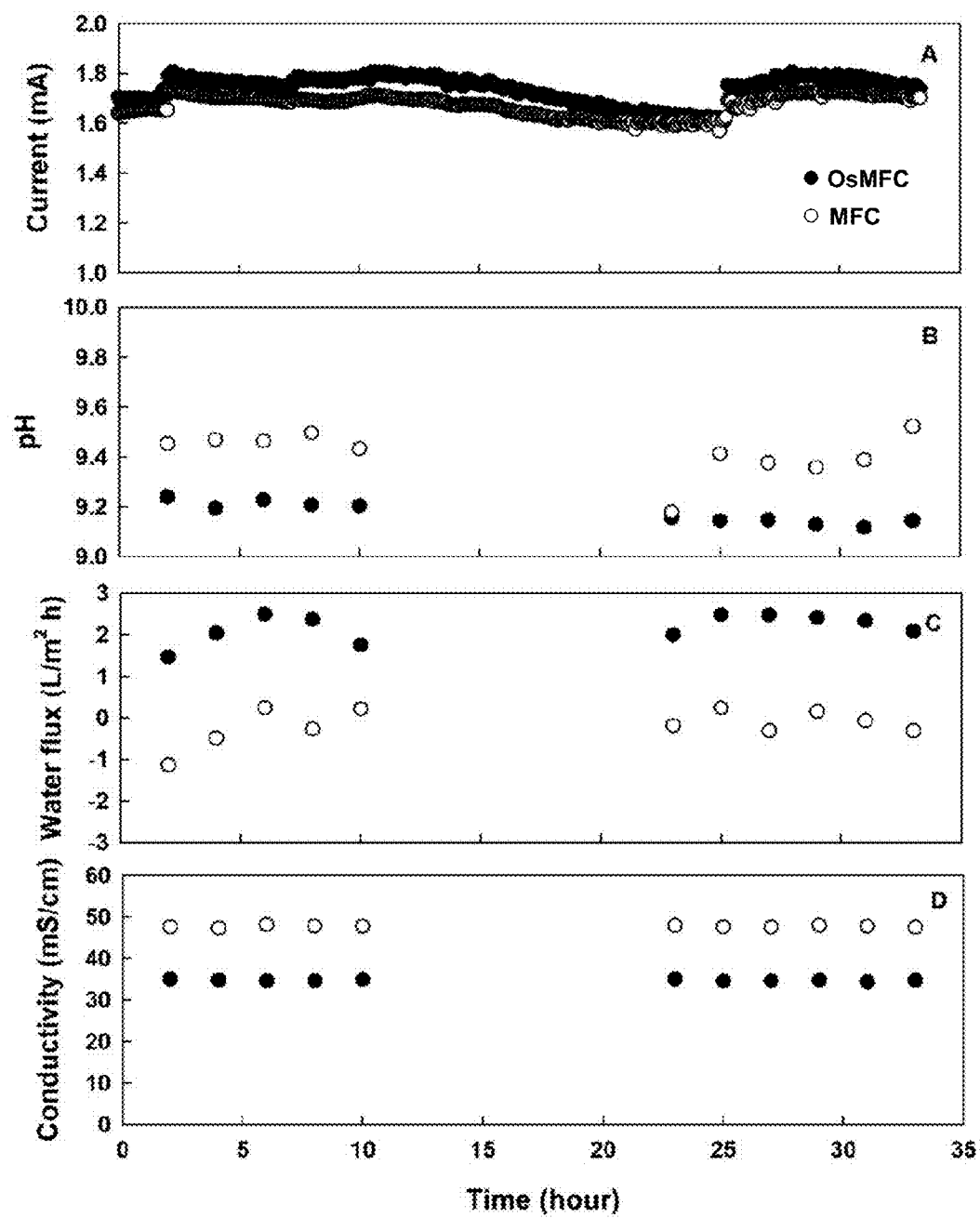
FIG. 10 is series of four graphs showing continuous operation with seawater of an OsMFC and a MFC, in which (A) shows electric current generation, (B) shows pH, (C) shows water flux, and (D) shows conductivity.

When NaCl solution was replaced by seawater (35 g/L), the OsMFC and MFC were switched to a completely continuous operation: both the anode and the cathode chambers were fed continuously. Electricity was constantly produced from both the OsMFC and MFC, and the OsMFC still produced more current, although the difference between the OsMFC and MFC was not as obvious as before with NaCl solution. The open circuit potentials were measured to be 0.62 and 0.58 V for the OsMFC and the MFC, respectively. The OsMFC produced a maximum power density of 2.39 W/m$^3$ and a short circuit current of 17.34 A/m$^3$; while the MFC produced 2.07 W/m$^3$ and 16.60 A/m$^3$. FIG. 10 shows the results from an operation for a period of 33 hours of the OsMDC (closed circles) and the MFC (open circles). Because the data regarding pH, water flux, and conductivity was collected manually, the data during midnight (for about 13 hours) is missing. The current generation varied between 1.6 and 1.8 mA for both the OsMFC and MFC and the OsMFC performed slightly better than the MFC (FIG. 10A). The pHs of the effluents from the cathode chambers were significantly lower than those with the batch operation and NaCl solution, possibly due to lower electricity generation and a stronger diluting effect from the continuous flow of seawater. The OsMFC's catholyte pH was 9.17±0.04, which is lower than the 9.41±0.09 of the MFC catholyte, because of the better proton movement with water flux as previously discussed (FIG. 10B). About 2.17±0.34 L m$^{-2}$ h$^{-1}$ of water flux was achieved in the OsMFC, while the MFC exhibited −0.18±0.41 L m$^{-2}$ h$^{-1}$ (FIG. 10C). The water flux diluted seawater in the OsMFC and reduced its conductivity from 48.0 to 34.7±0.2 mS/cm; the catholyte of the MFC maintained at 47.7±0.3 mS/cm (FIG. 10D).

The performance of the OsMFC in terms of electricity production and water flux decreased with seawater compared to that with NaCl solution. With a catholyte of 35 g NaCl/L, the OsMFC produced an electric current of about 2.0 mA (FIG. 6) and a water flux of 2.92±0.07 L m$^{-2}$ h$^{-1}$ (FIG. 9). Previous studies relating to MDCs also found that seawater led to a lower electricity generation and desalination than NaCl solution. This difference resulted from a lower conductivity (at the same concentration of total dissolved solid as NaCl solution) and the complex composition of seawater, especially the presence of non-conductive compounds in seawater. The low conductivity is unfavorable for water flux as a lower osmotic pressure will slow down water movement.

The above results suggest that seawater, when being used as a draw solution, is not as effective as NaCl solution. Previous FO research on seawater desalination primarily used other draw solutions to extract water from seawater. However, considering the vast availability of seawater and the integration of wastewater treatment with seawater desalination in OsMFCs, seawater could still act as a draw solution to achieve a lower salinity through dilution. A complete removal of salt will not be possible via dilution but a reduced salinity could benefit downstream desalination process. In these experiments, an about 28% reduction in seawater salinity was obtained. The diluting effect will be influenced by factors such as OsMFC configuration (e.g., larger surface area of FO membrane) and operating conditions (HRT and flow pattern of feed solution and draw solution).

C. Summary

It was surprisingly found that the OsMFC produced more electricity than the MFC in both batch (i.e., NaCl solution) and continuous (i.e., seawater) operation, likely due to an unexpectedly better proton transport with the water flux through the forward osmosis membrane. Water flux from the anode chamber into the cathode chamber was clearly observed with the OsMFC but was not clearly observed with the MFC. Additionally, NaCl solution performed better as the catholyte in the OsMFC than seawater. The above results demonstrate that an OsMFC can simultaneously accomplish wastewater treatment, water extraction from wastewater, and electricity generation.

1. Potential Applications of OsMFCs

The above experiments and results have provided a proof of concept of an OsMFC and demonstrated the feasibility that water can be extracted from wastewater through forward osmosis in an MFC while bioelectricity is still generated. Electricity generation in the OsMFC is affected by water flux (via proton transport) but not vice versa. The OsMFC takes advantage of both forward osmosis and MFC technologies such that the two technologies complement each other: bioelectrochemical reactions convert organics into bioenergy, which cannot be realized in a conventional FO reactor and FO membranes act as a separator for the OsMFC with the additional function of water extraction and benefit of faster proton transfer compared to a cation exchange membrane. One of the challenges during OsMFC development was the arrangement of the electrode materials with the FO membrane to minimize internal resistance and ensure sufficient water flux. Thus, a larger cross area of the FO membrane will be desired in future OsMFCs. We envision the potential applications of OsMFCs in two ways: water reuse and seawater desalination. Desalination of brackish water may not be suitable in OsMFCs because of a low osmotic pressure.

Figure 11:
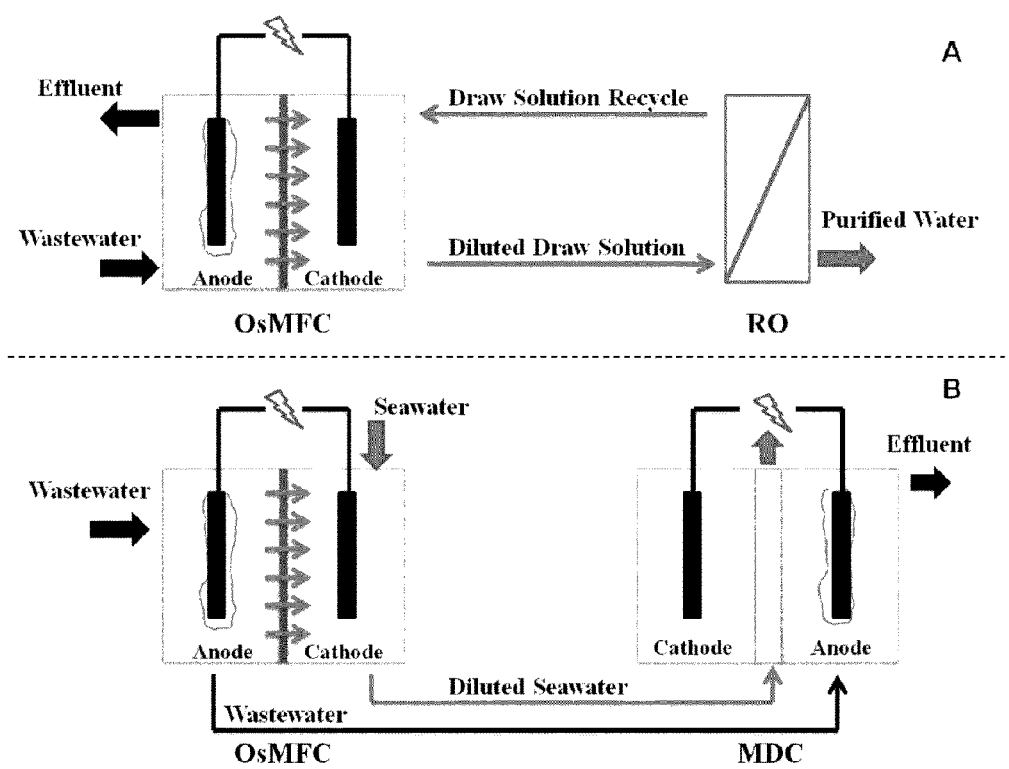
FIG. 11 shows two schematic illustrations for alternative uses of an OsMFC, in which (A) shows an OsMFC in tandem with a reverse osmosis system and (B) shows an OsMFC in tandem with a microbial desalination cell (MDC).

Water reuse has been a primary focus of FO development. OsMFCs can naturally inherit this function with an additional role in bioenergy recovery. A special requirement to accomplish water reuse from wastewater is the recycling of the draw solution. The draw solution functions as a media to transport the extracted water. An additional treatment step such as reverse osmosis (RO) is usually needed. FIG. 11A shows an example of the proposed OsMFC/RO system for water reuse. Wastewater is treated in the anode of the OsMFC, providing organics for electricity generation and water for forward osmosis. The draw solution (e.g., NaCl solution) in the cathode chamber extracts water from the anode chamber and is subsequently transported to the RO system where the draw solution is re-concentrated and purified water is produced. Then, the draw solution is returned to the cathode chamber of the OsMFC for further water extraction. Bioelectricity produced in the OsMFC can be used to offset some of the energy consumption by the RO system, making the whole process more sustainable. To ensure a healthy performance of electricity generation, buffering the pH of the draw solution will need to be taken into the consideration. Further development of OsMFCs for water reuse can take advantage of developments in FO membrane materials, new draw solutions, and anti-fouling of the FO membrane and examine the suitability of using those advancements in OsMFCs. Additionally, the experience from large scale applications of FO technology will also benefit OsMFC development.

The application of the OsMFC in seawater desalination is to use seawater as draw solution. The goal is to dilute seawater with the extracted water from the wastewater; thus, recycling of the draw solution is not needed. OsMFCs can be linked to any desalination process such as RO or electrodialysis (ED), but herein we propose to connect OsMFCs to another bioelectrochemical reactor—microbial desalination cells (MDCs) (FIG. 11B). MDCs are modified MFCs for simultaneous wastewater treatment and water desalination. The advantage of such a combined bioelectrochemical system is extensive wastewater treatment and maximized bioenergy production. Both OsMFCs and MDCs can treat wastewater with bioelectricity generation. With the addition of MDCs to the system, the pressure of wastewater treatment in OsMFCs will be alleviated. Desalination in MDCs does not require energy input (except pumping at normal water pressure); instead, desalination is a key step of bioelectricity production. In the proposed system, wastewater first flows into the OsMFCs and then the MDCs; the opposite flow direction from MDCs to OsMFCs could accumulate salts during MDC desalination and reduce the difference in osmotic pressure in the OsMFCs, thereby decreasing water flux. Since MDCs can only remove ionic compounds, a post-treatment like ROs may still be needed. However, because the salinity of seawater can be reduced to a very low level through dilution in the OsMFCs and desalination in the MDCs, the use of a RO system will be minimized at a low pressure. Electricity production from both OsMFCs and MDCs can provide energy to offset energy consumption by RO systems during post-treatment of the water.

Example 2

Effects of Draw Solutions and Membrane Conditions on the Performance of OsMFCs

Draw solutions that are commonly used in FO processes were examined to determine their ability to function as catholytes for electricity production in an OsMFC. Additionally, the effects of membrane fouling were examined with regards to the performance of the OsMFC.

A. Materials and Methods

1. OsMFC Setup and General Operation

Figure 12:
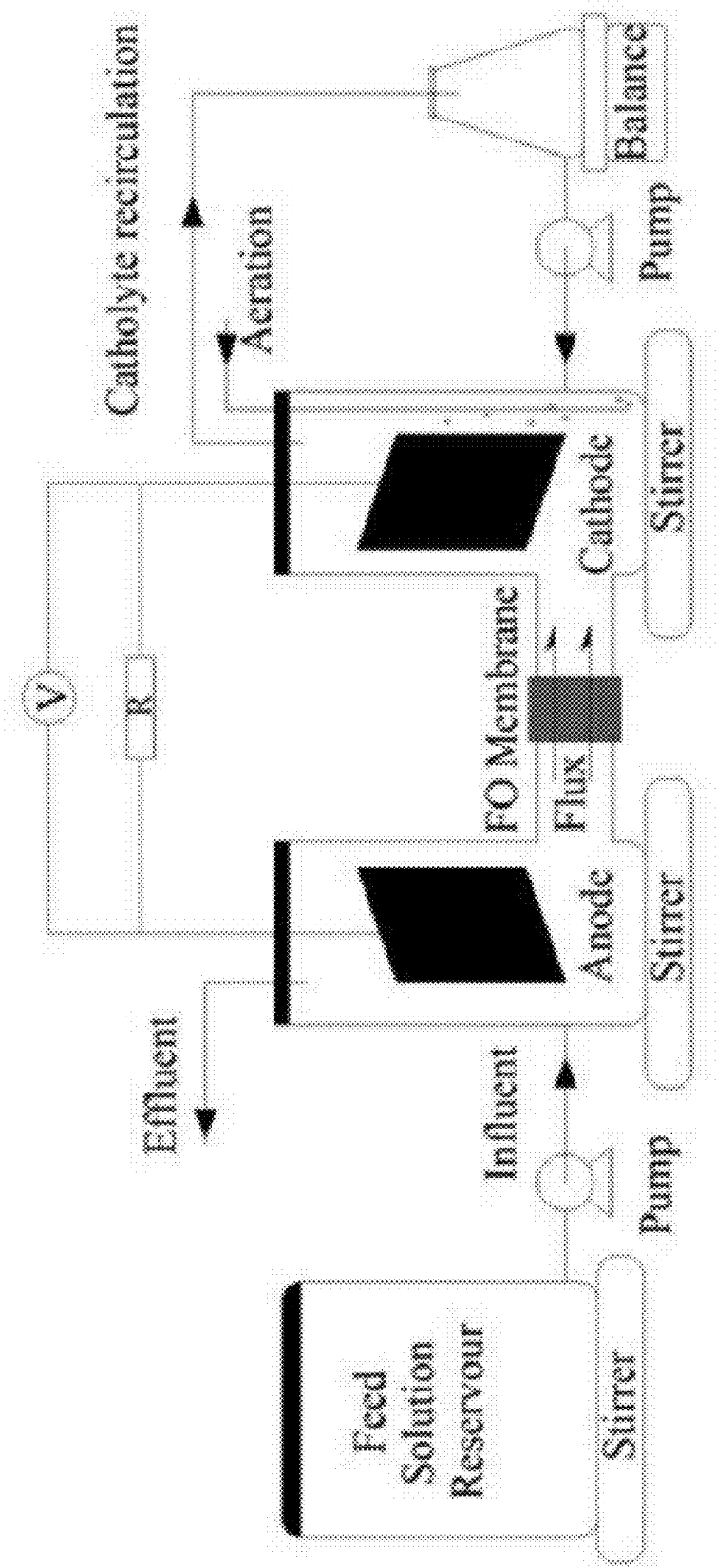
FIG. 12 shows a schematic of an exemplary OsMFC.

The OsMFC system consisted of two equal-size compartments including the anode and cathode (FIG. 12). The total liquid volume of each compartment was 140 mL. The liquid volume of the catholyte was 240 mL, including the cathode compartment and a flask attached to the cathode. The compartments were glass bottles connected by an FO membrane (Hydration Technology Innovations, LLC, Albany, Oreg., USA). Before use, FO membranes were soaked in deionized water for 30 min according to the manufacturer's instructions. For comparison, some studies replaced the FO membrane with a cation exchange membrane (CEM) (Membrane International Inc., Ringwood, N.J., USA) to form a conventional MFC. The surface area of each membrane was about 6.4 $cm^2$. More details of the anode and cathode electrodes can be found in our previous publication (Zhang et al. 2011). The electrodes were connected by copper wires to an external resistor of 10Ω. Both compartments were continuously stirred with magnetic bars. A 100-mL flask placed on a digital balance was used to measure the amount of water that moved through the FO membrane into the cathode compartment. The OsMFC was operated under a room temperature of about 20° C.

The anode was fed continuously with a solution that was prepared containing (per L of deionized water): sodium acetate, 2 g; $NH_4Cl$, 0.15 g; $MgSO_4$, 0.015 g; $CaCl$, 0.02 g; $NaHCO_3$, 0.1 g; $KH_2PO_4$, 0.53 g; $K_2HPO_4$, 1.07 g; and trace element, 1 mL (He et al. 2006). The cathode was operated in batch mode in all experiments and the catholyte was recirculated at 20 mL/min. The cathode compartment was aerated with the air at a flow rate of 30 mL/min.

2. General Measurement and Analysis

The cell voltage was recorded every 5 min by a digital multimeter (2700, Keithley Instruments, Inc., Cleveland, Ohio, USA). The pH was measured using a benchtop pH meter (Oakton Instruments, Vernon Hills, Ill., USA). The conductivity was measured by a benchtop conductivity meter (Mettler-Toledo, Columbus, Ohio, USA). The concentration of chemical oxygen demand (COD) was measured using a colorimeter (Hach DRI890, Hach Company, Loveland, Colo., USA). Water flux into the cathode (L $m^{-2}$ $h^{-1}$-LMH) was calculated by the change of weight recorded on the balance.

3. Specific Testing Conditions—Draw Solutions Test Four draw solutions at a concentration of 1 M each, including NaCl, potassium phosphate buffer (PPB), CaCl and glucose, were tested individually. One mole of PPB contained 53 g of $KH_2PO_4$ and 107 g of $K_2HPO_4$. The anode was continuously fed at a hydraulic retention time (HRT) of 2 hours (h). The data were collected from the short-term (4 h) tests of both water flux and electricity generation and the change of catholyte weight was recorded hourly. The pH and conductivity of the catholyte was measured before and after each test.

4. Specific Testing Conditions—PPB Concentrations

Four PPB solutions (50, 100, 200 and 500 mM) were tested to investigate the effect of solute concentrations. The HRT of the anolyte was adjusted to 10 h for this test. The data of electricity generation was collected in a 24-h testing period. The weight of the catholyte was recorded hourly in the first 4-h duration and the last 2-h duration and the pH and conductivity of catholyte were collected at hours 0, 4, and 24.

5. Specific Testing Conditions—pH Controlling with Acid Addition

To control the pH of the NaCl catholyte, 5 mL of 50-fold dilution of 37% HCl was dosed into the catholyte every 12 h. The pH and conductivity of the catholyte were recorded every 12 h. The total volume of the catholyte was kept at about 240 mL after HCl dosing. The initial NaCl concentration in the cathode chamber of this test was 0.8 M. The HRT of the anolyte was 10 h.

6. Specific Testing Conditions—Membrane Conditions

The FO membranes were tested under several conditions, including new membrane, new membrane that was dried after soaking ("new & dried"), fouled membrane, and fouled membrane that was dried ("fouled & dried"). For comparison, a new cation exchange membrane (CEM) also was evaluated in the OsMFC. The performance of the OsMFC with those membranes was monitored for 22 h. An one-hour short-term experiment was carried out to investigate the fouled and dried membrane. Electricity generation, conductivity of the anolyte and catholyte, weight of overflow catholyte, and pH were measured. The HRT of the anolyte was 10 h in those tests.

8. Specific Testing Condition—FO Membrane Backwash

In the backwash test, NaCl was dosed into the anode compartment acting as draw solute and deionized water was fed into the cathode compartment as feed solution. The OsMFC was operated for 24 hr before the first backwash. Five backwash cycles (6 operation cycles for the OsMFC) were conducted using 0.2, 0.3, 0.3, 0.5, and 0.5 M of NaCl for the backwash period of 1, 1, 2, 1 and 1 h, respectively. The anode operation was switched to batch during the backwash and then resumed continuous operation after the backwash. When adding 0.5 M NaCl, the anolyte was replaced with fresh feeding solution after the backwash. During the backwash, electricity generation and water flux were measured. The digital balance was connected to a PC through a USB cable controlled by software (Logger Pro, Vernier Software & Technology, Portland, Oreg., USA) to record the change of catholyte weight. The recording rate was 60 data points/h and 120 data points/h for the OsMFC operation and the backwash, respectively.

B. Effects of Draw Solutions on the OsMFC Performance

1. Types of Draw Solutions.

Four representative draw solutions (1 M each) were tested as catholytes in the OsMFC. Sodium chloride (NaCl) is the most commonly used draw solute in FO processes (Achilli et al. 2010); PPB is widely applied in MFC operations (Logan et al. 2006); calcium chloride ($CaCl_2$) is a divalent chemical that has exhibited a high osmotic pressure compared with other draw solutes (Cath et al. 2006); and glucose represents sugar-based draw solutes that can be applied to the food industry without the need of being re-concentrated. Electricity generation was observed with three draw solutes but not with glucose (FIG. 13A). The highest current (>2.5 mA) was generated from the PPB catholyte, while the NaCl and $CaCl_2$ catholytes produced a slightly lower electric current. Water flux, on the other hand, behaved differently from electricity generation (FIG. 13B). An increasing water flux was obtained with the PPB and NaCl catholytes and at the end of the four-hour testing period, both achieved water flux of 2.51-2.69 LMH. However, the opposite trend of water flux occurred with the $CaCl_2$ and glucose catholytes, dropping to about 0.56 LMH after four hours. An extended test to 20 h showed that water flux with the $CaCl_2$ and glucose catholytes remained below 0.45 LMH. During the same period, the PPB catholyte maintained a water flux of about 2.42 LMH and the NaCl catholyte had a decreased water flux to 1.82 LMH.

To understand why those draw solutions (catholytes) produced different results with regards to electricity generation and water flux, the variation of catholyte pH and conductivity was monitored during the testing period. The oxygen reduction in the cathode of an MFC can elevate pH and a higher catholyte pH will cause a larger overpotential, thereby reducing electricity generation (Rozendal et al. 2006). The pH of the NaCl catholyte increased from 7.0 to 9.6 within four hours. The $CaCl_2$ catholyte had a final pH of 9.7. Those high catholyte pHs could result in a weaker electricity generation, as suggested by the present results and our previous studies (Zhang et al. 2011). Meanwhile, the pH of the PPB catholyte that produced the highest current varied between 7.2 and 7.3, because of its strong buffer capacity. Although the glucose catholyte had the lowest pH of 6.0-6.7, it produced very little electricity because of extremely low conductivity. It is known that increasing catholyte conductivity can improve electricity generation in MFCs (Gil et al. 2003). The current generation with the glucose catholyte actually increased slightly from 0.01 to 0.06 mA within four hours, possibly because water flux from the anode compartment introduced ions into the catholyte and thus added a little conductivity. Due to this water flow, the glucose concentration in the cathode was reduced by about 5.4% (from 1230 to 1163 mg COD/L). With the dilution effect from water flux, the conductivities of other three draw solutions also decreased (data not shown).

Figure 13:
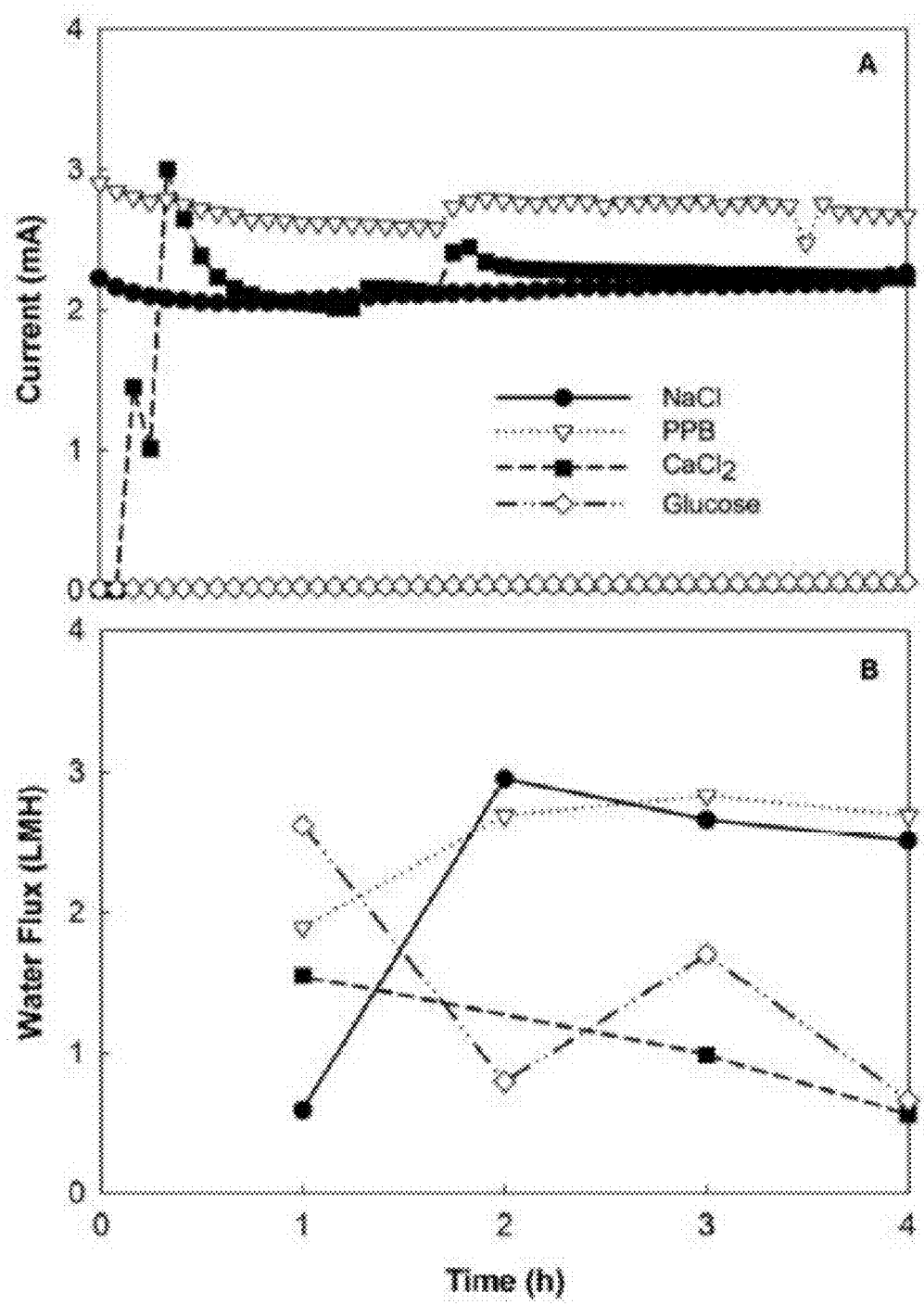
FIG. 13 is a pair of graphs showing the performance of an OsMFC with different draw solutions, in which (A) shows electric current generation and (B) shows water flux, each as a function of time.

It was unexpectedly observed that the $CaCl_2$ catholyte had much less water flux than the NaCl catholyte while producing a similar amount of electricity (FIG. 13). Previous FO studies found that $CaCl_2$ has a higher osmotic pressure than NaCl at the same concentration (Cath et al. 2006). When using the $CaCl_2$ catholyte, we observed chemical precipitation (shown in gray) on the FO membrane facing the anode. It is likely that calcium ions migrated from the cathode compartment into the anode compartment and combined with phosphate or carbonates in the anolyte to form precipitation on the membrane surface. Such reverse salt flux has been reported in FO processes (Phillip et al. 2010). In addition, the $CaCl_2$ catholyte had a high initial pH of 10, which should be unfavorable for oxygen reduction. However, this high initial pH did not obviously impede electricity generation, compared with the NaCl catholyte, likely due to the higher conductivity of the $CaCl_2$ catholyte. One mole of the $CaCl_2$ catholyte had a conductivity of 120.1 mS/cm; at the end of the 4-h test, its conductivity was still 116.8 mS/cm. Meanwhile, one mole of the NaCl catholyte had a conductivity of 83.5 mS/cm, which dropped to 77.7 mS/cm after the 4-h test. Those results suggested that $CaCl_2$, though a good draw solution for FO processes, may unexpectedly be suitable as a catholyte chemical in OsMFCs.

Our above studies demonstrated that an ideal draw solution (catholyte) for the OsMFC should possess a certain ability to buffer pH, have a high conductivity, and not form membrane scaling. Another important criterion (in some applications) is how efficiently the draw solution can be re-concentrated after dilution in FO processes. The common approach for re-concentration is to use reverse osmosis, which consumes intensive energy (Chung et al. 2011). Researchers have discovered new solutes such as ammonia-carbon dioxide (McCutcheon et al. 2005) and soluble magnetic nanoparticles (Ling et al. 2010) that can be recovered through low-energy processes. We did not test ammonia-carbon dioxide in the OsMFC because of the high pH due to the cathode reaction and aeration with air bubbles would drive ammonia out of the solution, similar to ammonia stripping (Quan et al. 2009). The loss of ammonia will decrease ammonium concentration and thus water flux. It remains to be explored whether soluble magnetic nanoparticles can be applied as cathode solutes in OsMFCs.

2. PPB Concentrations

Figure 14:
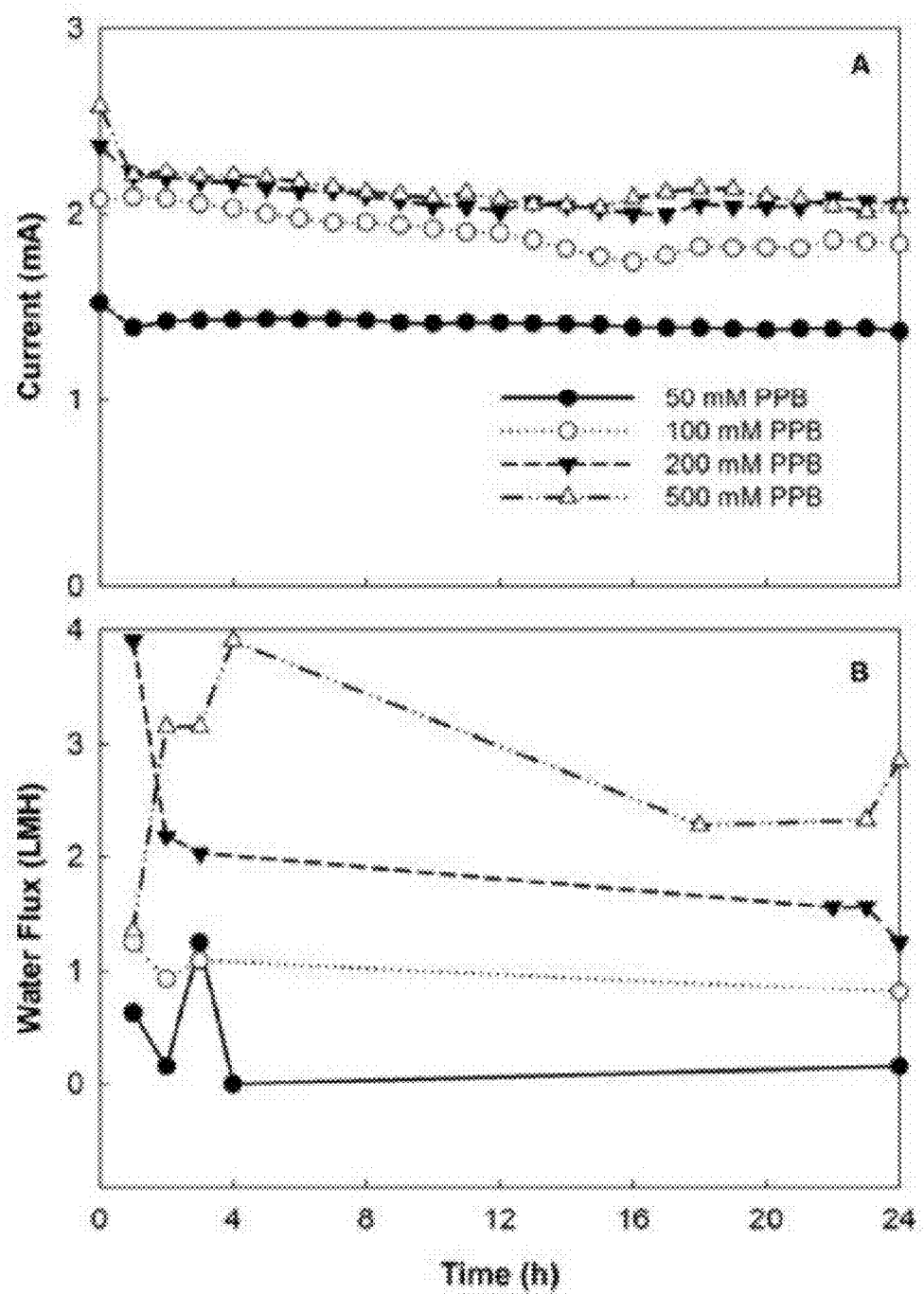
FIG. 14 is a pair of graphs showing the performance of an OsMFC with different concentrations of potassium phosphate buffer, in which (A) shows electric current generation and (B) shows water flux, each as a function of time.

The PPB catholyte exhibited an advantage in both electricity generation and water flux. Thus, the PPB catholyte was further investigated at different concentrations varying from 50 to 500 mM. The PPB concentrations affected the OsMFC performance, and a higher PPB concentration led to a better current generation (FIG. 14A) and water flux (FIG. 14B). It was also found that current generation, compared with water flux, received less influence from the PPB concentration. The pHs of the PPB catholytes that were between 100 and 500 mM remained about 7.3 during the 24-h testing period. The 50-mM PPB had a slightly higher final pH of 7.6, because of a weaker buffering capacity. Although the 500 mM PPB catholyte contained conductivity more than twice of that of the 200 mM PPB catholyte, both produced a similar amount of electricity, indicating that increasing catholyte conductivity beyond a certain point would not help to increase electricity generation. Water flux was affected more significantly by the PPB concentration, as a higher concentration created a larger osmotic pressure, which is the driving force of water flux. The 50-mM PPB catholyte had the lowest water flux because of its low conductivity of 7.7 mS/cm that created the smallest difference of osmotic pressure between the anolyte and the catholyte among the tested PPB concentrations. This low conductivity could also contribute to low electricity generation. These results indicated that when determining the concentration of a draw solution for OsMFCs, the anolyte conductivity should be taken into consideration. Some special wastewaters such as food wastewater contain high salinity and will require a much higher conductivity in the draw solution.

3. Acidified NaCl Catholyte

Figure 15:
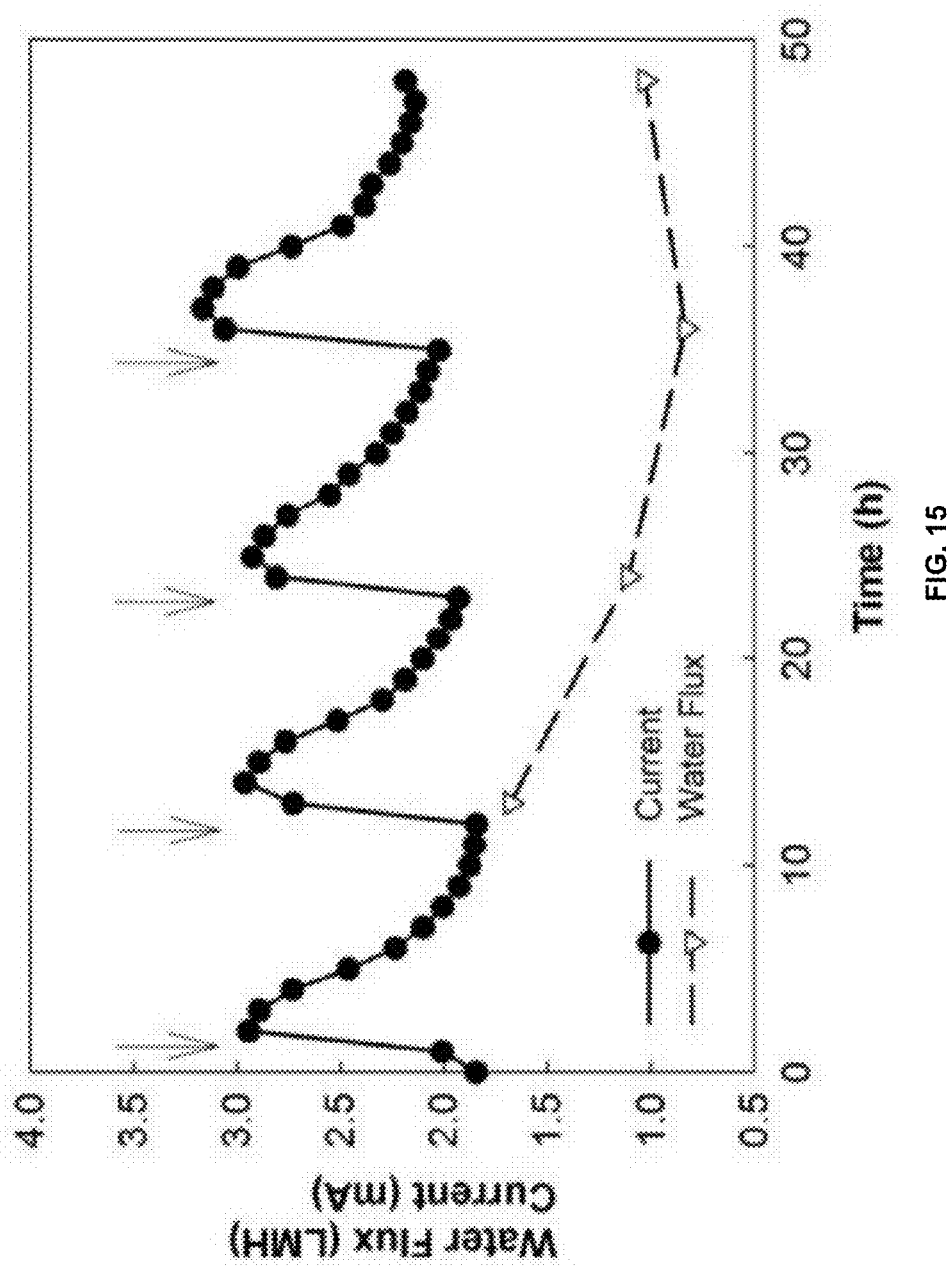
FIG. 15 is a graph showing the buffering of a NaCl draw solution via an acid solution, in which arrows indicate addition of the acid solution.

As a simple and low cost chemical, NaCl is the most commonly used draw solute in FO processes. However, the lack of pH buffering capacity hinders its application in OsMFCs. To overcome this problem, the pH of the NaCl catholyte was adjusted with hydrochloric acid (HCl). When the pH of the NaCl catholyte increased to above 9.0, HCl was added to reduce the pH of the NaCl catholyte to 2.5. This action increased the current generation by almost 50% in a short period and then the current decreased because of increased pH caused by oxygen reduction (FIG. 15). However, water flux was not significantly affected by HCl addition. The decreased water flux was likely a result of both the decreased conductivity (from 65.1 to 50.7 mS/cm) and membrane fouling. Adding HCl would increase conductivity, but this increase was negligible compared with the reduction in conductivity caused by water dilution and given the small volume of HCl that was added to NaCl catholyte.

Although adding HCl to buffer pH may complicate the OsMFC operation, the NaCl—HCl combination has some advantages compared with the PPB catholyte. First, the cost of the NaCl—HCl combination is much lower than that of the PPB catholyte. Based on the price information from Sigma-Aldrich (St. Louis, Mo., USA) from whom chemicals were purchased and the quantities used in this study, it is estimated that the chemicals cost $0.25/day for the NaCl—HCl combination and $1.76/day for the PPB catholyte for operating the present OsMFC. If HCl was added more frequently, for instance 10 times the current frequency, to maintain constantly high current generation, the cost will increase to $0.36/day, still significantly lower than the cost of the PPB catholyte. This cost difference will substantially affect operating expense at full scale applications. Second, the use of the NaCl—HCl combination is more environmentally friendly than the PPB catholyte. Because of reverse salt flux during FO processes, phosphate could migrate into the anode compartment and be discharged with the anode effluent (treated wastewater). Phosphorous is a key inorganic contaminant and its concentration must be maintained at a low level in wastewater effluent. An overload of phosphorous (with other nutrients) can cause eutrophication that deteriorates natural water bodies.

C. Effects of Membranes on the OsMFC Performance

1. Membrane Conditions and Types

OsMFC performance was investigated with FO membranes under different conditions and FO membranes were compared with an cation exchange membrane (CEM) (FIG. 15). The NaCl solution was used as the draw solution in these tests. The electricity production with a new FO membrane was higher than that with a new CEM, confirming the finding in our previous study (Zhang et al. 2011). We attributed this difference to a proactive proton transport with water flux through the FO membrane. No obvious water flux was observed with the CEM (data not shown). We expected that the OsMFC operation would cause FO membrane fouling; but to our surprise, the fouled FO membrane led to higher electricity generation (50% more) than the new FO membrane. When the fouled membrane was dried in the air and then reused in the OsMFC, the current generation was further increased to about 4 mA. For comparison, a new FO membrane was soaked in water, dried and then used in the OsMFC. This new & dried FO membrane resulted in lower electricity production than a new FO membrane (soaked in water and then used in the OsMFC). Water flux with the new & dried membrane was about 0.39 LMH after 22-h operation, much lower than 2-3 LMH with a new FO membrane. Our results demonstrated that a soak-dry process would seriously damage the FO membrane, which is in agreement with the suggestion by the manufacturer that FO membranes should be stored in water after the first-time soaking.

Figure 16:
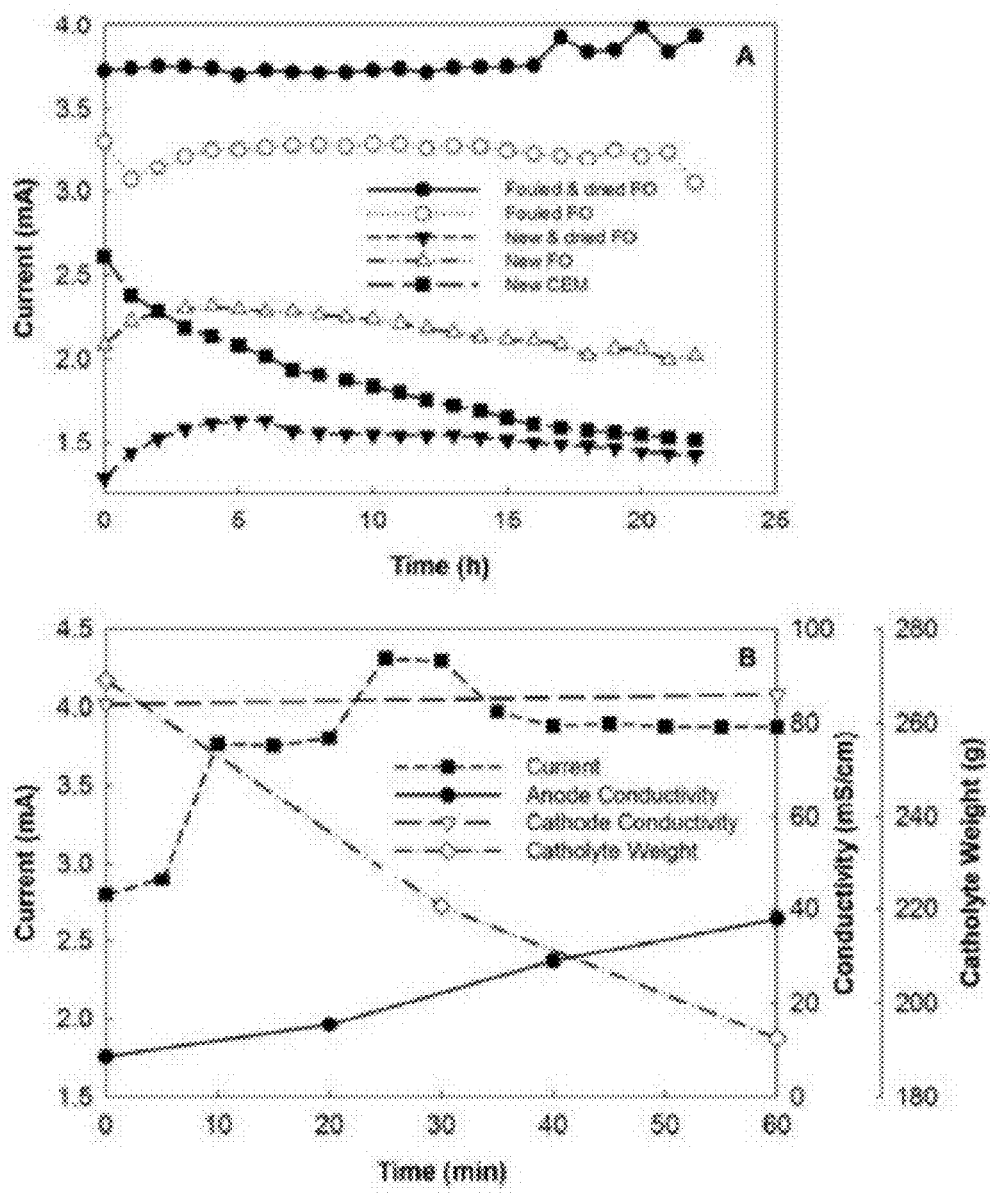
FIG. 16 is a pair of graphs showing electric current generation as a function of time for an OsMFC with different forward osmosis (FO) membrane conditions, in which (A) shows the effect of different FO membranes and (B) shows the effect of a fouled and dried FO membrane.

No water flux was observed with the fouled FO membranes, although they had more electricity generation. On the contrary, water loss occurred in the cathode compartment in the presence of the fouled & dried membrane. To further confirm and understand this phenomenon, we monitored electricity, conductivity and water loss with the fouled & dried FO membrane (FIG. 16B). During the 1-h test, current generation was mostly above 3.5 mA, similar to the 22-h test shown in FIG. 16A. The conductivity of the catholyte (85.1 mS/cm) did not obviously change, but the conductivity of the anolyte clearly increased from 8.6 to 38.0 mS/cm. Meanwhile, the weight of the catholyte decreased from 269 to 193 g. Those results indicated that the fouled & dried FO membrane had completely lost FO function; it allowed the catholyte to intrude into the anode compartment and this high-salinity flux increased the conductivity of the anolyte, which explained why higher electricity was produced with the fouled & dried FO membrane. The results also indicated that the microbes in the anode chamber could tolerate salt flux and maintained a stable performance of electricity generation under a high salinity condition (a conductivity of 38.0 mS/cm is equivalent to about 22 g NaCl/L). This could be an important implication for the future application of OsMFCs, because reverse salt flux often happens during the FO process. This feature could also be used to conduct membrane backwash, which was addressed below.

6. Membrane Backwash

Figure 17:
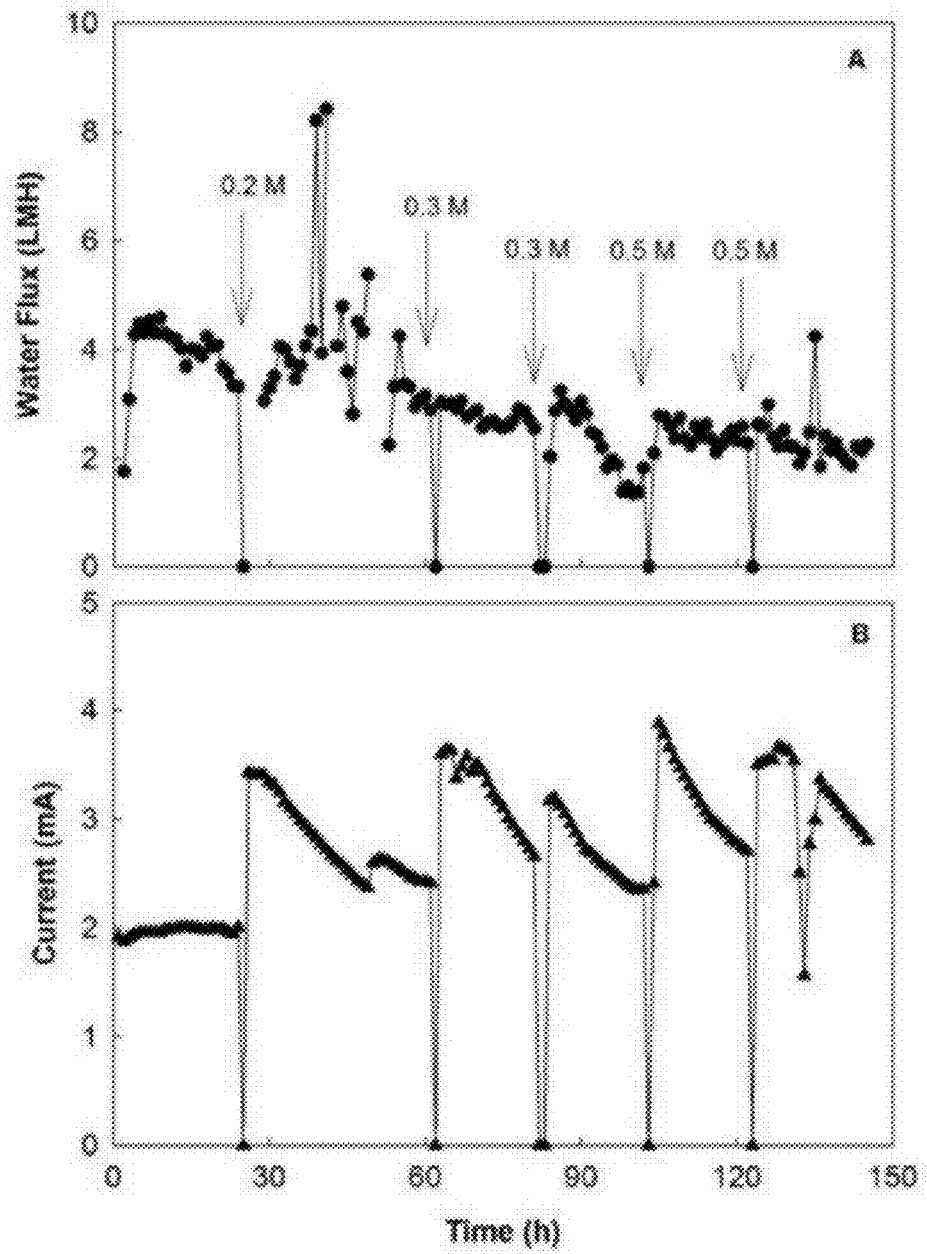
FIG. 17 is a pair of graphs showing the performance of an OsMFC during backwash, in which (A) shows water flux and (B) shows electric current generation, each as a function of time.

The fouling of the FO membrane occurred during OsMFC operation, revealed by both direct observation of the membrane condition and a decrease in water flux. Backwash was employed to reduce membrane fouling. Unlike a conventional FO reactor that can apply a high-salinity solution in its feeding side for backwash, OsMFCs contain a microbial community in the anode chamber (the feeding side) that would be adversely affected by a shock from a high salt solution. Thus, a low concentration of NaCl (0.2-0.5 M) was added to the anolyte as the draw solution and deionized water was added to the cathode chamber as a feed solution. As shown in FIG. 17, backwash alleviated the decrease in water flux, but its effect was limited. A longer backwash time (e.g., 2 h backwash during the second addition of 0.3 M NaCl) seemed to be more effective to elevate water flux but it also led to a faster decrease after backwash. A higher concentration of NaCl (0.5 M) did not result in a better water flux, compared with 0.2 and 0.3 M of NaCl. As expected, the overall trend of water flux decreased, likely due to the accumulated fouling (FIG. 17A). The generation of electric current was improved after each backwash (FIG. 17B) because of the increased conductivity of the anolyte with salt input.

This study was an early attempt to reduce FO membrane fouling in OsMFCs and the results demonstrated the challenge of cleaning an FO membrane in OsMFCs because of the need to maintain microbial functions during the cleaning process. A strong acid/base solution that is commonly used to clean membranes is not appropriate in OsMFCs because of the severe effect on microbes, unless FO membranes can be removed from the reactor. Future approaches to clean FO membranes in OsMFCs may consider the use of chemicals that are less harmful to microbes at high concentrations, improved membrane design for anti-fouling, recirculation of biogas in the anode chamber to reducing fouling, and/or design of removable anode electrodes to accommodate the cleaning process. In addition, a reliable FO membrane is one of the key factors to the successful application of OsMFCs. The membrane used in this study is sensitive to fouling and dehydration. The CEM, on the other hand, is more durable. A stable performance of electricity generation in MFCs could be achieved with a CEM that was soaked and dried multiple times. Moreover, membrane fouling is also less serious with the CEM because of the mechanism of ion exchange. We have operated MFCs with a CEM continuously for one year and did not observe a significant decrease in electricity production (Zhang et al. 2010). However, the CEM does not have the function of extracting clean water from the anolyte (e.g., wastewater). The cost of FO membranes ($30/m$^2$ according to the manufacturer) is also significantly lower than that of CEM ($97/m$^2$). Therefore, FO membranes have advantages over the CEM both functionally and economically and will be applicable in OsMFCs if an effective strategy can be developed to reduce membrane fouling.

C. Summary

The above studies further investigated two important factors, catholytes and membrane conditions, and their effects on the performance of an OsMFC. The results demonstrate that sodium chloride is an optimal catholyte (and draw solution) that is functionally, economical and environmentally-friendly. Two draw solutes that performed exceptionally in FO, calcium chloride and sugar, appear to be unsuitable as catholytes in OsMFCs. When the FO membrane was fouled (and/or dried), its FO function (water extraction) was seriously damaged but electricity generation was improved. To reduce membrane fouling, backwash was tested by dosing sodium chloride into the anode compartment but its effectiveness was below expectation. An effective method of membrane cleaning with minimal influence on the microbes in the anode chamber should be developed in the future. Those findings will have important implications to OsMFC development and application.

In other words, this study investigated the draw solutions as catholytes, FO membrane conditions, and backwash for membrane cleaning in an OsMFC. The results demonstrated that sodium chloride was a suitable candidate as a catholyte solution with good performance in both electricity generation and water flux, though sodium chloride required buffering of its pH via acid addition. It was also found that the fouled FO membrane improved electricity generation but lost the function of water flux. Additionally, this study used an approach of backwash that added NaCl into the anolyte to examine alleviation of membrane fouling and to help restore both water flux and electricity generation.

The above study demonstrated that an optimal catholyte for OsMFCs should meet a few criteria, including low cost, high conductivity for both water flux and electricity generation, and be environmentally friendly. A good draw solution used in an FO or a good catholyte applied in an MFC does not always work well in an OsMFC and must be examined for its suitability for OsMFCs. The FO membrane fouling adversely affected water flux; adding salt into the anode chamber for backwash alleviated membrane fouling to a certain degree. These findings will help to understand critical factors towards developing a practical OsMFC system.

Example 3

Reducing Effluent Discharge in an OsMFC

This study investigated the performance of an OsMFC treating actual domestic wastewater. Specifically, to examine an OsMFC's compatibility with more complex substrates, actual domestic wastewater was adapted. A synthetic acetate solution was still used to start up the OsMFC and to investigate the effect of recirculation rates. After a stable performance was achieved in acetate solution, the anode feeding solution was switched to domestic wastewater. Both electricity generation and water flux were monitored and the influence of hydraulic retention time was studied. Membrane fouling was characterized using electrochemical techniques and chemical analysis.

A. Materials and Methods

1. OsMFC Setup

Figure 18:
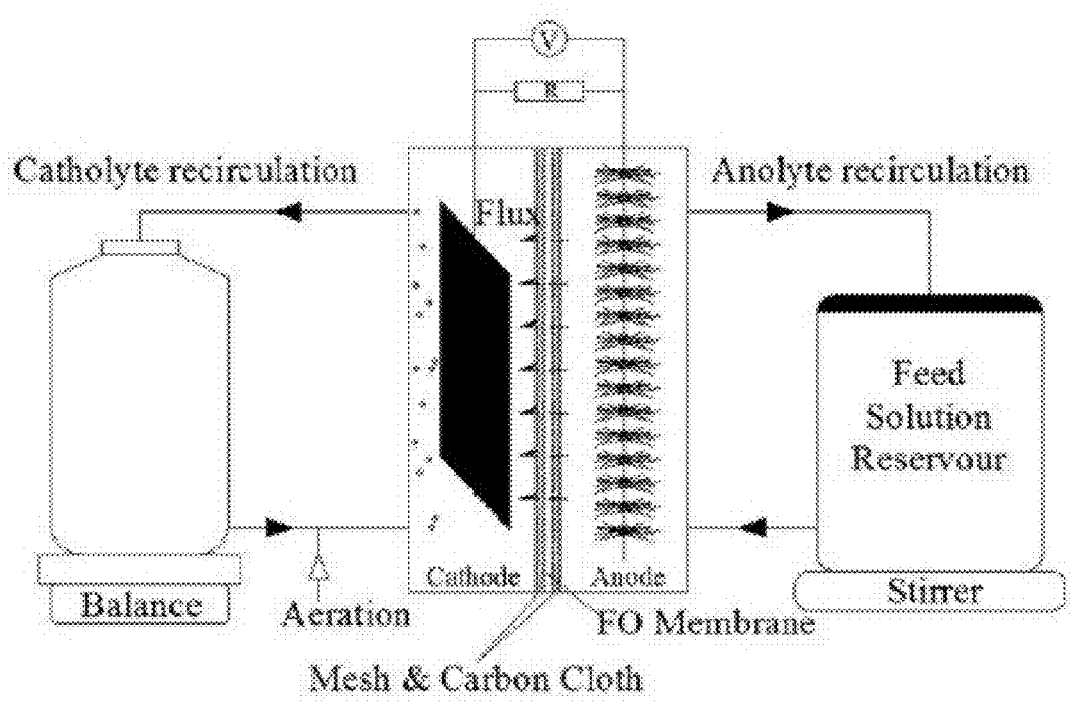
FIG. 18 shows a schematic of an exemplary OsMFC.

The OsMFC consisted of two equal-size compartments (14×7×3.7 cm/each) as the anode and the cathode chambers, separated by an FO membrane (FIG. 18). The liquid volume of each compartment was 360 mL. Before use, the FO membrane (Hydration Technology Innovations, LLC, Albany, Oreg., USA) was soaked in deionized (DI) water for 30 min according to the manufacturer's instructions. The surface area of the FO membrane was about 98 cm$^2$. The active layer of membrane was facing the anode feeding solution. Stainless steel mesh and carbon cloth was placed on both sides of the FO membrane as support. Two carbon brushes (Gordon Brush Mfg. Co. Inc., Commerce, Calif., USA) were inserted into the anode compartment as the anode electrodes. Before use, the brushes were pre-treated by immersion in acetone overnight and heated at 450° C. for 30 min. The cathode electrode was carbon cloth coated with Pt as the catalyst (0.3 mg/cm$^2$). The electrodes were connected by copper wires to an external resistor of 10 Ohm. A 1000-mL glass bottle as a reservoir containing the catholyte was placed on a digital balance to measure the water flux. The cathode compartment was aerated with the air to provide oxygen for cathode reaction and create turbulence of flow. The OsMFC was operated at a room temperature of about 22° C. The FO membrane was used in the OsMFC for more than 100 days. No mechanical cleaning or backwash was applied; instead, the cathode compartment of the OsMFC was filled with DI water to allow FO membrane to rest for 2 h every 22-h during the batch operation, or 2 h every 46 h during the continuous operation.

2. OsMFC Startup

To develop the desired biofilm on the anode electrodes, the OsMFC began as a conventional MFC using a cation exchange membrane (CEM, Membrane International Inc., Ringwood, N.J., USA) between the anode and the cathode compartments. The anode was inoculated by using raw sludge from a primary sedimentation and digestion sludge (Southshore Wastewater Treatment Plant, Milwaukee, Wis., USA). To increase current generation, the external resistance was adjusted gradually from 2000 to 10 Ohm. The catholyte was 50-100 mM of phosphate buffer solution. Once a stable current output was achieved, the CEM was replaced by the FO membrane and thus the MFC was converted to an OsMFC.

3. OsMFC Fed on Acetate Solution

The OsMFC was first operated on an acetate solution to examine the system performance and the effect of recirculation rates. The anode was fed in a batch mode with an acetate solution containing (per L of DI water): sodium acetate, 2 g; $NH_4Cl$, 0.15 g; $MgSO_4$, 0.015 g; $CaCl_2$, 0.02 g; $NaHCO_3$, 0.1 g; $KH_2PO_4$, 0.53 g; $K_2HPO_4$, 1.07 g; and trace element, 1 mL. Sodium chloride solution (2 M) was used as the catholyte and supplied in a batch mode. Both anolyte and catholyte were recirculated by peristaltic pumps at the same rate ranging from 100 mL/min to 400 mL/min. At the end of a cycle (22-24 h), the anolyte and catholyte remaining in the reservoir bottles were replaced with 500 mL fresh acetate solution and fresh 2 M NaCl solution, respectively. The cathode compartment was filled with DI water for 2 h to rest the FO membrane before refilling with the new catholyte.

4. OsMFC Fed on Domestic Wastewater.

Domestic wastewater (primary effluent) was collected from Southshore Wastewater Treatment Plant (Milwaukee, Wis., USA) and used as the anode feed solution. The OsMFC was first operated in a batch mode: the anolyte (wastewater) was replaced every 24 h and the cathode (2 M NaCl) solution was completely replaced after a 46-h cycle. After several cycles, the reactor was then operated in continuous flow mode. The HRT of the anode feed was 10 h for the first 10-day duration and then adjusted to 24 h for 9 days. The recirculation rates for both the anolyte and catholyte were 100 mL/min. To examine the effect of recirculation rate on water flux, the catholyte recirculation rate was raised to 3000 mL/min without aeration for several hours. At the same time, the anolyte HRT was adjusted to about 3 hr to ensure a sufficient supply of the anode feed solution. The tests of high catholyte recirculation rate were conducted with and without the carbon cloth that was initially installed on both sides of the FO membrane (FIG. 18).

5. Measurement and Analysis

The cell voltage was recorded every 3 min by a digital multimeter (2700, Keithley Instruments Inc., Cleveland, Ohio, USA). The pH was measured using a benchtop pH meter (Oakton Instruments, Vernon Hills, Ill., USA). The conductivity was measured by a benchtop conductivity meter (Mettler-Toledo, Columbus, Ohio, USA). The polarization curve was performed by a potentiostat (Reference 600, Gamry Instruments, Warminster, Pa., USA) at a scan rate of 0.2 m V/s. The volumetric densities of power and current were calculated based on the liquid volume of the anode compartment, according to a previous study (Zhang et al., 2010). The concentration of chemical oxygen demand (COD) was measured using a colorimeter (Hach DRI890, Hach Company, Loveland, Colo., USA). Water flux into the cathode (L m$^{-2}$ h$^{-1}$-LMH) was calculated by the change of weight recorded on the balance. The efficiency of organic-to-electricity was expressed by coulombic recovery (CR) and coulombic efficiency (CE), calculated as follows:

$$CR = \frac{Q_{output}}{Q_{input}} = \frac{\sum I(A)t(s)}{96485\left(\frac{C}{mol\ e^-}\right) \times COD_{total}\ (mol) \times 4\left(\frac{mol\ e^-}{mol\ O_2}\right)}$$

$$CE = \frac{Q_{output}}{Q_{input-r}} = \frac{\sum I(A)t(s)}{96485\left(\frac{C}{mol\ e^-}\right) \times COD_{removed}\ (mol) \times 4\left(\frac{mol\ e^-}{mol\ O_2}\right)}$$

where $Q_{output}$ is the produced charge, $Q_{input}$ is the total charge available in the added organic compounds, $Q_{input-r}$ is the total charge available in the removed organic compounds, I is electric current and t is time. COD total is the total COD input to the anode compartment in the period of time t, and is calculated based on the initial COD concentration multiplied by the initial anolyte volume. COD removed is the removed COD within time t. The removed COD was also expressed in percentage as a ratio of initial COD input and final remaining COD. Energy consumption in the OsMFC was mainly due to the recirculation of the anolyte and the catholyte by pumps. The power required for the recirculation pump was estimated as (Kim et al., 2011):

$$P = \frac{Q\gamma E}{1000}$$

where P is power requirement (kW), Q is flow rate (m$^3$/s), $\gamma$ is 9800 N/m$^3$, and E is the hydraulic pressure head (m). For the OsMFC, Q was $1.67 \times 10^{-6}$ m$^3$/s (100 mL/min) for both anode and cathode recirculation, and the measured hydraulic pressure head loss was 0.01 m; thus, the total power required for the recirculation pumps was $1.6 \times 10^{-7}$ k W.

B. Results

1. OsMFC Fed on Acetate Solution

Figure 19:
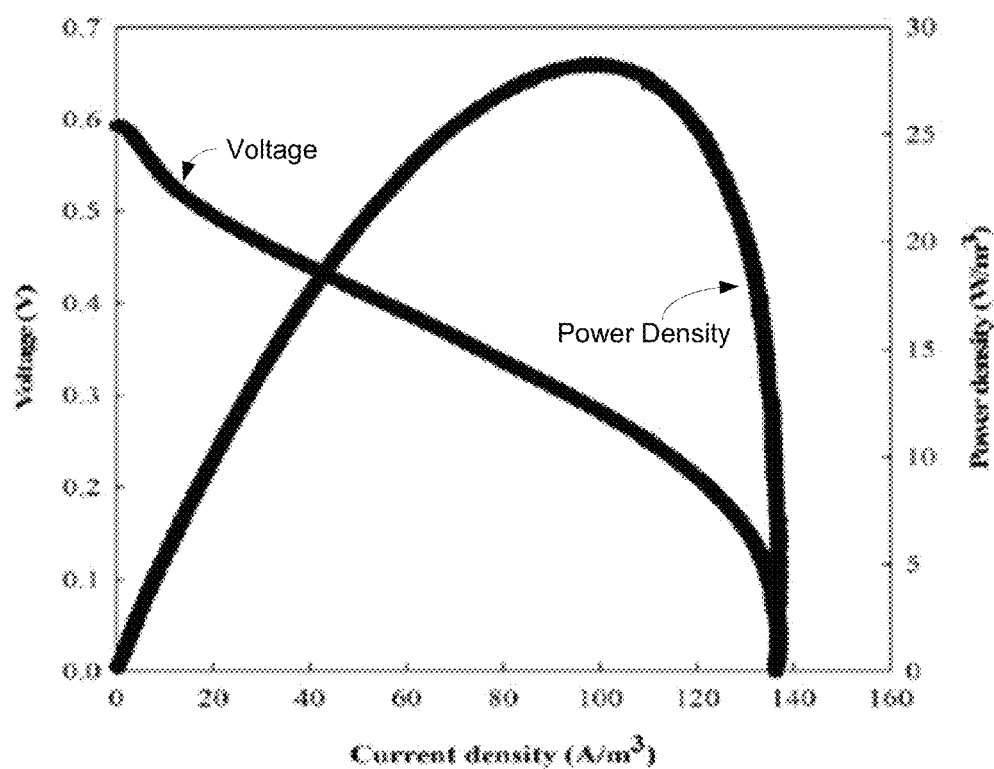
FIG. 19 is a graph depicting polarization curves from an OsMFC.
Figure 20:
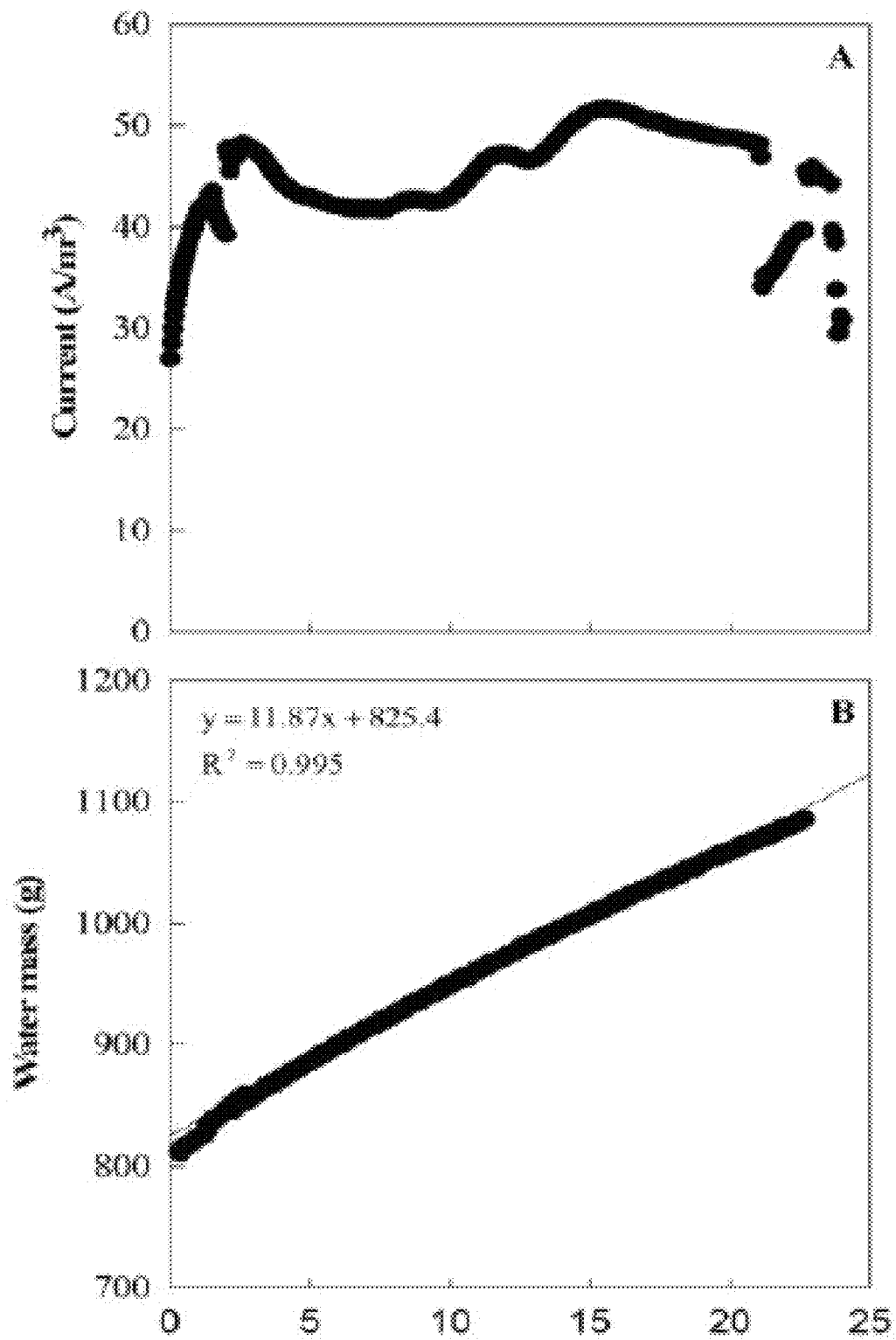
FIG. 20 is a pair of graphs showing the performance of an OsMFC under batch operation treating an acetate solution, in which (A) shows electric current generation and (B) shows water mass, each as a function of time.

The OsMFC generated electricity and produced water flux with the acetate solution. The polarization test demonstrated the open circuit potential was 0.6 V (FIG. 19). The maximum current density was 136.3 A/m$^3$ and the maximum power density was 28.2 W/m$^3$, much higher than our previous OsMFC fed with a similar acetate solution (Zhang et al., 2011). This increased performance of electricity generation resulted from an optimized configuration of the present OsMFC compared with the previous one, which consisted of two glass bottles with a small membrane surface area and was inefficient for electricity generation. The batch operation exhibited a current profile affected by the organic substrate: the current increased upon the replacement of the anode solution, fluctuated (between 40 and 50 A/m$^3$) for about 20 h and decreased due to the depletion of the organic substrates (FIG. 20A). The OsMFC removed 82.5±9.0% of COD at an initial COD loading rate of 0.6±0.1 kg/m$^3$/d, and achieved a CE of 20.9±6.9% and a CR of 17.1±5.6% (Table 1). Increasing the recirculation rates of both the anolyte and the catholyte from 100 to 200 mL/min improved electricity generation with an increased electric charge from 716 to 1223 C; however, further increase in the recirculation rates to 300 and 400 mL/min did not obviously affect electricity generation, suggesting that a mixing intensity above 200 mL/min might be sufficient for substrate distribution within the anode compartment. A similar result for the recirculation rate was observed in our previous studies of a conventional MFC (Zhang et al., 2010). The pH of the catholyte in the OsMFC increased to 9.9±0.4 because of the cathodic oxygen reduction reaction (Zhao et al., 2006), while the pH of the anolyte slightly decreased to 6.4±0.3 in a cycle of 22-h operation (Table 1).

TABLE 1

The OsMFC performance with acetate solution or actual wastewater (WW)

| Operation | Substrate | pH Anode | pH Cathode | SCOD Removal (%) | CE (%) | CR (%) | Average Flux (LMH) | Effluent Reduction (%) |
|---|---|---|---|---|---|---|---|---|
| Batch mode | Acetate (22 h) | 6.4 ± 0.3 | 9.9 ± 0.4 | 82.5 ± 9.0 | 20.9 ± 6.9 | 17.1 ± 5.6 | 1.22 ± 0.13 | 57.8 ± 6.0 |
| | WW (24 h) | 7.6 | 8.4 | N/A | N/A | N/A | 1.30 | 64.2 |

TABLE 1-continued

The OsMFC performance with acetate solution or actual wastewater (WW)

| Operation | Substrate | pH Anode | pH Cathode | SCOD Removal (%) | CE (%) | CR (%) | Average Flux (LMH) | Effluent Reduction (%) |
|---|---|---|---|---|---|---|---|---|
| Continuous mode | WW (10 h) | N/A | 8.6 ± 0.1 | 50.0 ± 18.1 | 83.8 ± 38.2 | 37.3 ± 8.0 | 1.26 ± 0.07 | 34.2 ± 2.0 |
| | WW (24 h) | 6.9 ± 0.3 | 8.4 ± 0.3 | 74.8 ± 3.9 | 56.4 ± 13.3 | 42.1 ± 9.1 | 1.06 ± 0.16 | 69.5 ± 10.5 |

SCOD: soluble COD
CE: coulombic efficiency
CE: coulombic recovery
N/A: data not available Water movement across the FO membrane was observed with an increased water mass in the cathode compartment (FIG. 20B). This water flux diluted the catholyte and resulted in a lower conductivity of 84.1±6.5 mS/cm at the end of an operation cycle. The anolyte conductivity, on the other hand, was doubled to 15.2±2.5 mS/cm, because of the concentrated effect from water loss (to the cathode compartment); reverse permeation of draw solute into the anode compartment might also increase the conductivity of the anolyte (Phillip et al., 2010; Hancock et al., 2009). The OsMFC achieved water flux of 1.22±0.13 LMH, much lower than those in previous FO studies (Achilli et al., 2009; Yip et al., 2012; Yang et al., 2009). This low water flux could be due to a large concentration polarization (CP) resulting from low cross-flow velocity, FO membrane fouling, and the internal membrane structure. At a recirculation rate of 400 mL/min, the cross-flow velocity in the OsMFC was about 0.26 cm/s, much lower than the 2.3-58 cm/s employed in the FO studies (Li et al., 2012; Lee et al., 2012; Cath et al., 2012; Phuntsho et al., 2011; Mi et al., 2008; Zou et al., 2011). Biofilm formation on the active layer of the FO membrane might also adversely affect water flux, which is addressed in greater detail in the following sections.

2. OsMFC Fed on Domestic Wastewater, Batch Mode

Figure 21:
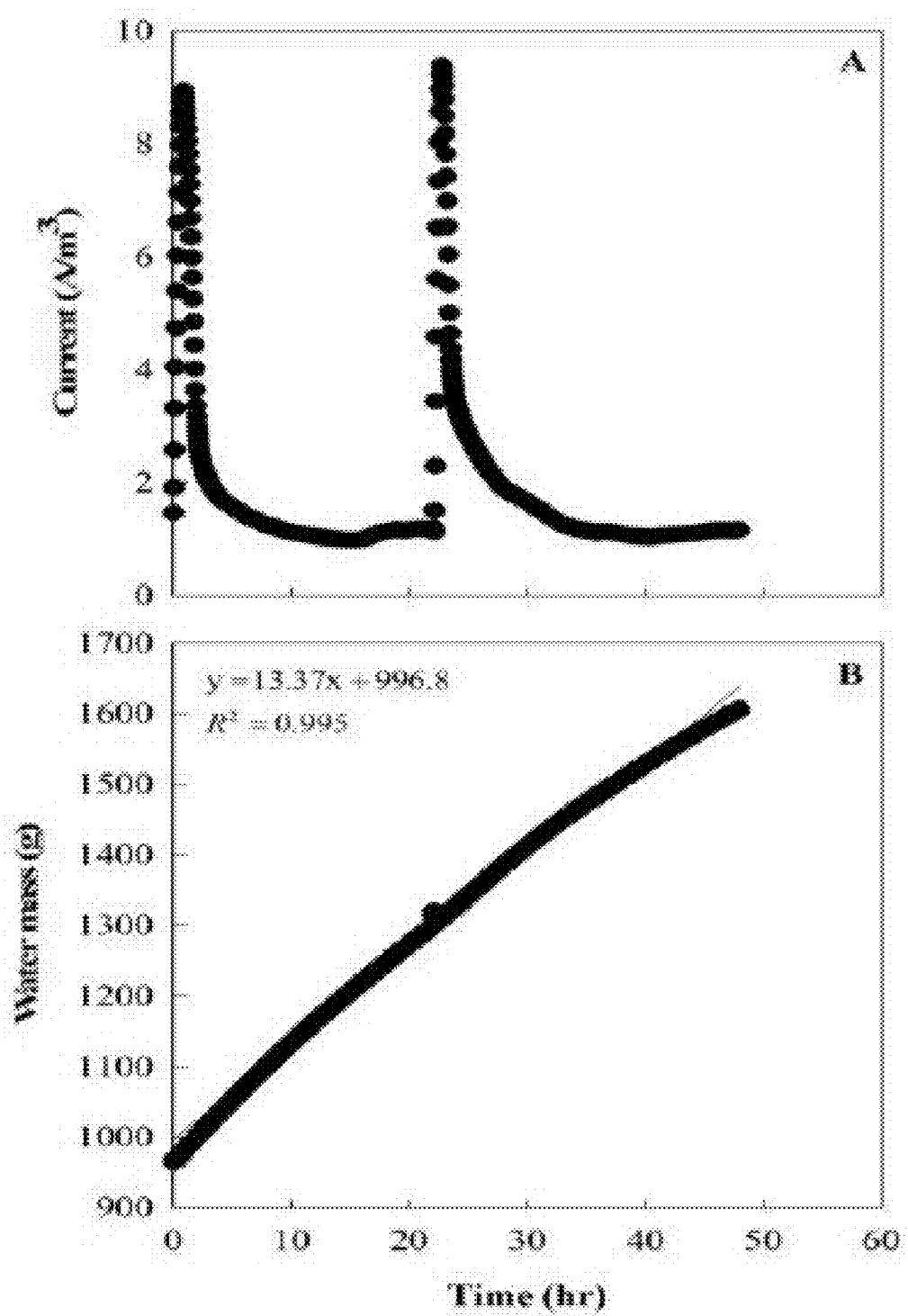
FIG. 21 is a pair graphs depicting batch operation of an OsMFC treating wastewater, in which (A) shows electric current generation and (B) shows water mass, each as a function of time.

When the actual wastewater was fed into the anode compartment in a batch mode, the OsMFC exhibited a current profile with a sharp peak current of about 9 A/m$^3$ followed by a quick decrease (FIG. 21A). The total charged accumulated in a cycle was 155.8 C. Within a similar operating cycle, electricity generation from the actual wastewater was much lower than that of the acetate solution, most likely due to a lower organic input. The wastewater contained soluble COD (SCOD) varying between 64 and 96 mg/L, significantly lower than 1500 mg/L of the acetate solution. In addition, the organic compounds in wastewater are more complex than acetate and thus more difficult to be biologically degraded. Water flux, however, was not obviously affected by the change of the acetate solution to the wastewater, and the increase in water mass in the cathode compartment was slightly more than that with the acetate solution (FIG. 21B). The OsMFC achieved water flux of 1.30 LMH (Table 1) because of a lower conductivity of the wastewater than the acetate solution, thereby creating larger osmotic difference across the FO membrane and thus a higher osmotic pressure to drive water movement. Water flux from the anode into the cathode decreased the volume of wastewater from 1000 to 358 mL, or a 64.2% reduction in effluent discharge.

3. OsMFC Fed on Domestic Wastewater, Continuous Operation

Figure 22:
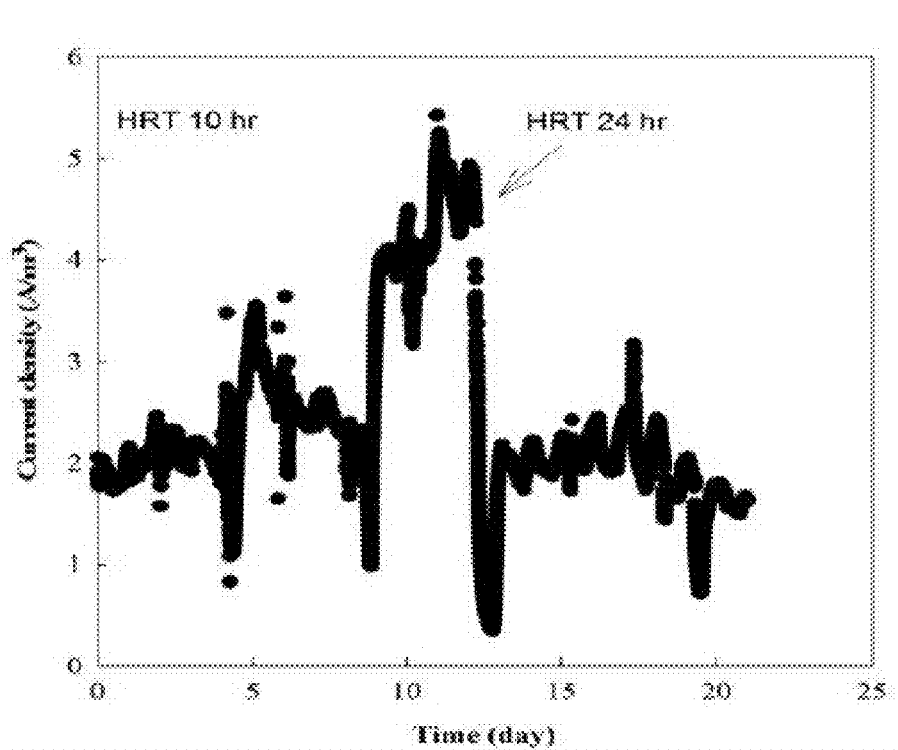
FIG. 22 is a graph depicting electric current generation as a function of time for an OsMFC under continuous operation and treating wastewater.
Figure 23:
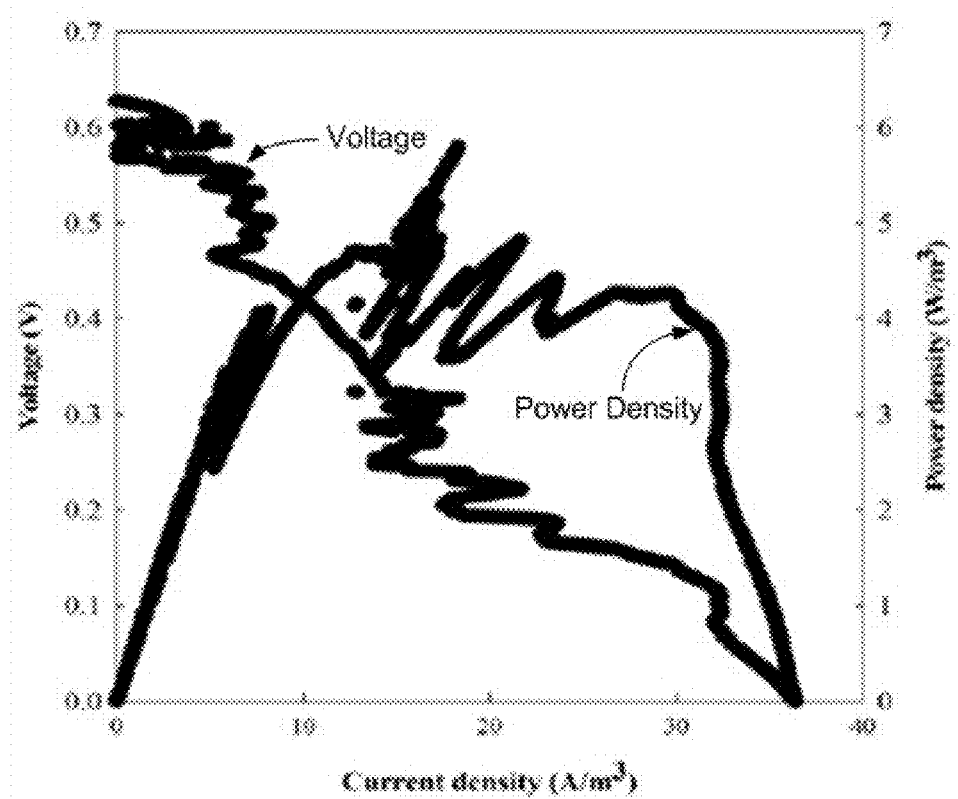
FIG. 23 is a graph depicting polarization curves of an OsMFC under continuous operation and treating wastewater.
Figure 24:
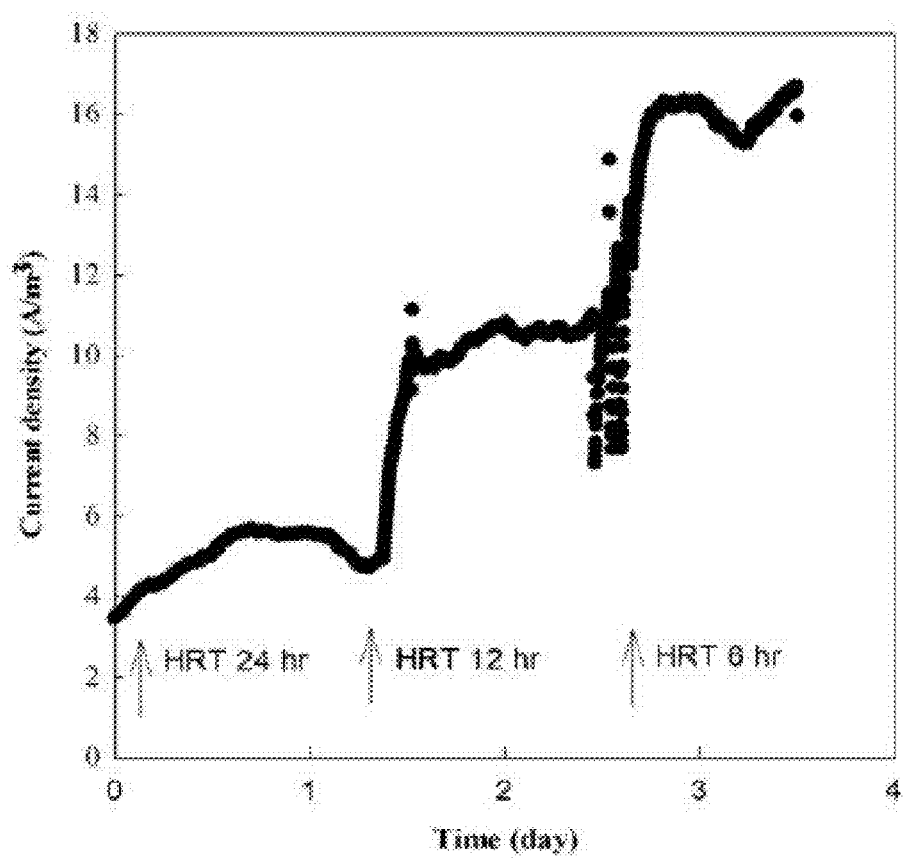
FIG. 24 is a graph depicting electric current generation as a function of time for an OsMFC.

The continuous supply of wastewater to the OsMFC constantly produced electricity; because of the complicated composition and the low organic concentration of the wastewater, the current generation fluctuated at a low level around 2 A/m$^3$ (FIG. 22). Extending the HRT from 10 to 24 h slightly decreased the current production. Similar to current generation, the polarization curve showed some unstable responses during the voltage scanning, but useful information could still be extracted: the open circuit voltage was 0.63 V, the maximum power density was about 4.5 W/m$^3$ and the maximum current density reached 37 A/m$^3$ (FIG. 23). During a short-period test of step increase in the organic loading rate (decrease in HRT from 24 to 12 and then 6 h), it was observed that electricity generation increased with the increasing organic loading, indicating that current generation was limited by organic supply (FIG. 24 and Table 2).

TABLE 2

The OsMFC performance during the step-decrease of wastewater HRT and increasing organic loading rate

| HRT (h) | SCOD Loading (kg/m$^3$/d) | Current Density (A/m$^3$) | Power Density (W/m$^3$) | Energy Production (kWh/m$^3$) | Energy Protection (kWh/m$^3$) | Energy Consumed (kWh/m$^3$) | Average Flux (LMH) | Effluent Reduction (%) |
|---|---|---|---|---|---|---|---|---|
| 24 | 0.15 | 5.3 | 0.10 | 0.002 | 0.108* | 0.011 | 1.11 | 72.2 |
| 12 | 0.31 | 10.0 | 0.36 | 0.004 | 0.054* | 0.005 | 1.33 | 43.4 |
| 6 | 0.62 | 15.1 | 0.82 | 0.005 | 0.027* | 0.003 | 1.49 | 24.3 |

*Assumes a power output of 4.5 W/m$^3$ that is obtained from FIG. 6. The actual maximum power density at a shorter HRT (12 and 6 h) could be higher due to a larger substrate supply.

Higher organic loading rates also improved energy production: at HRTs 12 and 6 h, the total energy production was 0.004 kWh/m$^3$ and 0.005 kWh/m$^3$, respectively, both of which are close to the energy consumed by the pumps, suggesting the possibility of a self-sustained OsMFC system in terms of energy. It must be noted the OsMFC was not operated at its maximum power output during those tests; according to FIG. 23, the maximum power output at HRT 24 h was about 4.5 W/m$^3$, which will be even higher at a shorter HRT because of the larger substrate supply. Assuming the OsMFC runs at 4.5 W/m$^3$, the energy production will be much higher than the energy consumed (Table 2). The key factors to accomplish such an energy-neutral system include energy production that can be further improved through optimizing OsMFC configuration and increasing organic supply, and energy consumption that is mainly determined by the recirculation of electrolytes.

Water flux increased slightly with decreasing HRTs (Table 1 and 2), possibly because the faster supply of low-salinity wastewater at a lower HRT reduced concentration polarization on the active layer of FO membrane facing the anode, compared with a high HRT that had a slower wastewater influent and accumulated salts due to water loss and reverse salt flux. However, the reduction in wastewater effluent decreased with decreasing HRTs, because more wastewater was fed into the anode at a lower HRT. At HRT 10-12 h, which is similar to that of aerobic biological wastewater treatment, the OsMFC reduced 30-40% of wastewater effluent (Table 1 and 2). This reduction, or increased water reuse, will help accomplish sustainable water management while reducing freshwater use, achieving both environmental and economical benefits (Anderson, 2003).

The recirculation rates of electrolytes could affect the shear condition on the surface of the FO membrane and concentration polarization, thereby influencing water flux. The OsMFC achieved low water flux (<1.50 LMH) in both batch and continuous operation; to explore whether water flux can be improved by a higher recirculation rate, the recirculation rate of catholyte was increased to 3000 mL/min. The recirculation rate of anolyte was maintained unchanged, because a high rate could disturb the biofilm that formed on the anode electrode and thus affect the anode performance. In addition, it was found that a better mixture on the drawing side may reduce concentration polarization (Grubera et al., 2011). Unfortunately, we did not observe a significant increase in water flux to a level comparable to that in previous FO studies. The OsMFC achieved 1.97 LMH at high recirculation of the catholyte, which increased to 2.15 LMH when the carbon cloths on both sides of the FO membrane were removed. The low water flux was likely due to an inefficient configuration (large and thick compartment) of the OsMFC that did not create a high cross-flow velocity. At 3000 mL/min, the cross-flow velocity was only 2 cm/s; adding mesh on both sides of the FO membrane did not help improve flow turbulence, possibly due to its small pore size. In addition, it is well known that internal concentration polarization (ICP), which is hardly reduced by increasing flow rate or turbulence, can greatly reduce water flux (Zhao et al., 2012).

4. FO Membrane Fouling

Figure 25:
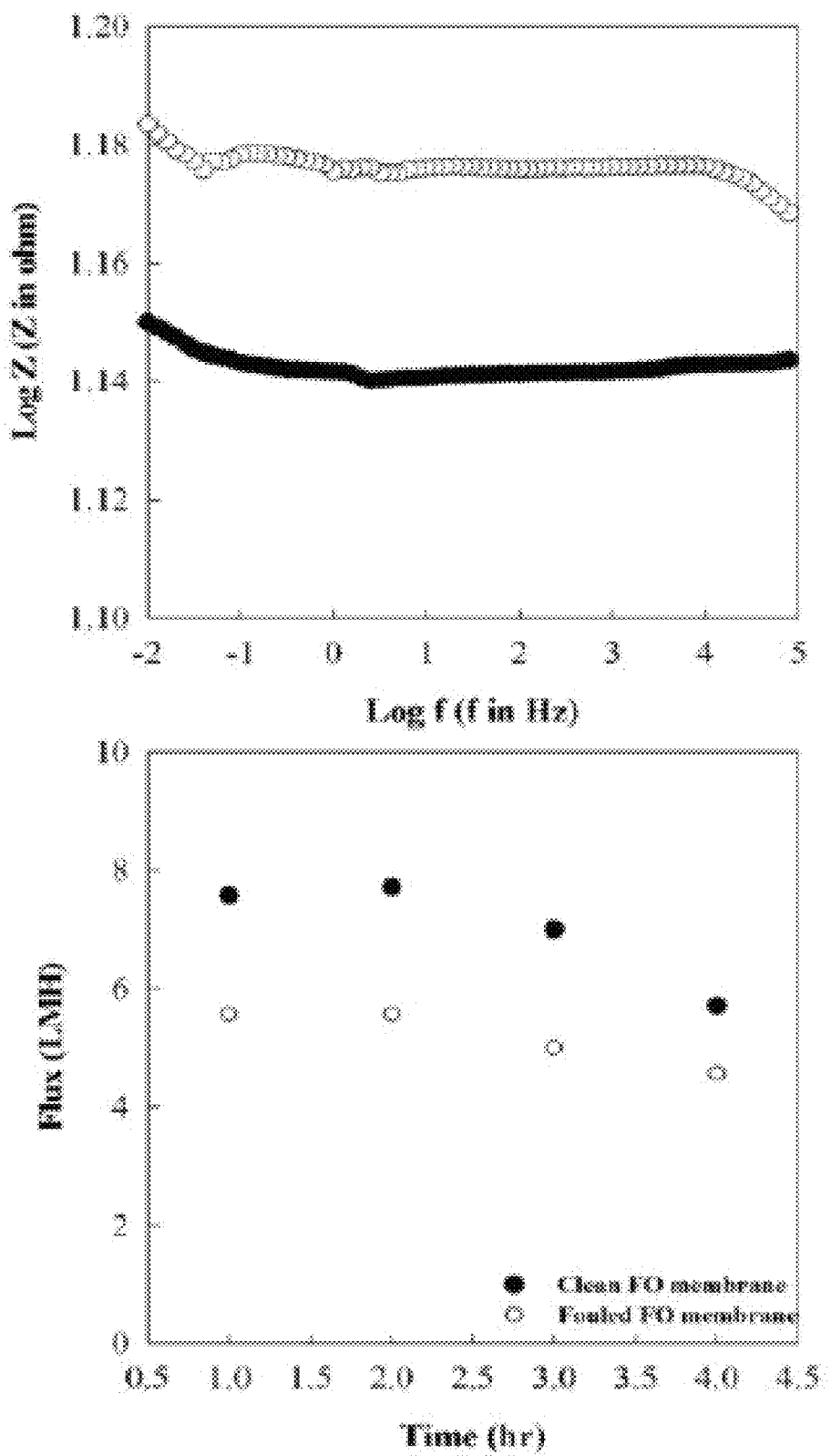
FIG. 25 is a pair of graphs comparing clean and fouled forward osmosis membranes, in which (A) shows a bode plot of electrochemical impedance spectroscopy and (B) shows the results from a short-term water flux test.
Figure 26:
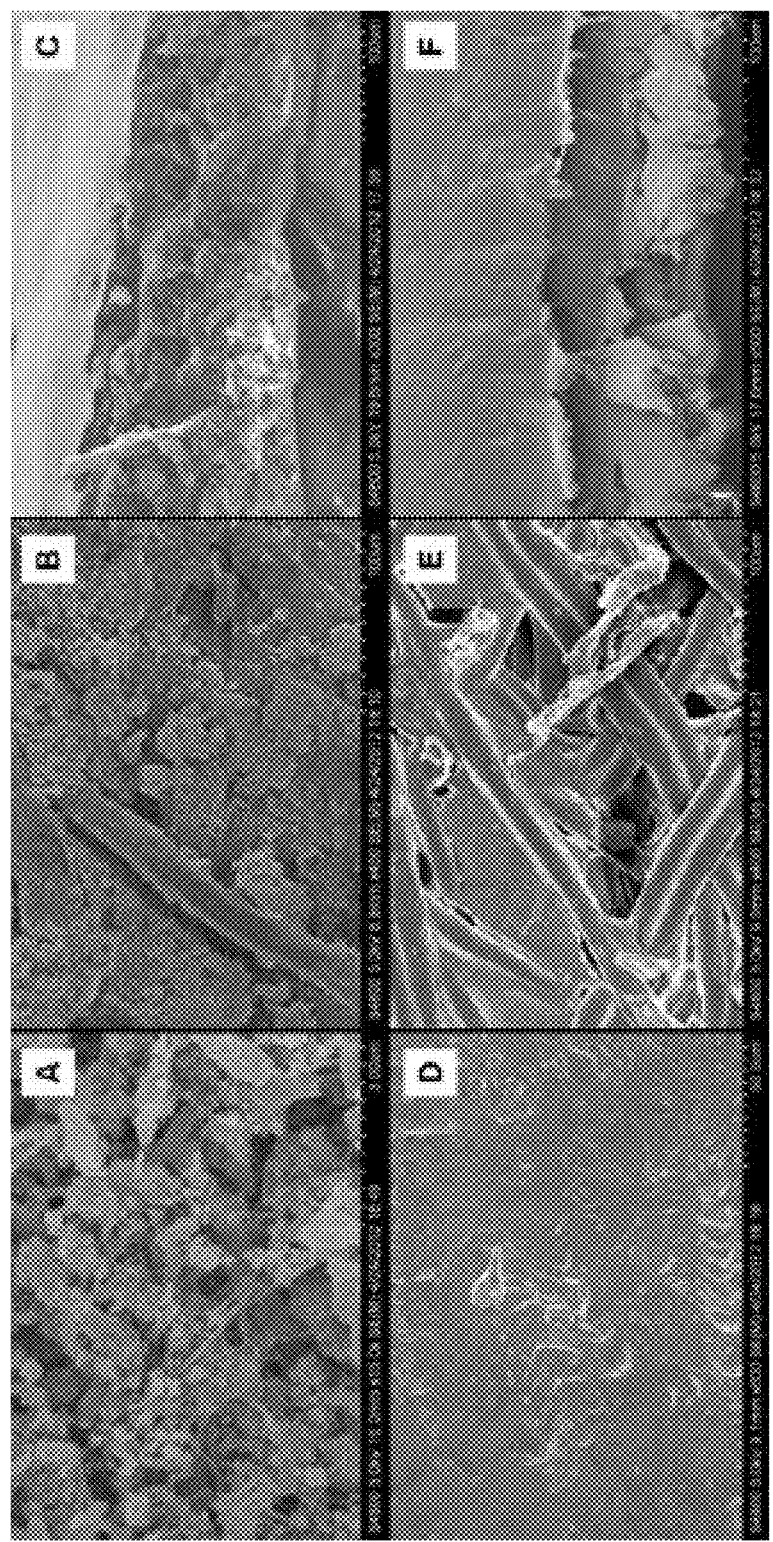
FIG. 26 is a series of scanning electron microscope images of a clean and a fouled forward osmosis (FO) membrane, in which (A) shows an active side of the fouled FO membrane, (B) shows a support side of the fouled FO membrane, (C) shows a cross-section of the fouled FO membrane, (D) shows an active side of the clean FO membrane, (E) shows a support side of the clean FO membrane, and (F) shows a cross-section of the clean FO membrane.

After operating the OsMFC for more than 100 days (about 50% of the time on wastewater and the other 50% on acetate solution), the FO membrane was removed to analyze any fouling. The EIS data showed an increase in impedance of the fouled membrane compared with the clean membrane (FIG. 25A), suggesting the appearance of the fouling (Gao et al., 2012). The 4-h water flux test revealed the fouled membrane achieved a lower average water flux of 5.2 LMH than the 7.1 LMH of a clean membrane (FIG. 25B). It was observed in the SEM pictures that the anode side of the fouled FO membrane contained a large number of microorganisms (FIG. 26A) as compared to the anode side of the clean FO membrane (FIG. 26D), while the cathode side of the fouled FO membrane was covered by abiotic scaling (FIG. 26B) as compared to the cathode side of the clean FO membrane (FIG. 26E). The cross-section of the fouled FO membrane was filled with fouling compounds (FIG. 26C) as compared to the cross-section of the clean FO membrane (FIG. 26F). EDS analysis showed that various compounds, including phosphate, iron, and calcium, were detected on both sides of the membrane, and the dominant species by weight were phosphate, nitrogen, oxygen, sulfur, and calcium, where the weight percentages of those compounds differed between the two sides of the membrane (data not shown).

A major challenge of applying FO membranes in wastewater treatment is membrane fouling. Our results showed both biofouling and abiotic scaling caused by microorganisms and organic/inorganic compounds in wastewater, which adversely affected the membrane performance. Unlike an osmotic membrane bioreactor that can take advantage of aeration to alleviate fouling (Achilli et al., 2009; Cornelissen et al., 2011), the anode of an OsMFC is anaerobic and has no gas bubbling; therefore, the fouling can be more serious. Our previous study suggested that backwash has a limited effect on reducing the fouling in an OsMFC (Ge et al., 2012); therefore, a suitable method for membrane cleaning is critical for application of OsMFCs. Possible approaches include recirculating biogas produced in the anode to remove fouling, optimizing the anode compartment to improve the shear effect of water flow, and designing a removable membrane for external cleaning. On the other hand, our results also demonstrated the durability of the FO membrane. Without major cleaning (except for periodic, short-term soaking of one side of the membrane in DI water), the FO membrane worked for more than 100 days under a tough condition (in the presence of microorganisms and various organic and inorganic compounds), which proves that FO membranes are low-fouling membranes.

C. Summary

This study investigated the performance of an OsMFC treating actual domestic wastewater. The OsMFC achieved water flux of 1.06-1.49 LMH and reduced wastewater effluent by 24.3-72.2% depending on hydraulic retention time. Increasing the recirculation rate of the catholyte from 100 to 3000 mL/min slightly improved water flux to 2.15 LMH. The low water flux was likely due to inefficient reactor configuration, membrane fouling, and concentration polarization. The OsMFC constantly produced bioelectricity and achieved a maximum power density of 28.2 W/m$^3$ from an acetate solution, or 4.5 W/m$^3$ from domestic wastewater. Preliminary energy analysis suggested the OsMFC has the potential to produce more energy than was consumed by the pumping system, thereby creating an energy-neutral wastewater treatment system. After operating the OsMFC for more than 100 days, the FO membrane was analyzed for fouling using electrochemical techniques, imaging, and water flux tests and the results revealed microbial fouling and abiotic scaling on the surface and inside the FO membrane.

In other words, in the above study, the OsMFC design was optimized for better electricity generation and analyzed its performance with actual domestic wastewater. The results showed the OsMFC could effectively remove organic contaminants from wastewater, greatly reduce the effluent discharge via forward osmosis, and produce bioelectricity that is potentially sufficient (depending on the operating condition) to support the pumping system. Furthermore, we found that the low water flux obtained in our OsMFC was mainly due to low shear effect and membrane fouling; concentration polarization would also decline the water flux, but more data are needed to address it. The fouling of the FO membrane used for a long-term operation (>100 days) was analyzed using an SEM, and microbial fouling was observed and identified dominant inorganic compounds on the membrane using EDS. This study advanced the understanding of the OsMFC system and could help further develop it to a sustainable wastewater treatment technology.

The results of this study demonstrated that an OsMFC can recover bioenergy from domestic wastewater through bio-electrochemical reactions and reduce wastewater effluent via water extraction by forward osmosis. Electricity generation was affected by organic loading rates (both organic concentration and hydraulic retention time). Water flux was influenced by recirculation rate (e.g., low shear effect due to inefficient reactor configuration), membrane fouling, and concentration polarization. To implement OsMFCs' environmental and energy sustainability (e.g., water reuse and energy neutral), future studies will optimize the reactor configuration, examine anti-fouling or membrane cleaning methods, and scale-up the system.

Example 4

Salinity Reduction and Water Recovery in an Osmotic Microbial Desalination Cell (OsMDC)

Figure 27:
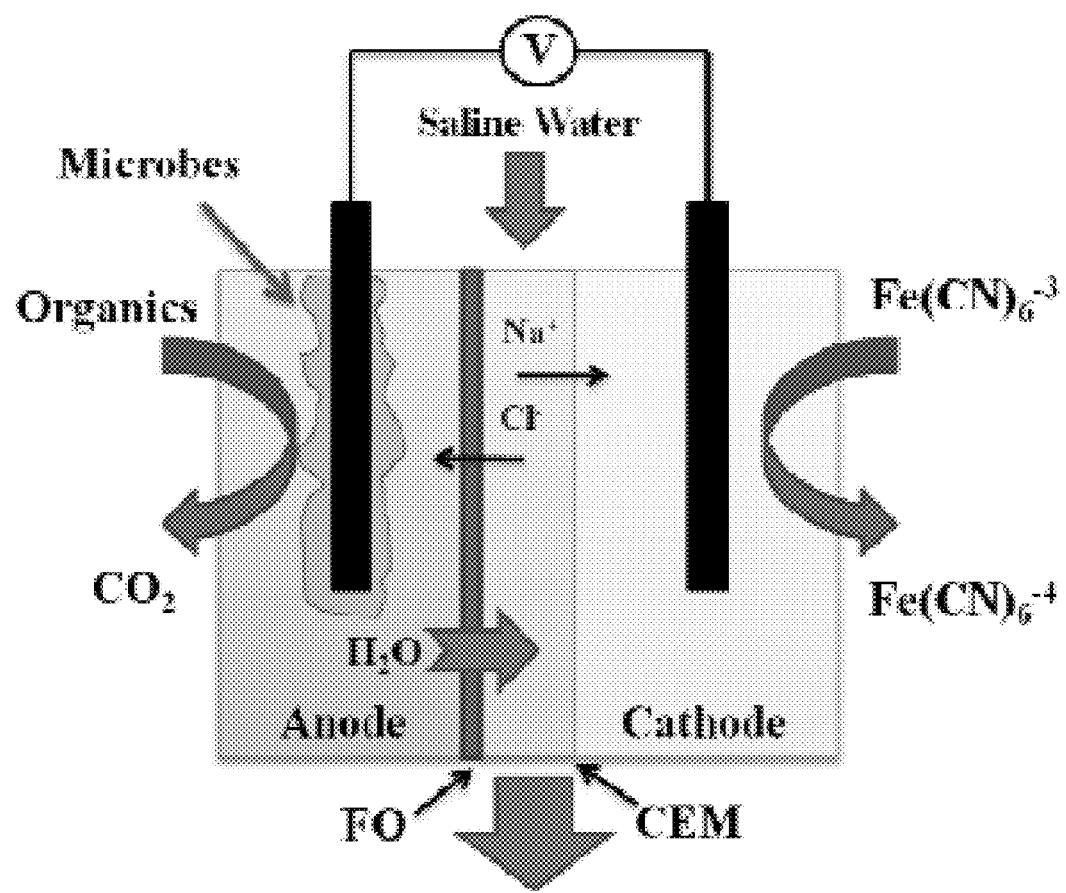
FIG. 27 is a schematic showing an exemplary OsMDC.

This study extends the concept of the OsMFC to MDC technology and creates a novel osmotic microbial desalination cell (OsMDC). The anion exchange membrane (AEM) that separates the anode and the middle chamber in a conventional MDC was replaced by an FO membrane in the OsMDC; a cation exchange membrane (CEM) was still used between the cathode and the middle chamber (FIG. 27). With such a change, high-quality water can be extracted from the anode through the FO process to dilute the saline water in the middle chamber, which will also be desalinated via electricity generation, similar to that in a conventional MDC. The feasibility of the OsMDC was examined under different operating conditions and salinities, and it was compared with a conventional MDC in terms of desalination and water production. To ensure that OsMDC performance was not limited by the reactions in the anode and cathode, organic substrates were oversupplied to the anode and potassium ferricyanide was used as a terminal electron acceptor in the cathode.

A. Materials and Methods
1. OsMDC Setup and Operation

Both the OsMDC and MDC were made of glass reactors with three chambers, anode, middle and cathode. In the conventional MDC, an anion exchange membrane (AEM, Membrane International Inc., Ringwood, N.J., USA) was installed between the anode and the middle chambers; in the OsMDC, the AEM was replaced by an FO membrane (Hydration Technology Innovations, LLC, Albany, Oreg., USA). The cathode and the middle chambers were separated by a cation exchange membrane (Membrane International Inc.) in both OsMDC and MDC. The liquid volumes of the anode and the cathode chambers were about 60 mL each. The middle chamber was linked to an external storage bottle and the total saline water volume was 75 mL. Both the anode electrode and cathode electrode were carbon brush (Gordon Brush Mfg. Co., Inc., Commerce, Calif., USA). Before use, the brush electrodes were pre-treated by immersion in acetone overnight and heated at 450° C. for 30 min.

The OsMDC and MDC were operated at a room temperature of about 20° C. The anode was continuously fed with a solution (artificial wastewater) prepared containing (per L of tap water): sodium acetate, 4 g; $NH_4Cl$, 0.15 g; NaCl, 0.5 g; $MgSO_4$, 0.015 g; $CaCl^2$, 0.02 g; $NaHCO_3$, 0.1 g; $KH_2PO_4$, 0.53 g; $K_2HPO_4$, 10.7 g; and trace element, 1 mL. The cathode was continuously fed with (per L of tap water): $K_3FeCN_6$, 32.926 g, $KH_2PO_4$, 5.3 g and $K_2HPO_4$, 10.7 g. The flow rates of anolyte and catholyte were both 0.17 mL per min, resulting in a hydraulic retention time of 5.9 h in each chamber. The anolyte was recirculated at 30 mL/min. The saline water was prepared by dissolving either NaCl (5, 10 or 20 g/L) or aquarium sea salt (35 g/L. Aquarium Systems, Inc., Mentor, Ohio, USA) in tap water. The middle chamber was operated as a fed-batch with a cycle of three days and the saline water was recirculated at 15 mL/min.

2. Measurement and Analysis

The cell voltage was recorded every 180 seconds by a digital multimeter (2700, Keithley Instruments, Inc., Cleveland, Ohio, USA). The pH was measured using a benchtop pH meter (Oakton Instruments, Vernon Hills, Ill., USA). The conductivity was measured by a benchtop conductivity meter (Mettler-Toledo, Columbus, Ohio, USA). The ionic concentrations were measured using two ion chromatographs (Dionex, Sunnyvale, Calif., USA). Water flux into the middle chamber was measured by using digital scales for the change of water weight during the course of experiments. Water flux was either expressed in mL or calculated as liter per surface area of the membrane per hour (L m$^{-2}$ h$^{-1}$-LMH).

Electrochemical impedance spectroscopy measurements were performed in a cell of two compartments separated by the membrane to be measured. We measured the impedance across the membrane using a potentiostat (Gamry Instruments, Warminster, Pa., USA) in a four-electrode mode, which includes two platinum electrodes as the working electrode and the counter electrode, and two Ag/AgCl as the reference electrodes. The frequency was set at the range of 0.01 Hz-100 kHz. The electrolyte was a NaCl solution of 35 g/L. The resistance measured at high frequency represents the combined solution and membrane resistance $R_{m+s}$. To obtain the pure membrane resistance $R_m$, the combined resistance is deducted by the solution resistance $R_s$, obtained from a blank experiment without the membrane over the same frequency range. To assure accuracy, we immersed the membrane in the electrolyte for 24 h before measurement.

B. Results
1. OsMDC Performance in Open and Closed Circuits

Figure 28:
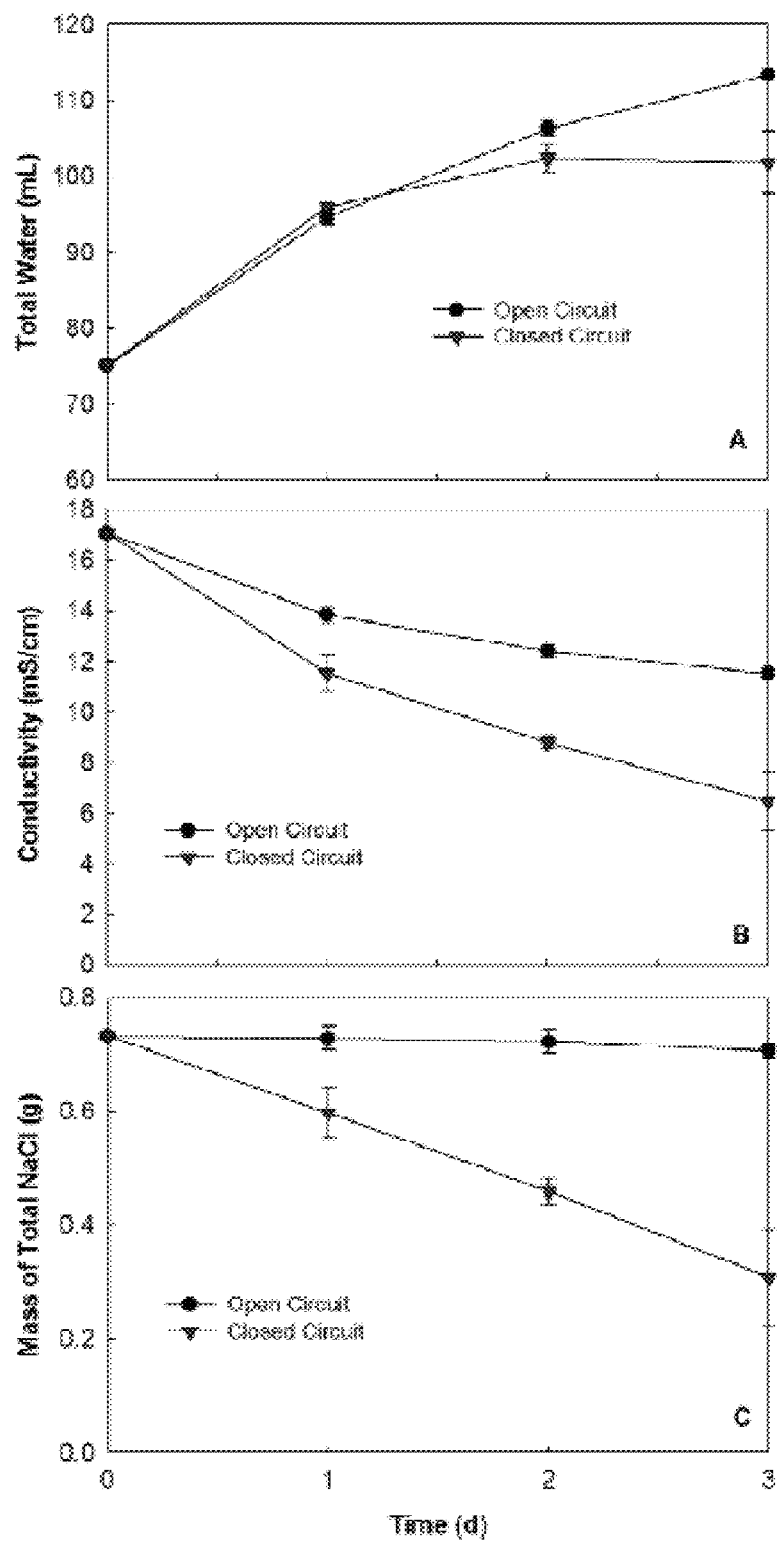
FIG. 28 is a series of three graphs comparing the performance of an OsMDC between open and closed circuits, in which (A) shows water volume, (B) shows conductivity, and (C) shows salt mass, each as a function of time.
Figure 32:
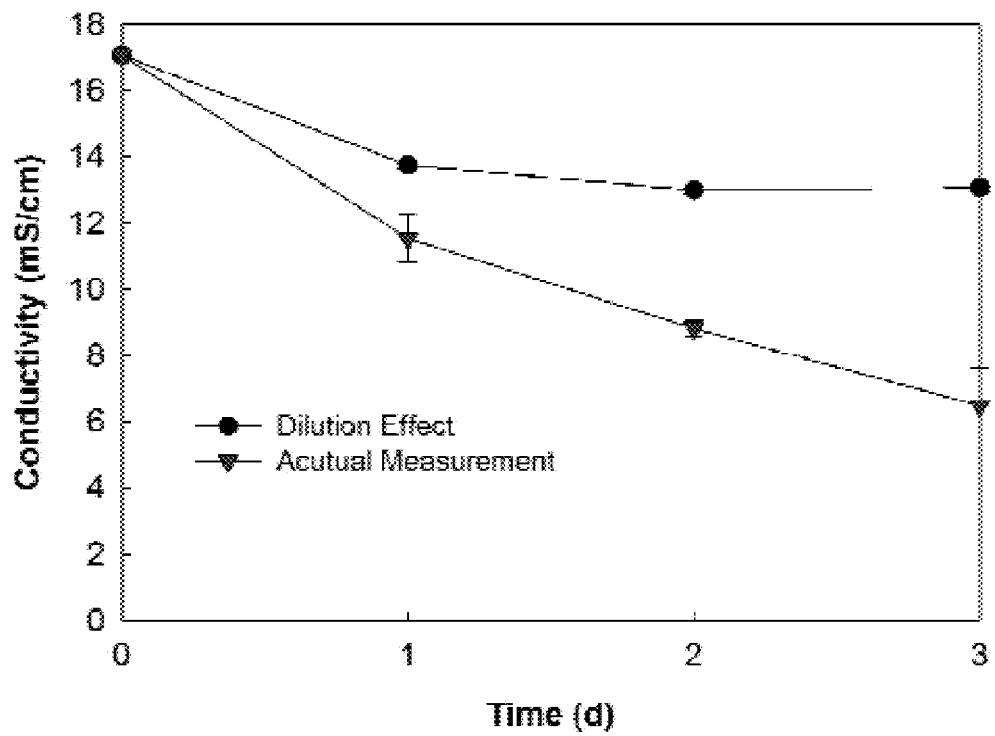
FIG. 32 is a graph showing the conductivity of salt solution chamber effluent from an OsMDC as a function of time.

First, OsMDC desalination was examined under the conditions of the open and the closed circuits, respectively. Because no electricity would be produced, the open circuit mimicked an FO process; the closed circuit was operated for high current generation (at a low external resistance of 1Ω) because more electron movement will remove more salt. In an operating cycle of three days and with an initial salt concentration of 10 g NaC/L, both conditions successfully extracted water from the anolyte, with higher water production (in the middle chamber) under the open circuit (FIG. 28A). The water flux at the end of three days was 0.42±0.01 LMH and 0.29±0.04 LMH for the open and the closed circuits, respectively. It should be noted that a higher water flux occurred in the early stage, then the water flux decreased over time due to the decreased salinity (osmotic pressure). For instance, at the end of the first day, both conditions achieved a similar water flux (0.65±0.05 LMH and 0.69±0.01 LMH). The water flux diluted the saline water and thus reduced its conductivity (salinity) in both conditions. The closed circuit had a much lower conductivity of 6.5±1.1 mS/cm, about 62% less than the initial conductivity of 17.1 mS/cm, compared with 11.5±0.2 mS/cm under the open circuit, which was about 33% less FIG. 28B). The difference in salinity reduction between the two conditions suggested that dilution was not the only factor that decreased salinity under the closed circuit, which was also supported by a theoretic estimation of dilution effect on conductivity reduction, assuming that water flux was the only factor under the closed circuit, in which the final conductivity with dilution effect would be 13.1 mS/cm, about twice the actual final conductivity (FIG. 32). The additional factor under the closed circuit was electricity generation.

Figure 33:
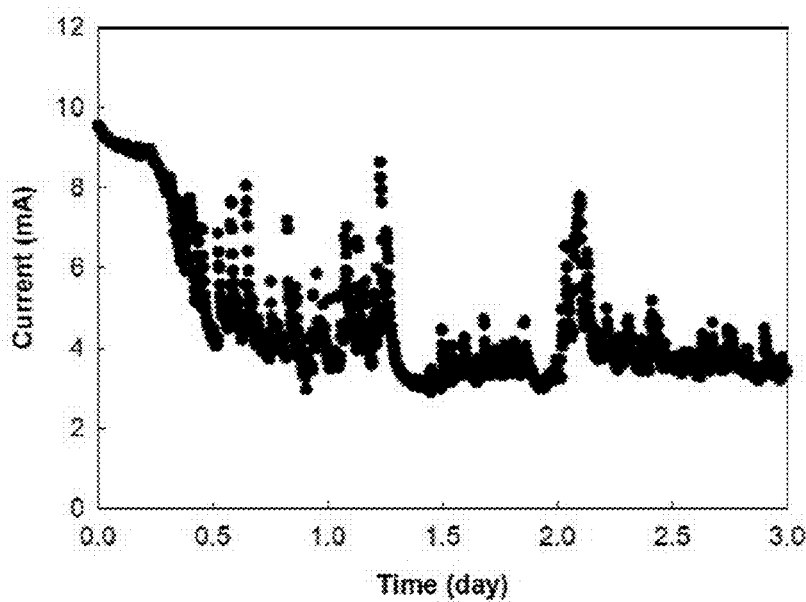
FIG. 33 is a graph showing electrical current generation as a function of time for an OsMDC.

At an external resistance of 1 Ohm, the OsMDC produced an average current of 4.6 mA during three days (FIG. 33). The electricity production required ion movements across the membranes, which led to desalination. With the data regarding the total water volume (FIG. 28A) and the conductivity (FIG. 28B), the mass of total NaCl remaining in the saline water was calculated (FIG. 28C). The results showed that significant salt removal (57.8%) occurred with the closed circuit, while the open circuit had a slight decrease (3.4%) in the salt mass after the three-day operation (FIG. 28C). This difference demonstrated that both water dilution and electric current reduced salinity in an OsMDC under the closed circuit, with the electric current playing a major role. Compared with the FO process (the OsMDC under the open circuit), the OsMDC has advantages in removing salt and reducing salinity, which will benefit the downstream desalination when the OsMDC acts as a pre-desalination unit.

2. Effects of Salinities on OsMDC Performance

The effects of salinities on the OsMDC performance were investigated and compared with a conventional MDC that had the AEM between the anode and the middle chambers. More water was extracted with higher salinity because of higher osmotic pressure (FIG. 29A). With the initial concentration of 20 g NaC/L, the water flux decreased from 1.46±0.06 LMH (day one) to 1.01±0.01 LMH (day three). The lowest initial salinity of 5 g/L produced 0.15±0.04 LMH in day one and a negative water flux of −0.06±0.05 LMH at the end of three days, because the salinity decreased to a level lower than that of the anolyte/catholyte, and reverse water flux occurred. The conductivity decreased with all three tested salt concentrations (FIG. 29B), and the reduction rate varied between 51.4% (5 g/L) and 62.0% (10 g/L). The reduction of salt mass behaved very differently: the OsMDC removed 65.9% and 57.8% of the salt for the initial concentrations of 5 and 10 g/L, and removed only 17.7% with 20 g/L (FIG. 29C). Considering that the current generation with those three initial salt concentrations was similar (data not shown) but water flux was very different, we concluded that the reduction in salinity with the low initial concentrations (5 and 10 g/L) was mainly due to salt removal by electricity generation; for higher initial concentrations (e.g., 20 g/L), dilution (water flux) was the major contributor.

Figure 29:
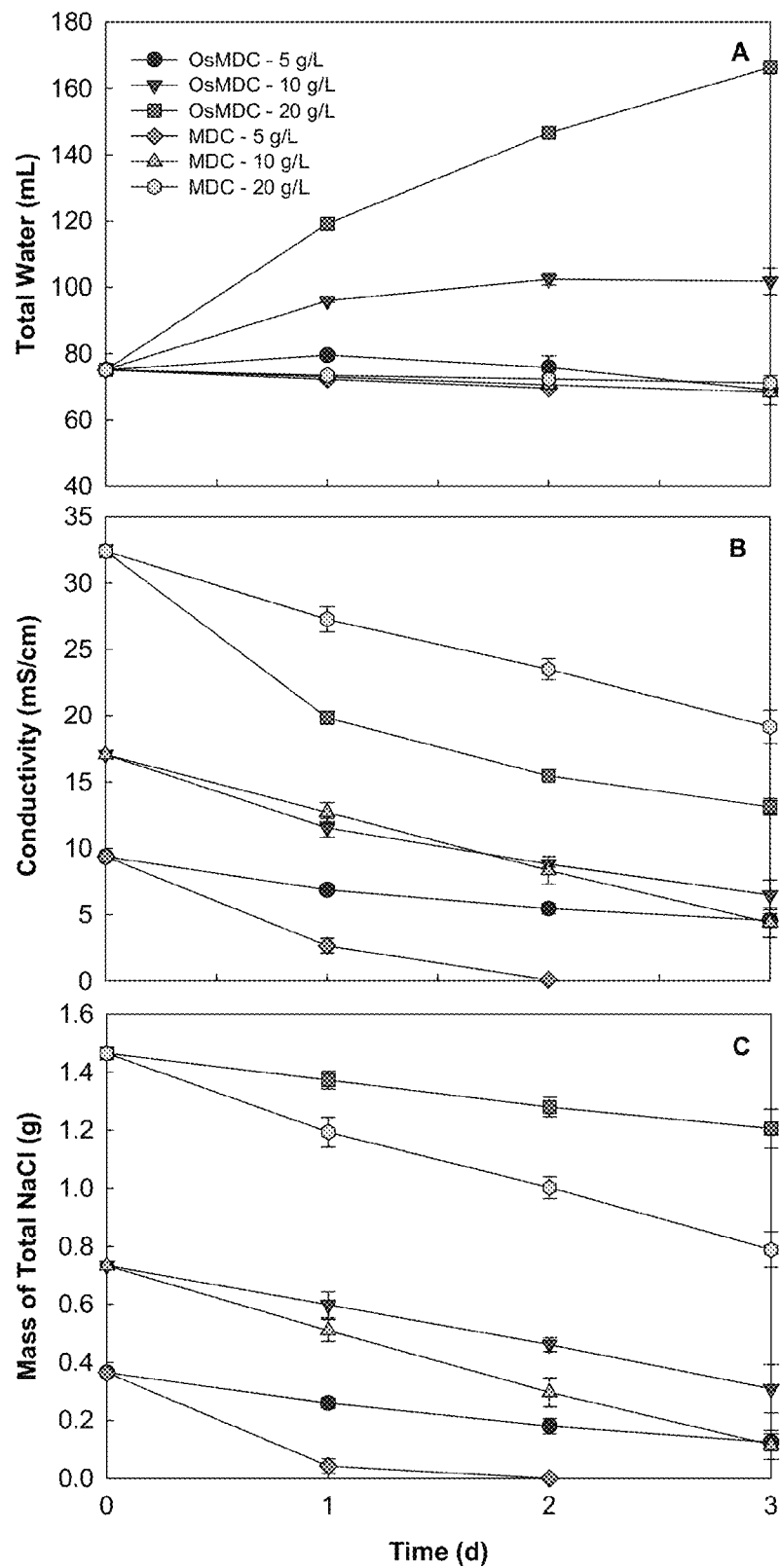
FIG. 29 is a series of three graphs comparing the performance of an OsMDC and an MDC under differing salt solution chamber influent salt concentrations, in which (A) shows water volume, (B) shows conductivity, and (C) shows salt mass, each as a function of time.

The comparison between the OsMDC and the MDC (FIG. 29) indicated the OsMDC was advantageous in extracting water and reducing salinity, but not in removing salt. No water flux into the middle chamber was observed in the MDC with all three initial salt concentrations (FIG. 29A); in fact, slightly negative water flux occurred, possibly because of higher salinity in the catholyte that caused water osmosis from the middle chamber to the cathode chamber. The MDC produced lower final conductivity than the OsMDC when the initial salt concentration was low (5 and 10 g/L) (FIG. 29B). With 5 g/L, the MDC decreased the salinity to 0.1±0.0 mS/cm in two days. However, at the higher initial salt concentration of 20 g/L, the MDC generated a final salinity of 19.2±1.3 mS/cm, higher than 13.1±0.6 mS/cm in the OsMDC. The MDC outperformed the OsMDC in salt removal with all three salt concentrations (FIG. 29C). The electricity generation in the MDC was similar to that in the OsMDC (data not shown). The final pH of the saline water in the OsMDC varied between 6.5 and 7.0, lower than 8.0 in the MDC, because the water flux promoted proton transport from the anode into the middle chamber.

Figure 30:
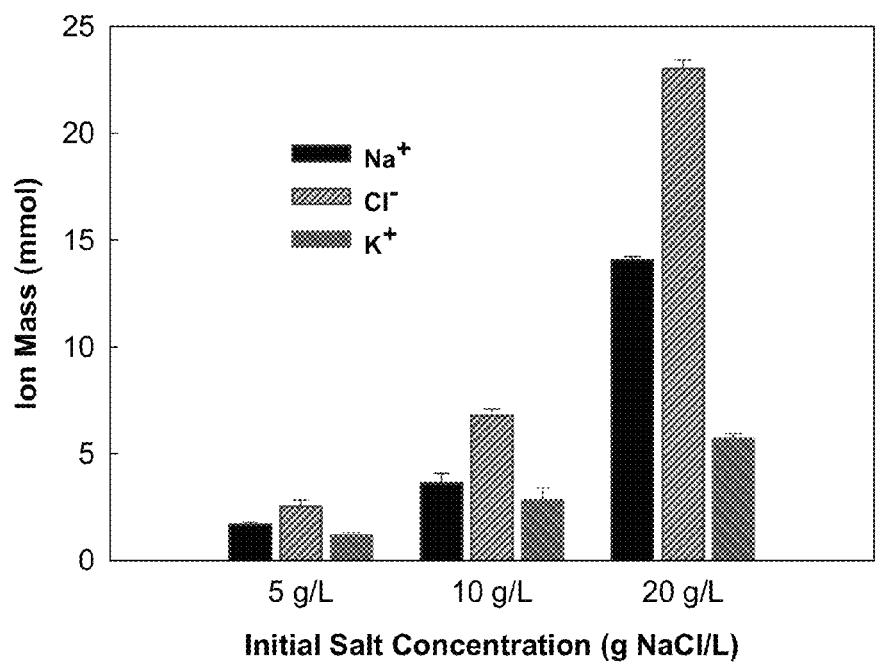
FIG. 30 is a bar chart depicting the molar mass of sodium, chloride, and potassium ions after three-day operation of an OsMDC for various initial salt concentrations.

3. Mass of Sodium, Chloride, and Potassium Ions in the Saline Water of the OsMDC after 3-Day Operation To understand why the OsMDC did not have good salt removal, we analyzed the mass of the individual ions in the saline water. Three ions, including two cations ($Na^+$ and $K^+$) and one anion ($Cl^-$), were detected and quantified (FIG. 30). Initially, there were only two ions, $Na^+$ and $Cl^-$, in the saline water with the equal molar mass (1:1). After the three-day operation, the ratio between those two ions became 1:1.5-1.9, suggesting that sodium ions were removed more quickly than chloride ions. In theory, both ions should be removed at the same rate because the transfer of every electron from the anode electrode to the cathode electrode should drive one sodium ion into the cathode and one chloride ion into the anode. This imbalance in ion removal was likely due to the FO membrane, which retarded chloride ions passing through. Unlike an AEM that only allows anions to move through, an FO membrane does not selectively transportions and it can reject a wide range of ions. As a result, sodium ions moved through the CEM into the cathode chamber driven by electron flow but chloride ions could not transport via the FO membrane into the anode chamber.

The imbalanced charge required additional cations into the middle chamber, which could come from both the anode and the cathode chambers. Although the water flux accelerated proton transport from the anode into the middle chamber, the quantity of protons was not sufficient to balance the charge. The intrusion of potassium ion from the cathode contributed to the charge balance, and the molar mass of $K^+$ measured in the saline water makes the ratio between cations and anions close to 1:1 (FIG. 30). The catholyte contained a large number of potassium ions from the potassium ferricyanide and potassium phosphate buffer, which facilitated $K^+$ movement; however, ion movement between the anode and the middle chamber is still required for electricity generation. Because the transport of chloride ions and protons was not sufficient to support electricity generation, the movement of cations from the anode into the middle chamber might be possible. One candidate of such cations is the sodium ion. The anolyte contained sodium ions from sodium acetate, sodium chloride, and sodium bicarbonate. Both water flux and electricity generation could drive sodium ions to leave the anode chamber and migrate into the middle chamber. We did not monitor the sodium concentration in the anode chamber because the anode chamber via acetate was maintained at a high concentration; therefore, the pathway of cation movement from the anode to the middle chamber needs further verification.

In general, we believe there is active transport and/or the exchange of cations between the anode/cathode chambers and the middle chamber in the OsMDC, and this movement might have decreased the charge transfer efficiency. For example, at the initial salt concentration of 10 g/L, the total charge (coulomb) produced in three days was about 1225 C, which is almost enough to remove all the salt (NaCl) that requires 1237 C. The actual removal efficiency (and the charge transfer efficiency) was less than 60%, indicating that some electrons generated in the anode were not used to drive salt out of the middle chamber. It is likely that the cation movement into the middle chamber contributed to current generation, as well as the salt mass.

4. Water Recovery and Conductivity of Seawater in the OsMDC

Figure 31:
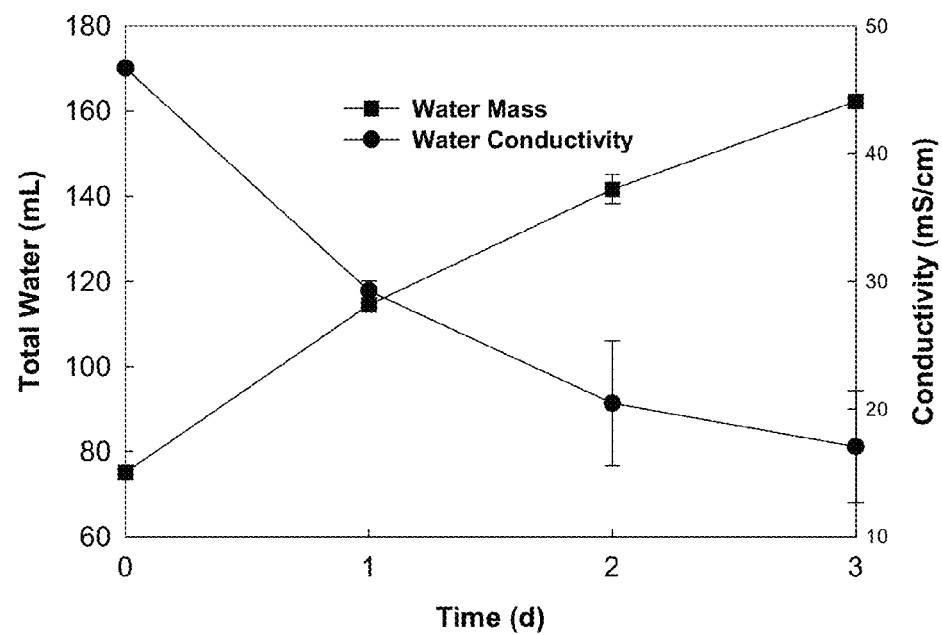
FIG. 31 is a graph showing total water recovery and conductivity of effluent for an OsMDC receiving saltwater.
Figure 34:
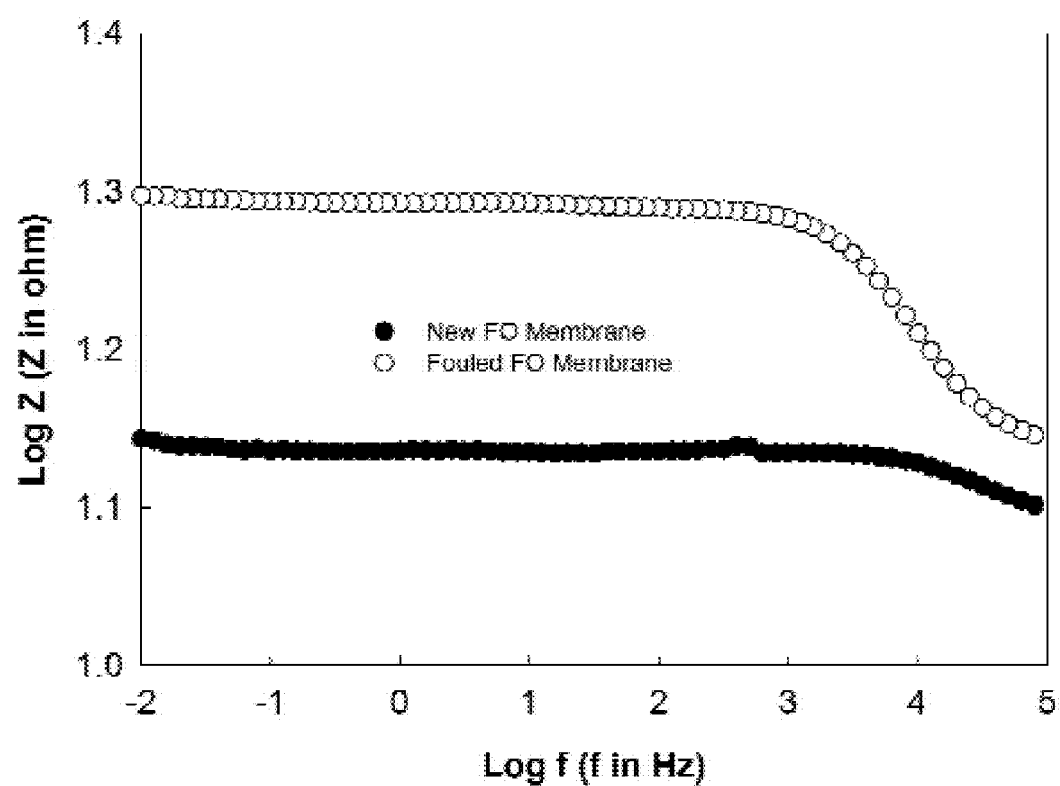
FIG. 34 is a graph showing a bode plot for OsMDCs having either a new or a fouled membrane.

It seems that the OsMDC will be more suitable for treating high salinity waters because of a stronger water flux for dilution effect. Seawater that comes from natural sources contains a higher salinity (than the saline water tested in this study) and is widely used for desalination. Therefore, the desalination of artificial seawater (prepared with aquarium sea salts) was examined in the OsMDC (FIG. 31). In a cycle of three days, the seawater conductivity decreased from 46.7 mS/cm to 17.1±4.4 mS/cm, a more than 60% reduction. The final volume of the seawater was 162.3±1.2 mL, twice the initial volume of 75.1 mL, and the water flux changed from 1.30±0.01 LMH (day one) to 0.96±0.01 LMH (day three). This water flux is slightly lower than the one with 20 g NaCl/L, possibly due to the complex elements in seawater that could cause more serious membrane fouling than NaCl. We measured the membrane resistance using electrochemical impedance spectroscopy and the Bode plots showed that the fouled membrane (after 10-day seawater operation) behaved differently from the new membrane (FIG. 34). The overall impedance increased and the membrane resistance (after deducting the solution resistance) also increased from 1.9 to 6.0 Ohms, indicating the fouling. FO membrane fouling has been a subject of study and chemical and mechanical methods have been developed to restore the membrane function. Future OsMDC development will take advantage of existing knowledge on membrane fouling and evolve a cleaning method (with fewer effects on the anode microbes) to alleviate fouling condition.

C. Summary

The concept of a novel osmotic microbial desalination cell (OsMDC) was presented and experimentally demonstrated above. The OsMDC reduced salinity better than forward osmosis because of the combined water flux and electricity generation, and it recovered more water than a conventional microbial desalination cell. The integrated functions of wastewater treatment, water desalination, and water recovery in an OsMDC will create environmental, energy, and economic benefits.

These results have collectively demonstrated that the OsMDC could be a promising technology for integrated wastewater treatment, desalination and water reuse, with environmental, energy, and economical benefits. Compared with the FO technology, the OsMDC can convert organics into electric energy and remove salts from saline waters. Compared with the MDC technology, the OsMDC can recover high-quality water from wastewater and reduce salinity through dilution; in addition, according to the manufacturers, the FO membrane in the OsMDC costs less ($30/m2) than the AEM used in the MDC ($97/m$^2$), which will greatly reduce the capital investment. Before stepping into practical issues like reactor configuration and scaling up, further investigation is required to understand fundamental issues such as ion transport and membrane fouling.

The systems, compositions and methods disclosed herein are not limited in their applications to the details described herein, and are capable of other embodiments and of being practiced or of being carried out in various ways. The phraseology and terminology used herein is for the purpose of description only, and should not be regarded as limiting. Ordinal indicators, such as first, second, and third, as used in the description and the claims to refer to various structures, are not meant to be construed to indicate any specific structures, or any particular order or configuration to such structures. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification, and no structures shown in the drawings, should be construed as indicating that any non-claimed element is essential to the practice of the invention.

Recitation of ranges of values herein are merely intended to serve as a shorthand method of referring individually to each separate value falling within the range, unless otherwise indicated herein, and each separate value is incorporated into the specification as if it were individually recited herein. For example, if a parameter is described as having a range from 1 to 50 units, it is intended that values such as 2 to 40 units, 10 to 30 units, 1 to 3 units, etc., are expressly enumerated in the specification. These are only examples of what is specifically intended, and all possible combinations of numerical values between and including the lowest value and the highest value enumerated are to be considered to be expressly stated in this application.

Any patents or publications mentioned in this specification are incorporated herein by reference to the same extent as if each individual publication is specifically and individually indicated to be incorporated by reference. Further, no admission is made that any reference, including any non-patent or patent document cited in this specification, constitutes prior art. Unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinency of any of the documents cited herein.

REFERENCES

The following references are herein incorporated by reference in their entireties for all purposes:

Achilli, A.; Cath, T. Y.; Marchand, E. A.; Childress, A. E., The forward osmosis membrane bioreactor: A low fouling alternative to MBR processes. *Desalination* 2009, 239, 10-21.

Achilli, A., Cath, T., Childress, A. 2010. Selection of inorganic-based draw solutions for forward osmosis applications. *Journal of Membrane Science* 364, 233-241.

Achilli, A., Cath, T. Y., Marchand, E. A., Childress, A. E. 2009. The forward osmosis membrane bioreactor: A low fouling alternative to MBR processes. *Desalination* 239, 10-21.

Aelterman, P., Rabaey, K., Pham, H. T., Boon, N. and Verstraete, W., "Continuous electricity generation at high voltages and currents using stacked microbial fuel cells," *Environmental Science and Technology*, 2010, 40(10), pp 3388-3394.

Anderson, L, The environmental benefits of water recycling and reuse. *Water Science and Technology: Water Supply* 2003, 3, (4), 1-10.

Angenent, L. T., Karim, K., Al-Dahhan, M. H., Wrenn, B. A., Domiguez-Espinosa, R. 2004. Production of bioenergy and biochemicals from industrial and agricultural wastewater. *Trends Biotechnol.* 22, 477-485.

Beaudry, E. G.; Lampi, K. A., Membrane technology for direct osmosis concentration of fruit juice. *Food Technology* 1990, 44, 121.

Cao, X.; Huang, X.; Liang, P.; Xiao, K.; Zhou, Y.; Zhang, X.; Logan, B. E., A new method for water desalination using microbial desalination cells. *Environmental Science & Technology* 2009, 43, (18), 7148-52.

Cath, T. Y.; Childress, A. E.; Elimelech, M., Forward osmosis: principles, applications, and recent developments. *Journal of Membrane Science* 2006, 281, 70-87.

Cath, T. Y.; Childress, A. E., Membrane contactor processes for wastewater reclamation in space. II. combined direct osmosis, osmotic distillation, and membrane distillation for treatment of metabolic wastewater. *Journal of Membrane Science* 2005, 257, 111-119.

Cath, T. Y.; Gormly, S.; Beaudry, E. G.; Flynn, M. T.; Adams, V. D.; Childress, A. E., Membrane contactor processes for wastewater reclamation in space. I. direct osmotic concentration as pretreatment for reverse osmosis. *Journal of Membrane Science* 2005, 257, 85-98.

Cath, T. Y; Nathan T. Hancock; Carl D. Lundin; Christiane Hoppe-Jones; Drewes, J. E., A multi-barrier osmotic dilution process for simultaneous desalination and purification of impaired water. *Journal of Membrane Science* 2010, 362, 417-426.

Charcosset, C., *Desalination,* 2009, 245, 214-231.

Chen, X., Xia, X., Liang, P., Cao, X., Sun H., and Huang, X., *Environ. Sci. Technol.,* 2011, 45, 2465-2470.

Cheng, S.; Xing, D.; Call, D.; Logan, B., Direct biological conversion of electrical current into methane by electromethanogenesis. *Environmental Science & Technology* 2009, 43, (10), 3953-3958.

Chung, T.-S.; Zhang, S.; Wang, K. Y.; Su, r.; Ling, M. M., Forward osmosis processes: yesterday, today and tomorrow *Desalination* 2012, 287, 78-81.

Clauwaert, P.; Aelterman, P.; Pham, T. H.; De Schamphelaire, L.; Carballa, M.; Rabaey, K.; Verstraete, W., "Minimizing losses in bio-electrochemical systems: the road to applications," *Applied Microbiology and Biotechnology,* 2008, 79(6), pp 901-913.

Cornelissen, E. R., Harmsen, D., Beerendonk, E. F., Qin, J. J., *Water Science & Technology,* 2011, 63, 1557-1565.

Gao, Y; Li, W.; Lay, W. C. L.; Coster, H. G. L.; Fane, A G.; Tang, C. Y, Characterization of forward osmosis membranes by electrochemical impedance spectroscopy. *Desalination* 2012, DOI: 1 0.1 016/j.desal.2012. 03. 006.

Ge, Z.; He, Z., Effects of draw solutions and membrane conditions on electricity generation and water flux in osmotic microbial fuel cells. *Bioresource Technology* 2012, 109, 70-76.

Gil, G. C., Chang, L S., Kim, B. H., Kim, M., Jang, J. K., Park, H. S., Kim, H. J. 2003. Operational parameters affecting the performance of a mediator-less microbial fuel cell. *Biosens. Bioelectron.* 18, 327-334.

Grubera, M. F.; Johnsonc, C. R.; Tangd, C. Y; Jensenf, M. H.; Y Dec, L.; Helix Nielsena, C., Computational fluid dynamics simulations of flow and concentration polarization in forward osmosis membrane systems. *Journal of Membrane Science* 2011, 379, 488-495.

Hancock, N. T.; Cath, T. Y, Solute coupled diffusion in osmotically driven membrane processes. *Environ Sci Technol* 2009, 43, (17), 6769-75.

He, Z., One more function for microbial fuel cells in treating wastewater: producing high-quality water. *CHEMIK* 2012, 66, 7-10.

He, Z., Minteer, S. D., Angenent, L. T., "Electricity generation from artificial wastewater using an upflow microbial fuel cell," *Environmental Science and Technology,* 2005, 39(14), 5262-5267.

He, Z.; Wagner, N.; Minteer, S. D.; Angenent, L. T., An upflow microbial fuel cell with an interior cathode: assessment of the internal resistance by impedance spectroscopy. *Environmental Science & Technology* 2006, 40, (17), 5212-5217.

Holloway, R. W.; Childress, A. E.; Dennett, K. E.; Cath, T. Y., Forward osmosis for concentration of anaerobic digester centrate. *Water Research* 2007, 41, (17), 4005-14.

Hoover, L. A.; Phillip, W. A.; Tiraferri, A.; Yip, N. Y.; Elimelech, M., Forward with osmosis: emerging applications for greater sustainability. *Environ Science & Technology* 2011, 45, (23), 9824-30.

Huang, C. H., Xu, T. W., "Electrodialysis with bipolar membranes for sustainable development," *Environmental Science & Technology,* 2006, 40(17), pp 5233-5243.

Huang, Y., He, Z. and Mansfeld, F., "Performance of microbial fuel cells with and without Nafion solution as cathode binding agent," *Bioelectrochemistry,* 2010, 79, pp 261-264.

Jacobson, K. S.; Drew, D.; He, Z., Use of a liter-scale microbial desalination cell as a platform to study bioelectrochemical desalination with salt solution or artificial seawater. *Environmental Science & Technology* 2011, 45, 4652-4657.

Jacobson, K., Drew, D. and He, Z., "Efficient salt removal in a continuously operated upflow microbial desalination cell with an air cathode," *Bioresource Technology,* 2010, 102, pp 376-380.

Karagiannis, I. C., Soldatos, P. G., "Water desalination cost literature: review and assessment," *Desalination,* 2008, 223(1-3), pp 448-456.

Khawaji, A. D., Kutubkhanah, I. K., Wie, J. M., "Advances in seawater desalination technologies," *Desalination,* 2008, 221(1-3), pp 47-69.

Kravath, R. E.; Davis, J. A., Desalination of seawater by direct osmosis. *Desalination* 1975, 16, 151-155.

Kumar, M.; Adham, S. S.; Pearce, W. R., "Investigation of seawater reverse osmosis fouling and its relationship to pretreatment type," *Environmental Science & Technology,* 2006, 40(6), pp 2037-44.

Lee, S.; Boo, c.; Elimelech, M.; Hong, S., Comparison of fouling behavior in forward osmosis (Fa) and reverse osmosis (RO). *Journal of Membrane Science* 2010, 1-2, 34-39.

Leob, S., Large-scale power production by pressure-retarded osmosis using river water and sea water passing through spiral modules. *Desalination* 2002, 143, 115-122.

Li, D.; Zhang, X.; Yao, J.; Simon, G. P.; Wang, H., Stimuli-responsive polymer hydrogels as a new class of draw agent for forward osmosis desalination. *Chem Commun (Camb)* 2011, 47, (6), 1710-2.

Li, Z. Y; Yangali-Quintanilla, V.; Valladares-Linares, R.; Li, Q.; Zhan, T.; Amy, G., Flux patterns and membrane fouling propensity during desalination of seawater by forward osmosis. *Water Res* 2012, 46, (1), 195-204.

Ling, M. M.; Wang, K. Y.; Chung, T.-S., Highly water-soluble magnetic nanoparticles as novel draw solutes in forward osmosis for water reuse. *Industrial & Engineering Chemistry Research* 2010, 49, (12), 5869-5876.

Liu, H.; Grot, S.; Logan, B. E., "Electrochemically assisted microbial production of hydrogen from acetate," *Environmental Science & Technology,* 2005, 39(11), p 4317-4320.

Logan, B. E., Scaling up microbial fuel cells and other bioelectrochemical systems. *Applied Microbiology and Biotechnology* 2010, 85, (6), 1665-1671.

Logan, B. E.; Call, D.; Cheng, S.; Hamelers, H. V.; Sleutels, T. H.; Jeremiasse, A. W.; Rozendal, R. A., Microbial electrolysis cells for high yield hydrogen gas production from organic matter. *Environmental Science & Technology* 2008, 42, (23), 8630-40.

Logan, B. E., Hamelers, B., Rozendal, R A., Schroder, U., Keller, J., Freguia, S., Aeiterman, P., Verstraete, W., Rabaey, K., Microbial fuel cells: methodology and technology. *Environmental Science & Technology* 2006, 40, 5181-5192.

Luo, H.; Jenkins, P. E.; Ren, Z., "Concurrent desalination and hydrogen generation using microbial electrolysis and desalination cells," *Environmental Science & Technology,* 2011, 45(1), pp 340-344.

Luo, H., Xu, P., Roane, T. M., Jenkins P. E., and Ren, Z., *Bioresour. Technol.,* 2012, doi:10.1016/j.biortech.2011. 11. 098.

Masters, G. M., Ela, W. P. "Introduction to environmental engineering and science", 2008, Third ed. Prentice-Hall, Inc., Upper Saddle River, N.J.

Mathioulakis, E., Belessiotis, V., Delyannis, E., "Desalination by using alternative energy: review and state-of-art," *Desalination,* 2007, 203, pp 346-365.

McCarty, P. L.; Bae, L; Kim, J., Domestic Wastewater Treatment as a Net Energy Producer—Can This be Achieved? *Environ. Sci. Technol.* 2011, 45, (17), 7100-7106.

McCutcheon, J. R.; Elimelech, M., Influence of concentrative and dilutive internal concentration polarization on flux behavior in forward osmosis *Journal of Membrane Science* 2006, 284, (1-2), 237-247.

McCutcheon, J. R.; McGinnis, R. L.; Elimelech, M., A novel ammonia—carbon dioxide forward (direct) osmosis desalination process *Desalination* 2005, 174, (1), 1-11.

Mehanna, M.; Kiely, P. D.; Call, D. F.; Logan, B. E., "A microbial electrodialysis cell for simultaneous water desalination and hydrogen gas production," *Environmental Science & Technology,* 2010, 44(24), pp 9578-9583.

Mehanna, M.; Saito, T.; Jingling, Y.; Hickner, M. A.; Cao, X.; Huang, X.; Logan, B. E., "Using microbial desalination cells to reduce water salinity prior to reverse osmosis," *Energy & Environmental Science,* 2010, 3(8), pp 1114-1120.

Menicucci, J.; Beyenal, H.; Marsili, E.; Veluchamy, R. R. A.; Demir, G.; Lewandowski, Z., "Procedure for determining maximum sustainable power generated by microbial fuel cells," *Environmental Science & Technology,* 2006, 40(3), pp 1062-1068.

Mi, B.; Elimelech, M., Chemical and physical aspects of organic fouling of forward osmosis membranes. *Journal of Membrane Science* 2008, 320, 292-302.

Mohanakrishna, G., Venkata Mohan, S., Sarma, P. N., "Bio-electrochemical treatment of distillery wastewater in microbial fuel cell facilitating decolorization and desalination along with power generation," *Journal of Hazardous Materials,* 2010, 177(1-3), pp 487-94.

Ng, H. Y.; Tang, W.; Wong, W. S., Performance of forward (direct) osmosis process: membrane structure and transport phenomenon. *Environmental Science & Technology* 2006, 40, (7), 2408-13.

Pant, D.; Van Bogaert, G.; Diels, L.; Vanbroekhoven, K., A review of the substrates used in microbial fuel cells (MFCs) for sustainable energy production *Bioresource Technology* 2010, 101, (6), 1533-1543.

Park, J.-S., Choi, J.-H., Woo, J.-J., and Moon, S.-H., *J. Colloid Interface Sci.,* 2006, 300, 655-662.

Phillip, W. A., Yong, J. S., Elimelech, M. Reverse draw solute permeation in forward osmosis: modeling and experiments. *Environmental Science & Technology* 2010, 44, 5170-5176.

Phuntsho, S.; Shan, H. K.; Hong, S.; Lee, S.; Vigneswaran, S., A novel low energy fertilizer driven forward osmosis desalination for direct fertilization: Evaluating the performance of fertilizer draw solutions. *Journal of Membrane Science* 2011, 375, 172-181.

Qin, J. J.; Chen, S.; Oo, M. H.; Kekre, K. A.; Cornelissen, E. R.; Ruiken, C. J., Experimental studies and modeling on concentration polarization in forward osmosis. *Water Science and Technology* 2010, 61, (11), 2897-904.

Quan, X., Wang, F., Zhao, Q., Zhao, T., Xiang, J. 2009. Air stripping of ammonia in a water-sparged aerocyclone reactor. *J. Hazard. Mater.* 170, 983-988.

Rabaey, K.; Butzer, S.; Brown, S.; Keller, J.; Rozendal, R. A., High current generation coupled to caustic production using a lamellar bioelectrochemical system. *Environmental Science & Technology* 2010, 44, (11), 4315-21.

Rabaey, K.; Keller, J., Microbial fuel cell cathodes: from bottleneck to prime opportunity? *Water Science and Technology* 2008, 57, (5), 655-659.

Rabaey, K.; Verstraete, W., "Microbial fuel cells: novel biotechnology for energy generation," *Trends Biotechnol.,* 2005, 23(6), pp 291-298.

Raventos, N.; Macpherson, E.; Garcia-Rubies, A., "Effect of brine discharge from a desalination plant on macrobenthic communities in the NW Mediterranean," *Marine Environmental Research,* 2006, 62(1), pp 1-14.

Rosenbaum, M., He, Z. and Angenent, L. T., "Light energy to bioelectricity: photosynthetic microbial fuel cells", *Current Opinion in Biotechnology,* 2010, 21(3), pp 259-264.

Rozendal, R A., Hamelers, H. V. M., Buisman, C. J. N. Effects of membrane cation transport on pH and microbial fuel cell performance. *Environmental Science & Technology* 2006, 40, 5206-5211.

Rozendal, R. A., Hamelers, H. V., Rabaey, K., Keller, J., Buisman, C. J., "Towards practical implementation of bioelectrochemical wastewater treatment," *Trends in Biotechnology,* 2008, 26(8), pp 450-9.

Schnoor, J. L., "ES&T's Best Papers of 2009," *Environmental Science & Technology,* 2010, 44(7), pp 2219-2219.

Semiat, R., "Energy issues in desalination processes," *Environmental Science & Technology,* 2008, 42(22), pp 8193-201.

Shannon, M. A., Bohn, P. W., Elimelech, M., Georgiadis, J. G., Marinas, B. J., Mayes, A. M. 2008. Science and technology for water purification in the coming decades. *Nature* 452, 301-310.

Singer, E., New technologies deliver in treating neurological diseases. *Natural Medicines* 2004, 10, (12), 1267.

Talaat, K. M., Forward osmosis process for dialysis fluid regeneration. *Artificial Organs* 2009, 33, (12), 1133-5.

Tanaka, Y. "Water dissociation in ion-exchange membrane electrodialysis," *Journal of Membrane Science,* 2002, 203(1-2), pp 227-244.

Ter Heijne, A., Hamelers, H. V., De Wilde, V., Rozendal, R. A., Buisman, C. J., "A bipolar membrane combined with ferric iron reduction as an efficient cathode system in microbial fuel cells," *Environmental Science & Technology,* 2006, 40(17), pp 5200-5.

Vrouwenvelder, J. S.; van der Kooij, D., "Diagnosis, prediction and prevention of biofouling of NF and RO membranes," *Desalination,* 2001, 139(1-3), pp 65-71.

Wang, X., Cheng, S., Feng, Y., Merrill, M. D., Saito, T., Logan, B. E., "Use of carbon mesh anodes and the effect of different pretreatment methods on power production in microbial fuel cells," *Environmental Science & Technology,* 2009, 43(17), 6870-6874.

Yang, Q.; Wang, K. Y.; Chung, T. S., Dual-layer hollow fibers with enhanced flux as novel forward osmosis membranes for water production. *Environmental Science & Technology* 2009, 43, (8), 2800-5.

Yip, N. Y.; Tiraferri, A.; Phillip, W. A.; Schiffman, J. D.; Elimelech, M., High performance thin-film composite forward osmosis membrane. *Environmental Science & Technology* 2010, 44, (10), 3812-8.

Zhang, B.; He, Z., Integrated salinity reduction and water recovery in an osmotic microbial desalination cells. *RSC Advances* 2012, 2, 3265-3269.

Zhang, F., Brastad, K., He, Z. 2011. Integrating forward osmosis into microbial fuel cells for wastewater treatment, water extraction and bioelectricity generation. *Environ. Sci. Technol.* 45, 6690-6696.

Zhang, F., Jacobson, K. S., Torres, P., He, Z. 2010. Effects of anolyte recirculation rates and catholytes on electricity generation in a liter-scale upflow microbial fuel cell. *Energy Environ. Sci.* 3, 1347-1352.

Zhao, F.; Hamisch, F.; Schroder, U., Scholz, F.; Bogdanoff, P.; Hermann, I., Challenges and constraints of using oxygen cathodes in microbial fuel cells. *Environmental Science and Technology* 2006, 40, (17), 5193-5199.

Zhao, S.; Zou, L.; Tang, C. Y; Mulcahy, D., Recent developments in forward osmosis: opportunities and challenges. *Journal of Membrane Science* 2012, 396, 1-21.

Zou, S.; Gu, Y; Xiao, D.; Tang, C. Y, The role of physical and chemical parameters on forward osmosis membrane fouling during algae separation *Journal of Membrane Science* 2011, 366, (1-2), 356-362.

U.S. Patent Application Publication No. 2007/0259217 (Ser. No. 11/799,194)

U.S. Patent Application Publication No. 2010/0151279 (Ser. No. 12/710,710)

U.S. Patent Application Publication No. 2010/0270158 (Ser. No. 12/765,192)

U.S. Patent Application Publication No. 2011/0311887 (Ser. No. 13/160,929)

The invention claimed is:

1. A bioelectrochemical system comprising:
   an anode at least partially positioned within an anode chamber containing an aqueous reaction mixture including one or more organic compounds and one or more bacteria for oxidizing the organic compounds;
   a saline solution chamber containing a draw solution and separated from the anode chamber by a forward osmosis membrane, wherein the forward osmosis membrane is a porous membrane that blocks solute particles having a size of 0.0001 microns or larger;
   wherein the draw solution comprises a higher amount of a saline solution than the anode chamber and the saline solution contains a salt concentration of at least or greater than 20 g/L; and
   a cathode;
   wherein water diffuses across the forward osmosis membrane from the aqueous reaction mixture to the draw solution.

2. The bioelectrochemical system of claim 1, wherein the forward osmosis membrane at least partially surrounds and defines the anode chamber.

3. The bioelectrochemical system of claim 2, wherein the anode chamber is at least partially surrounded by the saline solution chamber.

4. The bioelectrochemical system of claim 1, wherein the saline solution chamber is a cathode chamber and the cathode is at least partially positioned within the cathode chamber.

5. The bioelectrochemical system of claim 4, wherein the draw solution is a catholyte solution.

6. The bioelectrochemical system of claim 4, wherein the draw solution comprises sodium chloride.

7. The bioelectrochemical system of claim 4, wherein the diffusion of water across the forward osmosis membrane increases proton transport into the cathode chamber, thereby increasing current generation.

* * * * *